United States Patent
Connor

(10) Patent No.: US 12,527,521 B2
(45) Date of Patent: Jan. 20, 2026

(54) MOTION RECOGNITION CLOTHING™ WITH INERTIAL SENSORS AND ELECTRICAL OR OPTICAL STRAIN SENSORS

(71) Applicant: Robert A. Connor, St. Paul, MN (US)

(72) Inventor: Robert A. Connor, St. Paul, MN (US)

(73) Assignee: Medibotics LLC, Ham Lake, MN (US)

( * ) Notice: Subject to any disclaimer, the term of this patent is extended or adjusted under 35 U.S.C. 154(b) by 279 days.

(21) Appl. No.: 18/369,129

(22) Filed: Sep. 15, 2023

(65) Prior Publication Data

US 2024/0000383 A1  Jan. 4, 2024

Related U.S. Application Data

(63) Continuation-in-part of application No. 17/721,866, filed on Apr. 15, 2022, now Pat. No. 11,892,286, which is a continuation-in-part of application No. 17/356,377, filed on Jun. 23, 2021, now Pat. No. 11,304,628, which is a continuation-in-part of application No. 16/751,245, filed on Jan. 24, 2020, now Pat. No. 11,071,498, which is a continuation-in-part of application No. 16/543,056, filed on Aug. 16, 2019, now Pat. No. 10,839,202, and a continuation-in-part of application No. 16/017,439, filed on Jun. 25, 2018, now Pat. No. 10,921,886, said application No. 16/543,056 is a continuation-in-part of application No. 16/010,448, filed on Jun. 16, 2018, now Pat. No. 10,602,965, said application No.

(Continued)

(51) Int. Cl.
  A61B 5/00    (2006.01)
  A61B 5/11    (2006.01)
  G01P 15/02   (2013.01)

(52) U.S. Cl.
  CPC .............. *A61B 5/6804* (2013.01); *A61B 5/11* (2013.01); *G01P 15/02* (2013.01); *A61B 2560/0223* (2013.01); *A61B 2562/0219* (2013.01); *A61B 2562/04* (2013.01)

(58) Field of Classification Search
  CPC . A61B 5/6804; A61B 5/11; A61B 2560/0223; A61B 2562/0219; A61B 2562/04; A61B 2562/0261; A61B 2562/0266; A61B 2562/046; A61B 5/1126; A61B 2562/12; G01P 15/02; G06F 3/014; G06F 3/011; G06F 3/015; G01B 7/16; A41D 1/002
  See application file for complete search history.

(56) References Cited

U.S. PATENT DOCUMENTS

| | | | |
|---|---|---|---|
| 4,937,444 A * | 6/1990 | Zimmerman | G01D 5/35345 250/221 |
| 6,145,551 A | 11/2000 | Jayaraman et al. | |

(Continued)

*Primary Examiner* — Xin Y Zhong

(57) ABSTRACT

Disclosed herein is an article of smart clothing which automatically recognizes body configuration and motion. This smart clothing includes inertial motion units which are distal relative to selected joints and also sets of strain sensors which span those joints. The type of energy transmitted through a strain sensor can be electrical energy or light energy. Combined multivariate analysis of data from both inertial motion units and strain sensors provides more accurate recognition of body configuration and motion than data from either alone.

3 Claims, 3 Drawing Sheets

Related U.S. Application Data

16/751,245 is a continuation-in-part of application No. 16/010,448, filed on Jun. 16, 2018, now Pat. No. 10,602,965, said application No. 16/017,439 is a continuation-in-part of application No. 16/010,448, filed on Jun. 16, 2018, now Pat. No. 10,602,965, which is a continuation-in-part of application No. 15/702,081, filed on Sep. 12, 2017, now Pat. No. 10,716,510, said application No. 16/751,245 is a continuation-in-part of application No. 15/702,081, filed on Sep. 12, 2017, now Pat. No. 10,716,510, said application No. 16/010,448 is a continuation-in-part of application No. 15/227,254, filed on Aug. 3, 2016, now Pat. No. 10,321,873, said application No. 15/702,081 is a continuation-in-part of application No. 15/227,254, filed on Aug. 3, 2016, now Pat. No. 10,321,873, which is a continuation-in-part of application No. 15/130,995, filed on Apr. 17, 2016, now Pat. No. 9,891,718, and a continuation-in-part of application No. 15/079,447, filed on Mar. 24, 2016, now Pat. No. 10,234,934, said application No. 16/017,439 is a continuation-in-part of application No. 14/795,373, filed on Jul. 9, 2015, now abandoned, said application No. 15/702,081 is a continuation-in-part of application No. 14/795,373, filed on Jul. 9, 2015, now abandoned, said application No. 15/227,254 is a continuation-in-part of application No. 14/736,652, filed on Jun. 11, 2015, now abandoned, said application No. 14/795,373 is a continuation-in-part of application No. 14/736,652, filed on Jun. 11, 2015, now abandoned, said application No. 15/079,447 is a continuation-in-part of application No. 14/664,832, filed on Mar. 21, 2015, now Pat. No. 9,582,072, said application No. 14/736,652 is a continuation-in-part of application No. 14/664,832, filed on Mar. 21, 2015, now Pat. No. 9,582,072, said application No. 15/227,254 is a continuation-in-part of application No. 14/664,832, filed on Mar. 21, 2015, now Pat. No. 9,582,072, which is a continuation-in-part of application No. 14/463,741, filed on Aug. 20, 2014, now Pat. No. 9,588,582, said application No. 15/079,447 is a continuation-in-part of application No. 14/463,741, filed on Aug. 20, 2014, now Pat. No. 9,588,582.

(60) Provisional application No. 62/797,266, filed on Jan. 26, 2019, provisional application No. 62/727,798, filed on Sep. 6, 2018, provisional application No. 62/683,237, filed on Jun. 11, 2018, provisional application No. 62/538,793, filed on Jul. 30, 2017, provisional application No. 62/449,735, filed on Jan. 24, 2017, provisional application No. 62/357,957, filed on Jul. 2, 2016, provisional application No. 62/187,906, filed on Jul. 2, 2015, provisional application No. 62/182,473, filed on Jun. 20, 2015, provisional application No. 62/150,886, filed on Apr. 22, 2015, provisional application No. 62/086,053, filed on Dec. 1, 2014, provisional application No. 62/065,032, filed on Oct. 17, 2014, provisional application No. 62/014,747, filed on Jun. 20, 2014, provisional application No. 61/976,650, filed on Apr. 8, 2014, provisional application No. 61/878,893, filed on Sep. 17, 2013.

(56) References Cited

U.S. PATENT DOCUMENTS

| | | |
|---|---|---|
| 6,315,009 B1 | 11/2001 | Jayaraman et al. |
| 6,381,482 B1 | 4/2002 | Jayaraman et al. |
| 6,487,906 B1 | 12/2002 | Hock |
| 6,687,523 B1 | 2/2004 | Jayaramen et al. |
| 6,970,731 B1 | 11/2005 | Jayaraman et al. |
| 7,771,318 B2 | 8/2010 | Narayanaswami |
| 7,850,574 B2 | 12/2010 | Narayanaswami |
| 7,981,057 B2 | 7/2011 | Stewart |
| 8,162,857 B2 | 4/2012 | Lanfermann et al. |
| 8,291,779 B2 | 10/2012 | Helmer et al. |
| 8,348,865 B2 * | 1/2013 | Jeong ............... A63B 24/0003 600/595 |
| 8,945,328 B2 | 2/2015 | Longinotti-Buitoni et al. |
| 8,948,839 B1 | 2/2015 | Longinotti-Buitoni et al. |
| 9,043,004 B2 | 5/2015 | Casillas et al. |
| 9,322,121 B2 | 4/2016 | Dunne et al. |
| 9,498,128 B2 | 11/2016 | Jayalath et al. |
| 9,546,921 B2 | 1/2017 | McMillen et al. |
| 9,612,102 B2 | 4/2017 | Reese et al. |
| 9,652,101 B2 | 5/2017 | McMillen |
| 9,696,833 B2 | 7/2017 | McMillen |
| 9,700,238 B2 | 7/2017 | Stewart |
| 9,710,060 B2 | 7/2017 | McMillen et al. |
| 9,753,568 B2 | 9/2017 | McMillen |
| 9,797,791 B2 | 10/2017 | Vogt et al. |
| 9,816,799 B2 | 11/2017 | Keller et al. |
| 9,816,800 B2 | 11/2017 | O'Brien et al. |
| 9,817,440 B2 | 11/2017 | Longinotti-Buitoni et al. |
| 9,839,394 B2 | 12/2017 | Casillas et al. |
| 9,841,330 B2 | 12/2017 | Casillas et al. |
| 9,850,600 B2 | 12/2017 | Gal |
| 9,874,431 B2 | 1/2018 | Reese |
| 9,885,621 B2 | 2/2018 | Dunne et al. |
| 9,913,611 B2 | 3/2018 | Wiebe et al. |
| 9,965,076 B2 | 5/2018 | McMillen |
| 9,986,771 B2 | 6/2018 | Longinotti-Buitoni et al. |
| 10,045,439 B2 | 8/2018 | Longinotti-Buitoni et al. |
| 10,065,074 B1 | 9/2018 | Hoang et al. |
| 10,067,007 B2 | 9/2018 | Keller et al. |
| 10,105,098 B2 | 10/2018 | Wiebe et al. |
| 10,119,208 B2 | 11/2018 | McMaster |
| 10,139,293 B2 | 11/2018 | Casillas et al. |
| 10,143,405 B2 | 12/2018 | Jayalath et al. |
| 10,159,440 B2 | 12/2018 | Longinotti-Buitoni et al. |
| 10,172,541 B2 | 1/2019 | Liao et al. |
| 10,197,459 B2 | 2/2019 | Keller et al. |
| 10,228,231 B2 | 3/2019 | O'Brien et al. |
| 10,240,265 B2 | 3/2019 | McMaster |
| 10,258,092 B2 | 4/2019 | Longinotti-Buitoni et al. |
| 10,268,315 B2 | 4/2019 | McMillen |
| 10,274,384 B2 | 4/2019 | Dunne et al. |
| 10,282,011 B2 | 5/2019 | McMillen |
| 10,288,507 B2 | 5/2019 | McMillen et al. |
| 10,292,652 B2 | 5/2019 | Berg et al. |
| 10,321,832 B2 | 6/2019 | Berg et al. |
| 10,362,958 B2 | 7/2019 | Morun et al. |
| 10,362,989 B2 | 7/2019 | McMillen et al. |
| 10,378,975 B1 | 8/2019 | Sun |
| 10,413,219 B2 | 9/2019 | Jayalath et al. |
| 10,429,928 B2 | 10/2019 | Morun et al. |
| 10,458,866 B1 | 10/2019 | Sun |
| 10,462,898 B2 | 10/2019 | Longinotti-Buitoni et al. |
| 10,488,936 B2 | 11/2019 | Baranski et al. |
| 10,502,643 B2 | 12/2019 | Keller et al. |
| 10,527,507 B2 | 1/2020 | Wood et al. |
| 10,535,278 B2 | 1/2020 | Chahine |
| 2010/0036288 A1 | 2/2010 | Lanfermann et al. |
| 2012/0046901 A1 * | 2/2012 | Green ............... G06F 3/011 702/141 |
| 2012/0188158 A1 | 7/2012 | Tan et al. |
| 2013/0285577 A1 | 10/2013 | O'Brien et al. |
| 2014/0135593 A1 | 5/2014 | Jayalath et al. |
| 2014/0142459 A1 | 5/2014 | Jayalath et al. |
| 2014/0238151 A1 | 8/2014 | Dunne et al. |
| 2014/0238153 A1 | 8/2014 | Wood et al. |

(56) References Cited

U.S. PATENT DOCUMENTS

| | | |
|---|---|---|
| 2014/0240103 A1 | 8/2014 | Lake et al. |
| 2014/0240223 A1 | 8/2014 | Lake et al. |
| 2014/0318699 A1 | 10/2014 | Longinotti-Buitoni et al. |
| 2015/0040282 A1 | 2/2015 | Longinotti-Buitoni et al. |
| 2015/0057984 A1* | 2/2015 | Nicoletti ................ G05B 15/02 703/2 |
| 2015/0123647 A1 | 5/2015 | Gisby et al. |
| 2015/0148619 A1 | 5/2015 | Berg et al. |
| 2015/0230719 A1 | 8/2015 | Berg et al. |
| 2015/0305677 A1 | 10/2015 | Berg et al. |
| 2015/0331533 A1 | 11/2015 | McMillen |
| 2015/0359455 A1 | 12/2015 | Hahami et al. |
| 2015/0359485 A1 | 12/2015 | Berg et al. |
| 2016/0033255 A1 | 2/2016 | Reese |
| 2016/0070347 A1 | 3/2016 | McMillen et al. |
| 2016/0091980 A1 | 3/2016 | Baranski et al. |
| 2016/0128632 A1 | 5/2016 | Wiebe et al. |
| 2016/0238368 A1 | 8/2016 | O'Brien et al. |
| 2016/0287175 A1 | 10/2016 | Coleman et al. |
| 2016/0305759 A1 | 10/2016 | Reese et al. |
| 2017/0035354 A1 | 2/2017 | Jayalath et al. |
| 2017/0036066 A1 | 2/2017 | Chahine |
| 2017/0038881 A1 | 2/2017 | McMillen |
| 2017/0074637 A1 | 3/2017 | Reese |
| 2017/0086711 A1 | 3/2017 | Liao et al. |
| 2017/0168567 A1 | 6/2017 | Reese et al. |
| 2017/0171965 A1 | 6/2017 | Youn et al. |
| 2017/0191819 A1 | 7/2017 | O'Brien et al. |
| 2017/0196513 A1 | 7/2017 | Longinotti-Buitoni et al. |
| 2017/0265810 A1 | 9/2017 | Van De Vyver |
| 2017/0303853 A1 | 10/2017 | McMillen et al. |
| 2017/0347721 A1 | 12/2017 | Greenspan et al. |
| 2018/0049698 A1 | 2/2018 | Berg et al. |
| 2018/0051974 A1 | 2/2018 | O'Brien et al. |
| 2018/0067516 A1 | 3/2018 | Longinotti-Buitoni et al. |
| 2018/0279951 A1 | 10/2018 | Asnis et al. |
| 2018/0376586 A1 | 12/2018 | Longinotti-Buitoni et al. |
| 2019/0046114 A1 | 2/2019 | Bogdanovich et al. |
| 2019/0059461 A1 | 2/2019 | Walker |
| 2019/0117157 A1 | 4/2019 | Hu et al. |
| 2019/0132948 A1 | 5/2019 | Longinotti-Buitoni et al. |
| 2019/0145752 A1 | 5/2019 | Zhu et al. |
| 2019/0151713 A1 | 5/2019 | Berg et al. |
| 2019/0185672 A1 | 6/2019 | Boland et al. |
| 2019/0220099 A1 | 7/2019 | Baranski et al. |
| 2019/0228330 A1 | 7/2019 | Kaifosh et al. |
| 2019/0261874 A1 | 8/2019 | Berg et al. |
| 2019/0290198 A1 | 9/2019 | Belson et al. |
| 2019/0310713 A1 | 10/2019 | Wang et al. |
| 2019/0342993 A1 | 11/2019 | Ahn et al. |
| 2019/0364983 A1 | 12/2019 | Nakajima et al. |
| 2019/0390985 A1 | 12/2019 | Kwok et al. |
| 2020/0000378 A1 | 1/2020 | Jayalath et al. |
| 2020/0008715 A1 | 1/2020 | Schroeck et al. |

* cited by examiner

MOTION RECOGNITION CLOTHING™ WITH INERTIAL SENSORS AND ELECTRICAL OR OPTICAL STRAIN SENSORS

CROSS-REFERENCE TO RELATED APPLICATIONS

This application is a continuation in part of patent application Ser. No. 17/721,866 filed on 2022 Apr. 15. Patent application Ser. No. 17/721,866 was a continuation in part of patent application Ser. No. 17/356,377 filed on 2021 Jun. 23 which issued as patent Ser. No. 11/304,628 on 2022 Apr. 19. Patent application Ser. No. 17/356,377 was a continuation in part of patent application Ser. No. 16/751,245 filed on 2020 Jan. 24 which issued as patent Ser. No. 11/071,498 on 2021 Jul. 27.

Patent application Ser. No. 16/751,245 was a continuation in part of patent application Ser. No. 16/543,056 filed on 2019 Aug. 16 which issued as patent Ser. No. 10/839,202 on 2020 Nov. 17. Patent application Ser. No. 16/751,245 claimed the priority benefit of patent provisional application 62/797,266 filed on 2019 Jan. 26. Patent application Ser. No. 16/751,245 was a continuation in part of patent application Ser. No. 16/017,439 filed on 2018 Jun. 25 which issued as patent Ser. No. 10/921,886 on 2020 Feb. 16. Patent application Ser. No. 16/751,245 was a continuation in part of patent application Ser. No. 16/010,448 filed on 2018 Jun. 16 which issued as patent Ser. No. 10/602,965 on 2020 Mar. 31. Patent application Ser. No. 16/751,245 was a continuation in part of patent application Ser. No. 15/702,081 filed on 2017 Sep. 12 which issued as patent Ser. No. 10/716,510 on 2020 Jul. 21.

Patent application Ser. No. 16/543,056 claimed the priority benefit of patent provisional application 62/797,266 filed on 2019 Jan. 26. Patent application Ser. No. 16/543,056 claimed the priority benefit of patent provisional application 62/727,798 filed on 2018 Sep. 6. Patent application Ser. No. 16/543,056 was a continuation in part of patent application Ser. No. 16/010,448 filed on 2018 Jun. 16 which issued as patent Ser. No. 10/602,965 on 2020 Mar. 31.

Patent application Ser. No. 16/017,439 was a continuation in part of patent application Ser. No. 16/010,448 filed on 2018 Jun. 16 which issued as patent Ser. No. 10/602,965 on 2020 Mar. 31. Patent application Ser. No. 16/017,439 claimed the priority benefit of patent provisional application 62/683,237 filed on 2018 Jun. 11. Patent application 16017439 was a continuation in part of patent application Ser. No. 14/795,373 filed on 2015 Jul. 9.

Patent application Ser. No. 16/010,448 claimed the priority benefit of patent provisional application 62/683,237 filed on 2018 Jun. 11. Patent application Ser. No. 16/010,448 was a continuation in part of patent application Ser. No. 15/702,081 filed on 2017 Sep. 12 which issued as patent Ser. No. 10/716,510 on 2020 Jul. 21. Patent application Ser. No. 16/010,448 claimed the priority benefit of patent provisional application 62/538,793 filed on 2017 Jul. 30. Patent application 16010448 was a continuation in part of patent application Ser. No. 15/227,254 filed on 2016 Aug. 3 which issued as patent Ser. No. 10/321,873 on 2019 Jun. 18.

Patent application Ser. No. 15/702,081 claimed the priority benefit of patent provisional application 62/538,793 filed on 2017 Jul. 30. Patent application Ser. No. 15/702,081 claimed the priority benefit of patent provisional application 62/449,735 filed on 2017 Jan. 24. Patent application Ser. No. 15/702,081 was a continuation in part of patent application Ser. No. 15/227,254 filed on 2016 Aug. 3 which issued as patent Ser. No. 10/321,873 on 2019 Jun. 18. Patent application 15702081 was a continuation in part of patent application Ser. No. 14/795,373 filed on 2015 Jul. 9.

Patent application Ser. No. 15/227,254 claimed the priority benefit of patent provisional application 62/357,957 filed on 2016 Jul. 2. Patent application Ser. No. 15/227,254 was a continuation in part of patent application Ser. No. 15/130,995 filed on 2016 Apr. 17 which issued as U.S. Pat. No. 9,891,718 on 2018 Feb. 13. Patent application Ser. No. 15/227,254 was a continuation in part of patent application Ser. No. 15/079,447 filed on 2016 Mar. 24 which issued as patent Ser. No. 10/234,934 on 2019 Mar. 19. Patent application Ser. No. 15/227,254 was a continuation in part of patent application Ser. No. 14/736,652 filed on 2015 Jun. 11. Patent application Ser. No. 15/227,254 was a continuation in part of patent application Ser. No. 14/664,832 filed on 2015 Mar. 21 which issued as U.S. Pat. No. 9,582,072 on 2017 Feb. 28.

Patent application Ser. No. 15/130,995 claimed the priority benefit of patent provisional application 62/150,886 filed on 2015 Apr. 22. Patent application Ser. No. 15/079,447 claimed the priority benefit of patent provisional application 62/150,886 filed on 2015 Apr. 22. Patent application Ser. No. 15/079,447 was a continuation in part of patent application Ser. No. 14/664,832 filed on 2015 Mar. 21 which issued as U.S. Pat. No. 9,582,072 on 2017 Feb. 28. Patent application 15079447 was a continuation in part of patent application Ser. No. 14/463,741 filed on 2014 Aug. 20 which issued as U.S. Pat. No. 9,588,582 on 2017 Mar. 7.

Patent application Ser. No. 14/795,373 claimed the priority benefit of patent provisional application 62/187,906 filed on 2015 Jul. 2. Patent application Ser. No. 14/795,373 claimed the priority benefit of patent provisional application 62/182,473 filed on 2015 Jun. 20. Patent application Ser. No. 14/795,373 was a continuation in part of patent application Ser. No. 14/736,652 filed on 2015 Jun. 11. Patent application Ser. No. 14/795,373 claimed the priority benefit of patent provisional application 62/086,053 filed on 2014 Dec. 1. Patent application Ser. No. 14/795,373 claimed the priority benefit of patent provisional application 62/065,032 filed on 2014 Oct. 17.

Patent application Ser. No. 14/736,652 was a continuation in part of patent application Ser. No. 14/664,832 filed on 2015 Mar. 21 which issued as U.S. Pat. No. 9,582,072 on 2017 Feb. 28. Patent application Ser. No. 14/736,652 claimed the priority benefit of patent provisional application 62/014,747 filed on 2014 Jun. 20. Patent application 14664832 was a continuation in part of patent application Ser. No. 14/463,741 filed on 2014 Aug. 20 which issued as U.S. Pat. No. 9,588,582 on 2017 Mar. 7. Patent application Ser. No. 14/664,832 claimed the priority benefit of patent provisional application 61/976,650 filed on 2014 Apr. 8. Patent application Ser. No. 14/463,741 claimed the priority benefit of patent provisional application 61/878,893 filed on 2013 Sep. 17.

The entire contents of these applications are incorporated herein by reference.

FEDERALLY SPONSORED RESEARCH

Not Applicable

SEQUENCE LISTING OR PROGRAM

Not Applicable

BACKGROUND

Field of Invention

This invention relates to devices and methods for human motion capture.

INTRODUCTION

There are many potential applications for Motion Recognition Clothing™. Motion recognition clothing is smart clothing (or clothing accessories) which automatically recognizes (e.g. recognizes, identifies, tracks, monitors, and/or measures) body configuration (e.g. body pose, stance, position, and/or joint angles) and motion (e.g. changes in body pose, stance, position, and/or joint angles).

Motion recognition clothing can be used for health, fitness, and sports applications. Motion recognition clothing can be used for caloric expenditure measurement, energy balance management, weight management, and caloric intake monitoring applications. Motion recognition clothing can be used for virtual exercise. Motion recognition clothing can be used for real-time avoidance of repeated motion injuries, injuries due to poor posture, and stress-related injuries including back injuries and carpal tunnel syndrome.

Motion recognition clothing can be used for diagnostic and therapy-evaluation purposes including: range of motion assessment, gait analysis, biomechanical analysis, posture evaluation and correction, ergonomic assessment, fall prevention and detection, spinal motion assessment, rehabilitation assessment, biofeedback, pulse monitoring, respiratory function assessment, plethysmography, cardiac function monitoring, orthopedic therapy, physical therapy, orthotic design and fitting, and pronation analysis. Motion recognition clothing can be used for telemedicine and/or telesurgery applications.

Motion recognition clothing can be used for communication and computer interface purposes. Motion recognition clothing can be used for telepresence, teleconferencing, telecommunication, avatar animation, and virtual commerce. Motion recognition clothing can be used as part of a gesture recognition human-to-computer user interface. Motion recognition clothing be can be used for telerobotics to enable remote control of the actions of a robot.

Motion recognition clothing can be used for entertainment, gaming, and artistic purposes. Motion recognition clothing can be used for animation of an avatar in virtual reality and/or computer gaming. Motion recognition clothing can be used for animation of an animated character in motion picture making or other visual animation applications. Motion recognition clothing can be used for dance instruction, dance performance, and other performance art applications. Motion recognition clothing can be used for instruction and motion capture for playing musical instruments.

REVIEW OF THE RELEVANT ART

Myant is a significant innovator with respect to clothing for human motion capture. Their work includes patent 10535278 (Chahine, Jan. 14, 2020, "Garment with Stretch Sensors") and U.S. patent application publication 20170036066 (Chahine, Feb. 9, 2017, "Garment with Stretch Sensors") which disclose a knitted or woven garment configured for sensing movement of an adjacent underlying body portion of a wearer of the garment via one or more sensors.

Another significant innovator with respect to clothing for human motion capture is L.I.F.E. Corporation. Their work includes patents 10045439 (Longinotti-Buitoni et al., Aug. 7, 2018, "Garments Having Stretchable and Conductive Ink"), U.S. Pat. No. 10,258,092 (Longinotti-Buitoni et al., Apr. 16, 2019, "Garments Having Stretchable and Conductive Ink"), U.S. Pat. No. 8,945,328 (Longinotti-Buitoni et al., Feb. 3, 2015, "Methods of Making Garments Having Stretchable and Conductive Ink"), U.S. Pat. No. 8,948,839 (Longinotti-Buitoni et al., Feb. 3, 2015, "Compression Garments Having Stretchable and Conductive Ink"), U.S. Pat. No. 9,817,440 (Longinotti-Buitoni et al., Nov. 14, 2017, "Garments Having Stretchable and Conductive Ink"), and U.S. Pat. No. 9,986,771 (Longinotti-Buitoni et al., Jun. 5, 2018, "Garments Having Stretchable and Conductive Ink"); and U.S. patent application publications 20180067516 (Longinotti-Buitoni et al., Mar. 8, 2018, "Garments Having Stretchable and Conductive Ink"), 20180376586 (Longinotti-Buitonii et al., Dec. 27, 2018, "Garments Having Stretchable and Conductive Ink"), 20170196513 (Longinotti-Buitoni et al., Jul. 13, 2017, "Garments Having Stretchable and Conductive Ink"), 20150040282 (Longinotti-Buitoni et al., Feb. 12, 2015, "Compression Garments Having Stretchable and Conductive Ink"), and 20140318699 (Longinotti-Buitoni et al., Oct. 30, 2014, "Methods of Making Garments Having Stretchable and Conductive Ink"), which disclose garments with stretchable conductive ink patterns. U.S. patent Ser. No. 10/159,440 (Longinotti-Buitoni et al., Dec. 25, 2018, "Physiological Monitoring Garments") and 10462898 (Longinotti-Buitoni et al., Oct. 29, 2019, "Physiological Monitoring Garments"), and U.S. patent application publication 20190132948 (Longinotti-Buitonii et al., May 2, 2019, "Physiological Monitoring Garments") disclose garments for detecting and monitoring physiological parameters such as respiration and cardiac parameters.

Another significant innovator with respect to clothing for human motion capture is StretchSense. Their work includes patent application publication 20130285577 (O'Brien et al., Oct. 31, 2013, "Dielectric Elastomer Self-Sensing Using Plane Approximation") which discloses a method for obtaining feedback parameters related to the state of a dielectric elastomer (DE). U.S. patent application publication 20170191819 (O'Brien et al., Jul. 6, 2017, "Electro-Mechanical Sensor") discloses an electrical sensor having an electrical capacitance which varies with mechanical deformation. U.S. patent Ser. No. 10/228,231 (O'Brien et al., Mar. 12, 2019, "Laminated Devices of Elastic Material Suitable for Dielectric Elastomer Sensing") discloses a laminated device of flexible and compliant layers of material, such as used to provide a dielectric elastomer sensor. U.S. Pat. No. 9,816,800 (O'Brien et al., Nov. 14, 2017, "Method of Fabrication of Laminates of Elastic Material Suitable for Dielectric Elastomer Sensing"), and U.S. patent application publications 20160238368 (O'Brien et al., Aug. 18, 2016, "Method of Fabrication of Laminates of Elastic Material Suitable for Dielectric Elastomer Sensing") and 20180051974 (O'Brien et al., Feb. 22, 2018, "Method of Fabrication of Laminates of Elastic Material Suitable for Dielectric Elastomer Sensing"), disclose a method of fabricating a laminate of flexible and compliant layers of material, such as used to provide a dielectric elastomer sensor. U.S. patent application publication 20150123647 (Gisby et al., May 7, 2015, "Self-Sensing Dielectric Elastomer Device") discloses circuits, systems and methods for dielectric elastomer device (DED) self-sensing.

Another significant innovator with respect to clothing for human motion capture is BeBop Sensors. Their work includes patents 9753568 (McMillen, Sep. 5, 2017, "Flexible Sensors and Applications") and U.S. Pat. No. 10,282,011 (McMillen, May 7, 2019, "Flexible Sensors and Applications"), and also U.S. patent application publications 20150331533 (McMillen, Nov. 19, 2015, "Flexible Sensors and Applications") and 20170038881 (McMillen, Feb. 9, 2017, "Flexible Sensors and Applications") which disclose wearable sensors with piezoresistive materials. U.S. Pat. No. 9,965,076 (McMillen, May 8, 2018, "Piezoresistive Sensors and Applications"), U.S. Pat. No. 9,546,921 (McMillen et al., Jan. 17, 2017, "Piezoresistive Sensors and Sensor Arrays"), U.S. Pat. No. 10,288,507 (McMillen et al., May 14, 2019, "Piezoresistive Sensors and Sensor Arrays"), and U.S. Pat. No. 9,696,833 (McMillen, Jul. 4, 2017, "Promoting Sensor Isolation and Performance in Flexible Sensor Arrays") disclose sensors with conductive traces on piezoresistive material with musical applications. U.S. Pat. No. 9,710,060 (McMillen et al., Jul. 18, 2017, "Sensor System Integrated with a Glove") and U.S. Pat. No. 10,362,989 (McMillen et al., Jul. 30, 2019, "Sensor System Integrated with a Glove"), and U.S. patent application publications 20160070347 (McMillen et al., Mar. 10, 2016, "Sensor System Integrated with a Glove") and 20170303853 (McMillen et al., Oct. 26, 2017, "Sensor System Integrated with a Glove") disclose sensor systems with piezoresistive material in gloves to measure hand motion. U.S. Pat. No. 9,652,101 (McMillen, May 16, 2017, "Two-Dimensional Sensor Arrays") and U.S. Pat. No. 10,268,315 (McMillen, Apr. 23, 2019, "Two-Dimensional Sensor Arrays") disclose two-dimensional sensor arrays made with piezoresistive material.

Another significant innovator with respect to clothing for human motion capture is Nike. Their work includes patents 9043004 (Casillas et al., May 26, 2015, "Apparel Having Sensor System"), U.S. Pat. No. 9,839,394 (Casillas et al., Dec. 12, 2017, "Apparel Having Sensor System"), U.S. Pat. No. 9,841,330 (Casillas et al., Dec. 12, 2017, "Apparel Having Sensor System"), and U.S. Pat. No. 10,139,293 (Casillas et al., Nov. 27, 2018, "Apparel Having Sensor System") which disclose a plurality of sensors formed of a polymeric material having a conductive particulate material dispersed therein and conductive leads connecting the sensors to a port. U.S. patent application publication 20190059461 (Walker, Feb. 28, 2019, "Sense-Enabled Apparel") discloses an apparel piece sized to be worn on a user and a sensor system integrated with the apparel piece.

Another significant innovator with respect to clothing for human motion capture is Mad Apparel (Athos). Their work includes patent application publication 20150305677 (Berg et al., Oct. 29, 2015, "Biometric Electrode System and Method of Manufacture") which discloses an electrode system for EMG sensors with a substrate comprising a reference region and a signal communication region. U.S. patent application publication 20150359485 (Berg et al., Dec. 17, 2015, "Biometric Signal Conduction System and Method of Manufacture") discloses EMG sensors with a flexible substrate including a first broad surface and a second broad surface opposing the first broad surface. U.S. Pat. No. 9,913,611 (Wiebe et al., Mar. 13, 2018, "Garment Integrated Sensing System and Method") and U.S. Pat. No. 10,105,098 (Wiebe et al., Oct. 23, 2018, "Garment Integrated Sensing System and Method"), and U.S. patent application publication 20160128632 (Wiebe et al., May 12, 2016, "Garment Integrated Sensing System and Method"), disclose wireless sensor interfaces coupled to a garment, wherein each sensor includes an electrode layer, a positional identifier, and a retention subsystem. U.S. patent application publication 20180049698 (Berg et al., Feb. 22, 2018, "Garment with Conductive Thread Exposed on Both Sides") discloses a garment made by bonding an adhesive to a first layer of fabric and a second layer of fabric. U.S. patent application publication 20180279951 (Asnis et al., "Movement Compensation for Sensor-Equipped Athletic Garments") discloses an athletic garment includes connective segments that compensate for motion of an athlete wearing the athletic garment. U.S. patent application publication 20190151713 (Berg et al., May 23, 2019, "Printable Electronic Garment Conduit") discloses an athletic garment with printed EMG sensors. U.S. patent Ser. No. 10/292,652 (Berg et al., May 21, 2019, "System and Method for Monitoring Biometric Signals") and U.S. Pat. No. 10,321,832 (Berg et al., Jun. 18, 2019, "System and Method for Monitoring Biometric Signals"), and U.S. patent application publications 20150148619 (Berg et al., May 28, 2015, "System and Method for Monitoring Biometric Signals"), 20150230719 (Berg et al., Aug. 20, 2015, "System and Method for Monitoring Biometric Signals"), and 20190261874 (Berg et al., Aug. 29, 2019, "System and Method for Monitoring Biometric Signals") disclose a garment with a mounting module having an array of connection regions and biometric sensors. U.S. Pat. No. 9,498,128 (Jayalath et al., Nov. 22, 2016, "Wearable Architecture and Methods for Performance Monitoring, Analysis, and Feedback") and U.S. Pat. No. 10,413,219 (Jayalath et al., Sep. 17, 2019, "Wearable Architecture and Methods for Performance Monitoring, Analysis, and Feedback"), and U.S. patent application publications 20140135593 (Jayalth et al., May 15, 2014, "Wearable Architecture and Methods for Performance Monitoring, Analysis, and Feedback"), 20170035354 (Jayalath et al., Feb. 9, 2017, "Wearable Architecture and Methods for Performance Monitoring, Analysis, and Feedback"), and 20200000378 (Jayalath et al., Jan. 2, 2020, "Wearable Architecture and Methods for Performance Monitoring, Analysis, and Feedback"), disclose techniques, fabrics, materials, systems, sensors, EMG sensors, circuitry, algorithms and methods for wearable monitoring devices and associated exercise devices. U.S. patent Ser. No. 10/143,405 (Jayalath et al., Dec. 4, 2018, "Wearable Performance Monitoring, Analysis, and Feedback Systems and Methods") and U.S. patent application publication 20140142459 (Jayalath et al., May 22, 2014, "Wearable Performance Monitoring, Analysis, and Feedback Systems and Methods") disclose techniques, systems, sensors, circuitry, algorithms and methods for wearable monitoring devices.

Another significant innovator with respect to clothing for human motion capture is Georgia Tech. Their work includes patent 6381482 (Jayaraman et al., Apr. 30, 2002, "Fabric or Garment with Integrated Flexible Information Infrastructure") which discloses a modular electronic garment. U.S. Pat. No. 6,687,523 (Jayaramen et al., Feb. 3, 2004, "Fabric or Garment with Integrated Flexible Information Infrastructure for Monitoring Vital Signs Of Infants") discloses an infant garment which ensures a snug fit for the baby so that the sensors stay in place to minimize the risk of false alarms. U.S. Pat. No. 6,970,731 (Jayaraman et al., Nov. 29, 2005, "Fabric-Based Sensor for Monitoring Vital Signs") discloses a woven or knitted fabric-based sensor for monitoring vital signs or other electrical impulses. U.S. Pat. No. 6,315,009 (Jayaraman et al., Nov. 13, 2001, "Full-Fashioned Garment with Sleeves Having Intelligence Capability") discloses a full-fashioned weaving process for the production of a woven garment which can accommodate and include sleeves. U.S. Pat. No. 6,145,551 (Jayaraman et al., Nov. 14, 2000, "Full-Fashioned Weaving Process for Production of a Woven Garment with Intelligence Capability") discloses a full-fashioned weaving process for the production of a woven garment which can accommodate and include holes.

Another significant innovator with respect to clothing for human motion capture is Thalmic Labs (North). Their work includes patent application publication 20140240223 (Lake et al., Aug. 28, 2014, "Method and Apparatus for Analyzing Capacitive EMG and IMU Sensor Signals for Gesture Control") which discloses a muscle interface device to control connected devices. U.S. patent application publication 20140240103 (Lake et al., Aug. 28, 2014, "Methods and Devices for Combining Muscle Activity Sensor Signals and Inertial Sensor Signals for Gesture-Based Control") discloses a wearable electronic EMG device for use with controllable connected devices.

Another significant innovator with respect to clothing for human motion capture is Bend Labs. Their work includes patent 9874431 (Reese, Jan. 23, 2018, "Angular Displacement Sensor of Compliant Material"), and U.S. patent application publications 20160033255 (Reese, Feb. 4, 2016, "Angular Displacement Sensor of Compliant Material") and 20170074637 (Reese, Mar. 16, 2017, "Angular Displacement Sensor of Compliant Material") which disclose multi-directional capacitive sensors. U.S. Pat. No. 9,612,102 (Reese et al., Apr. 4, 2017, "Compliant Multi-Region Angular Displacement and Strain Sensors"), and U.S. patent application publications 20160305759 (Reese et al., Oct. 20, 2016, "Compliant Multi-Region Angular Displacement and Strain Sensors") and 20170168567 (Reese et al., Jun. 15, 2017, "Compliant Multi-Region Angular Displacement and Strain Sensors") disclose angular displacement sensors and strain sensors multiple motion sensing regions.

Another significant innovator with respect to clothing for human motion capture is Harvard University. Their work includes patent 10527507 (Wood et al., Jan. 7, 2020, "Artificial Skin and Elastic Strain Sensor") and U.S. Pat. No. 9,797,791 (Vogt et al., Oct. 24, 2017, "Multi-Axis Force Sensing Soft Artificial Skin"), and U.S. patent application publication 20140238153 (Wood et al., Aug. 28, 2014, "Artificial Skin and Elastic Strain Sensor"), which disclose an elastic strain sensor with conductive fluid.

Another significant innovator with respect to clothing for human motion capture is CTRL-Labs. Their work includes patent application publication 20190228330 (Kaifosh et al., Jul. 25, 2019, "Handstate Reconstruction Based on Multiple Inputs") which discloses methods and systems for recognizing gestures using a plurality of neuromuscular sensors. U.S. patent Ser. No. 10/429,928 (Morun et al., Oct. 1, 2019, "Systems, Articles, and Methods for Capacitive Electromyography Sensors") and U.S. Pat. No. 10,362,958 (Morun et al., Jul. 30, 2019, "Systems, Articles, and Methods for Electromyography Sensors") disclose EMG sensors which coated with protective barriers and adapted to resistively couple to a user's skin.

Another significant innovator with respect to clothing for human motion capture is IBM. Their work includes patents 7771318 (Narayanaswami, Aug. 10, 2010, "Device for Monitoring a User's Posture") and U.S. Pat. No. 7,850,574 (Narayanaswami, Dec. 14, 2010, "Device for Monitoring a User's Posture") which disclose a wearable device which monitors a person's posture. U.S. patent application publication 20190117157 (Hu et al., Apr. 25, 2019, "Sensors Facilitating Monitoring of Living Entities") discloses methods of manufacturing optical strain sensors.

Another significant innovator with respect to clothing for human motion capture is Apple. Their work includes patent 10488936 (Baranski et al., Nov. 26, 2019, "Motion and Gesture Input from a Wearable Device"), and U.S. patent application publications 20160091980 (Baranski et al., Mar. 31, 2016, "Motion and Gesture Input from a Wearable Device") and 20190220099 (Baranski et al., Jul. 18, 2019, "Motion and Gesture Input from a Wearable Device") which disclose wearable devices with optical or EMG sensors that recognize gestures of a user's hand, arm, wrist, and fingers. U.S. patent application publication 20190310713 (Wang et al., Oct. 10, 2019, "Sensors for Electronic Finger Devices") discloses finger-mounted devices with strain sensors and/or ultrasonic sensors to measure finger movement.

Another significant innovator with respect to clothing for human motion capture is J-MEX. Their work includes patent 10172541 (Liao et al., Jan. 8, 2019, "Motion Recognition Device and Method") and U.S. patent application publication 20170086711 (Liao et al., Mar. 30, 2017, "Motion Recognition Device and Method") which disclose a motion recognition device with a first sense signal portion and a second sense signal portion different from the first sense signal portion.

Another significant innovator with respect to clothing for human motion capture is the University of Minnesota. Their work includes patents 9322121 (Dunne et al., Apr. 26, 2016, "Stitched Stretch Sensor"), U.S. Pat. No. 9,885,621 (Dunne et al., Feb. 6, 2018, "Stitched Stretch Sensor"), and U.S. Pat. No. 10,274,384 (Dunne et al., Apr. 30, 2019, "Stitched Stretch Sensor"), and U.S. patent application publication 20140238151 (Dunne et al., Aug. 28, 2014, "Stitched Stretch Sensor") which disclose a stitched sensor including a conductive thread, and the stitch geometry is configured such that an electrical property of the stitched sensor changes based on at least one of stretching, relaxation, or bending of the textile.

Another significant innovator with respect to clothing for human motion capture is Xenoma. Their work includes patent application publication 20190364983 (Nakajima et al., Dec. 5, 2019, "Wearable Device and Paper Pattern") which discloses a wearable device with sensors, at least one of which is on the front side and the back side respectively.

Another significant innovator with respect to clothing for human motion capture is Facebook. Their work includes patent 10197459 (Keller et al., Feb. 5, 2019, "Indexable Strain Sensor") which discloses a deformation sensing apparatus comprising an elastic substrate, a conductive element, and an additional conductive element. U.S. patent Ser. No. 10/502,643 (Keller et al., Dec. 10, 2019, "Resistive-Capacitive Deformation Sensor") and U.S. Pat. No. 10,067,007 (Keller et al., Sep. 4, 2018, "Resistive-Capacitive Deformation Sensor") disclose a deformation sensing apparatus which senses stain in two directions. U.S. Pat. No. 9,816,799 (Keller et al., Nov. 14, 2017, "Embroidered Strain Sensing Elements") discloses a deformation sensing fabric comprising a fabric substrate with a first fabric layer and a first conductive element woven into the first fabric layer.

Another significant innovator with respect to clothing for human motion capture is Footfalls and Heartbeats. Their work includes patent 10119208 (McMaster, Nov. 6, 2018, "Method for Making Electrically Conductive Textiles and Textile Sensor") which discloses a method for making a textile sensor which includes selecting yarn variables, stitch variables, and/or textile variables. U.S. patent Ser. No. 10/240,265 (McMaster, Mar. 26, 2019, "Method for Optimizing Contact Resistance in Electrically Conductive Textiles") discloses a method for optimizing contact resistance in electrically conductive yarns and textiles.

Another significant innovator with respect to clothing for human motion capture is Nextiles. Their work includes patent 10458866 (Sun, Oct. 29, 2019, "Methods of Manufacturing Devices for Static and Dynamic Body Measurements") which discloses a method of fabricating a sensor for static and dynamic body measurements. U.S. patent Ser. No. 10/378,975 (Sun, Aug. 13, 2019, "Systems, Methods, and Devices for Static and Dynamic Body Measurements") discloses systems and methods to measure static and dynamic forces of a body using sensors.

Other relevant art with respect to clothing for human motion capture includes the following. U.S. Pat. No. 9,850,600 (Gal, Dec. 26, 2017, "Sensor Garment and Methods of Making the Same") discloses IP sensor conductors with waveforms having legs that are substantially parallel throughout the operating range of stretch. U.S. Pat. No. 6,487,906 (Hock, Dec. 3, 2002, "Flexible Film Sensor System for Monitoring Body Motion") discloses a sequence of low force, high compliance, long extension, piezofilm-based sensors for a biofeedback system for self-monitoring of selected body motions. U.S. patent application publication 20170265810 (Van De Vyver, Sep. 21, 2017, "Elastic Sensor") discloses a stretchable sensor patch comprising an elastic film layer with a stretchability of at least 100% and at least one elastic DEAP strip.

U.S. patent application publication 20190046114 (Bogdanovich et al., Feb. 14, 2019, "Garment System Providing Biometric Monitoring") discloses a garment for monitoring biometric properties of the wearer. U.S. patent application publication 20200008715 (Schroeck et al., Jan. 9, 2020, "Rotation Monitoring System and Method") discloses a rotation monitoring system attached to a limb to identify ranges of motion associated with injuries or poor performance. U.S. patent application publication 20160287175 (Coleman et al., Oct. 6, 2016, "Sensitive, High-Strain, High-Rate, Bodily Motion Sensors Based on Conductive Nano-Material-Rubber Composites") discloses a process for producing conductive composites. U.S. patent application publication 20190185672 (Boland et al., Jun. 20, 2019, "Viscoelastic Conductive Nanomaterial-Polymer Nanocomposites and Sensing Devices Comprising the Composite Material") discloses a homogenous composite material with high strength.

U.S. Pat. No. 8,291,779 (Helmer et al., Oct. 23, 2012, "System and Garment for Detecting Movement") discloses a system for detecting movement of a limb or section of a limb. U.S. patent application publication 20150359455 (Hahami et al., Dec. 17, 2015, "Fiber Optic Shape Sensing Applications") discloses a fiber optic cable and interrogation circuitry. U.S. Pat. No. 8,348,865 (Jeong et al., Jan. 8, 2013, "Non-Intrusive Movement Measuring Apparatus and Method Using Wearable Electro-Conductive Fiber") discloses a non-intrusive movement measuring apparatus and method using wearable electro-conductive fibers. U.S. patent application publication 20170171965 (Youn et al., Jun. 15, 2017, "Stretchable Electronic Device and Method of Fabricating the Same") discloses a stretchable electronic device including a flexible substrate, a conductive fiber pattern formed on the flexible substrate, wherein the conductive fiber pattern has a repetitive circular structure.

U.S. patent application publication 20190342993 (Ahn et al., Nov. 7, 2019, "Stretchable Electronics and Method for Fabricating the Same") discloses stretchable electronics including a stretchable substrate, support patterns disposed on a surface of the stretchable substrate, and output devices disposed on the patterns. U.S. patent Ser. No. 10/065,074 (Hoang et al., Sep. 4, 2018~T=Training Systems with Wearable Sensors for Providing Users with Feedback") discloses a training system based on mobile technology and the kinematics of human motion which characterizes, analyzes, and supplies feedback to a user based on the user's movements. U.S. patent application publication 20120188158 (Tan et al., Jul. 26, 2012, "Wearable Electromyography-Based Human-Computer Interface") discloses a plurality of Electromyography (EMG) sensors comprising a human-computer interface (HCI) for interacting with computing systems.

U.S. Pat. No. 7,981,057 (Stewart, Jul. 19, 2011, "Joint Motion Sensing to Make a Determination of a Positional Change of an Individual") and U.S. Pat. No. 9,700,238 (Stewart, Jul. 11, 2017, "Joint Motion Sensing to Make a Determination of a Positional Change of an Individual") disclose one or more sensors that produce one or more signals based on one or more joint motions of an individual. U.S. Pat. No. 8,162,857 (Lanfermann et al., Apr. 24, 2012, "Limb Movement Monitoring System") and U.S. patent application publication 20100036288 (Lanfermann et al., Feb. 11, 2010, "Limb Movement Monitoring System") disclose a garment comprising spatially addressable photonic textiles. U.S. patent application publication 20190145752 (Zhu et al., May 16, 2019, "Highly Stretchable Strain Sensor for Human Motion Monitoring") discloses a method to assemble a highly stretchable and highly sensitive strain sensor.

U.S. patent application publication 20170347721 (Greenspan et al., Dec. 7, 2017, "Conductive Thread Stitched Stretch Sensor") discloses conductive thread stitched stretch sensors. U.S. patent application publication 20190390985 (Kwok et al., Dec. 26, 2019, "Real-Time Surface Shape Sensing for Flexible Structures") discloses a surface shape sensor in the form of a flexible and stretchable elastomeric substrate with strain/displacement sensing elements embedded in it. U.S. patent application publication 20190290198 (Belson et al., Sep. 26, 2019, "Systems and Methods for Monitoring Physical Therapy of the Knee and Other Joints") discloses systems, devices, and methods for post-surgical joint range of motion measurement, activity monitoring, as well as monitoring compliance.

SUMMARY OF THE INVENTION

This invention is an article of smart clothing or clothing accessory which automatically recognizes body configuration and motion. Body configuration includes body pose and joint angles. Body motion includes changes in body pose and joint angles. This article of smart clothing or clothing accessory includes inertial motion units which are distal relative to selected joints and also sets of strain sensors which span those joints. An inertial motion unit includes an accelerometer. A strain sensor includes an energy emitter, an energy receiver, and a flexible energy pathway between the energy emitter and the energy receiver which spans a joint. The type of energy transmitted through an energy pathway can be electrical energy or light energy.

The accuracy of inertial motion units alone is reduced by drift. The accuracy of strain sensors alone is lower for very small-scale or rapid motion. Combined multivariate analysis of data from both inertial motion units and strain sensors provides more accurate recognition of body configuration and motion than data from either alone.

INTRODUCTION TO THE FIGURES

DETAILED DESCRIPTION OF THE FIGURES

Figure 1:
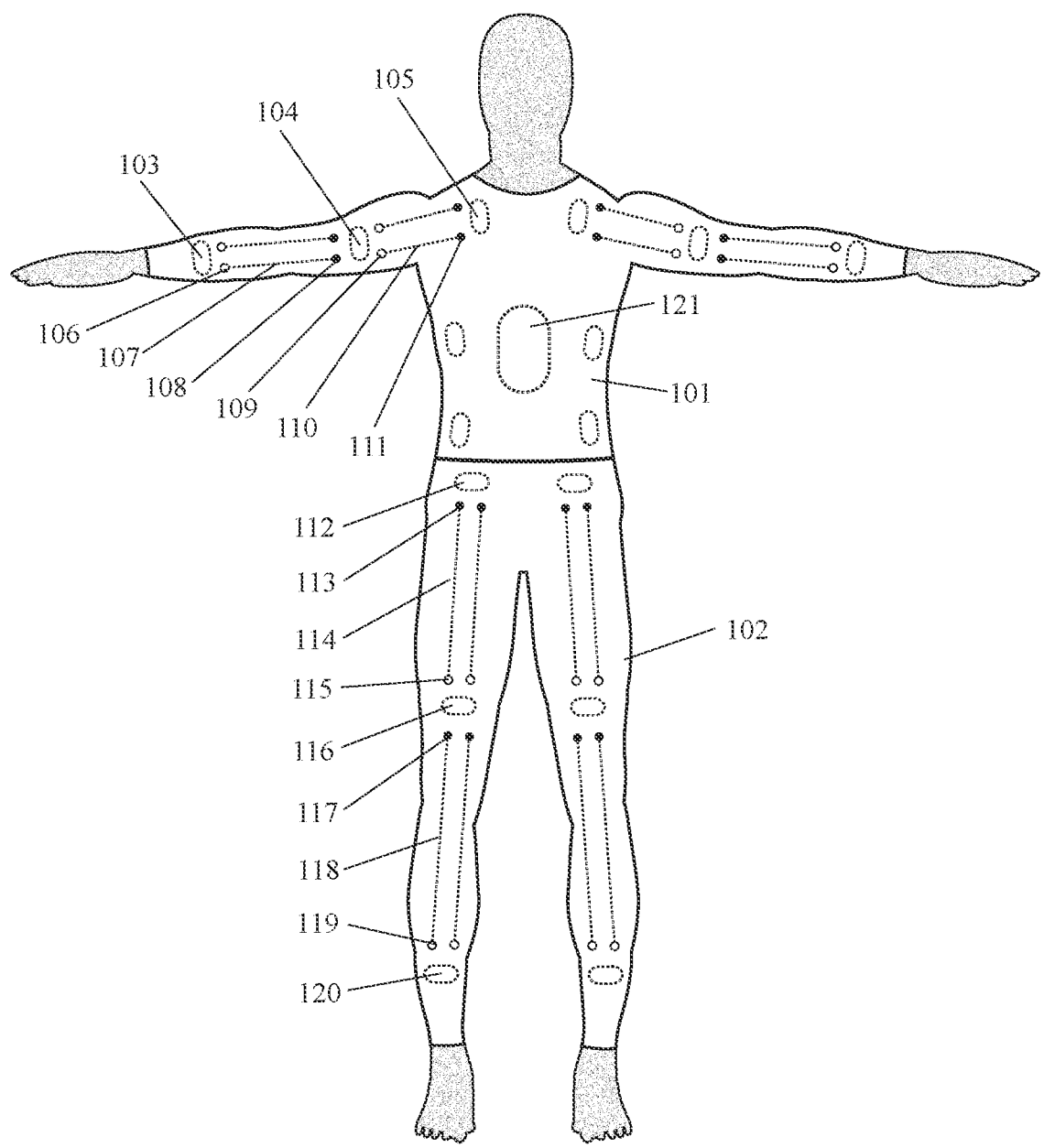
FIG. 1 shows an example of an article of clothing for recognizing body configuration and motion with inertial sensors and strain sensors (comprising energy emitters, flexible energy pathways, and energy receivers) wherein an energy emitter and an energy receiver are on opposite proximal and distal sides of a joint spanned by an energy pathway.
Figure 2:
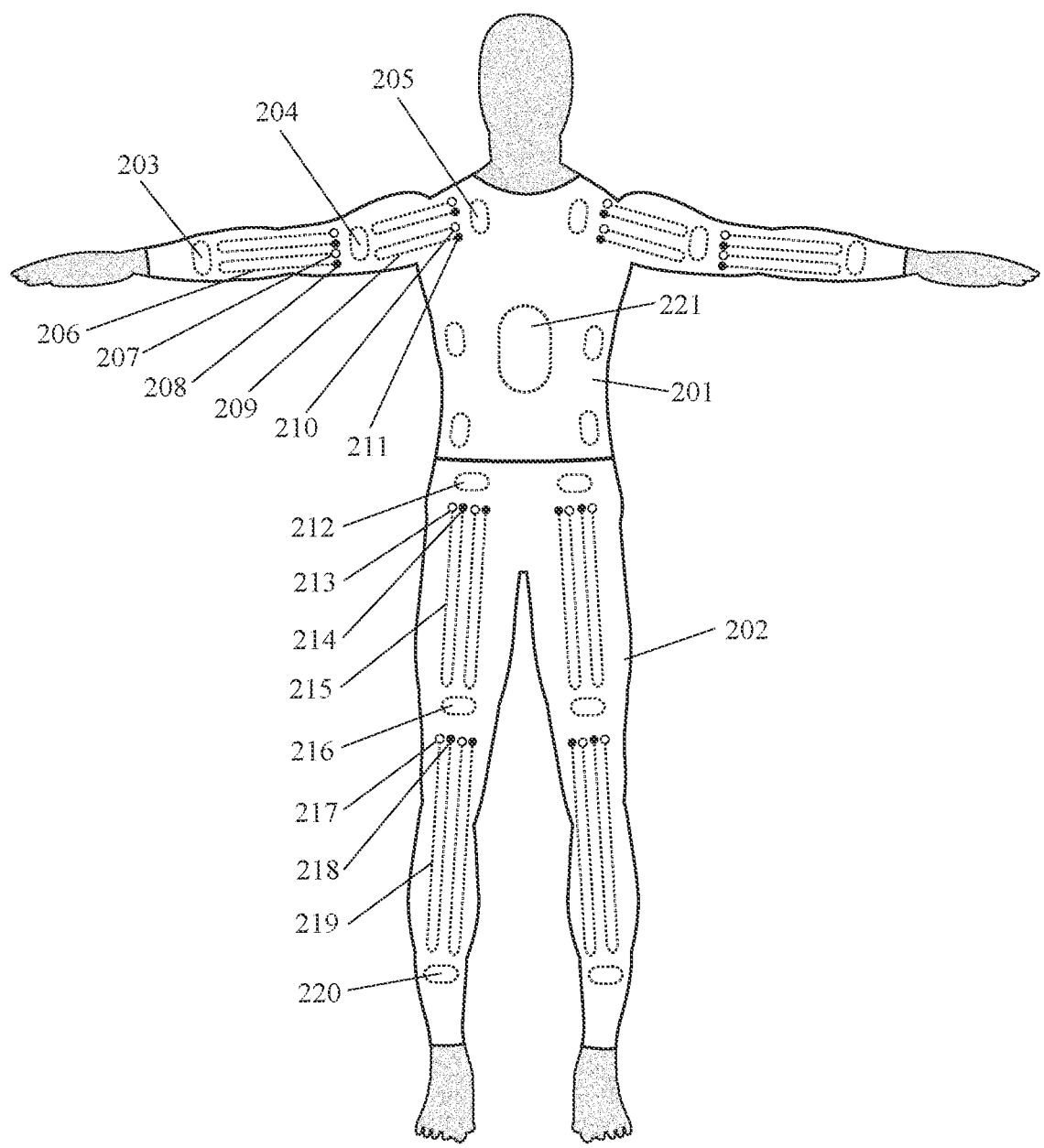
FIG. 2 shows an example of an article of clothing for recognizing body configuration and motion with inertial sensors and strain sensors (comprising energy emitters, looping flexible energy pathways, and energy receivers) wherein an energy emitter and an energy receiver are on the same proximal or distal side of a joint spanned by an energy pathway.
Figure 3:
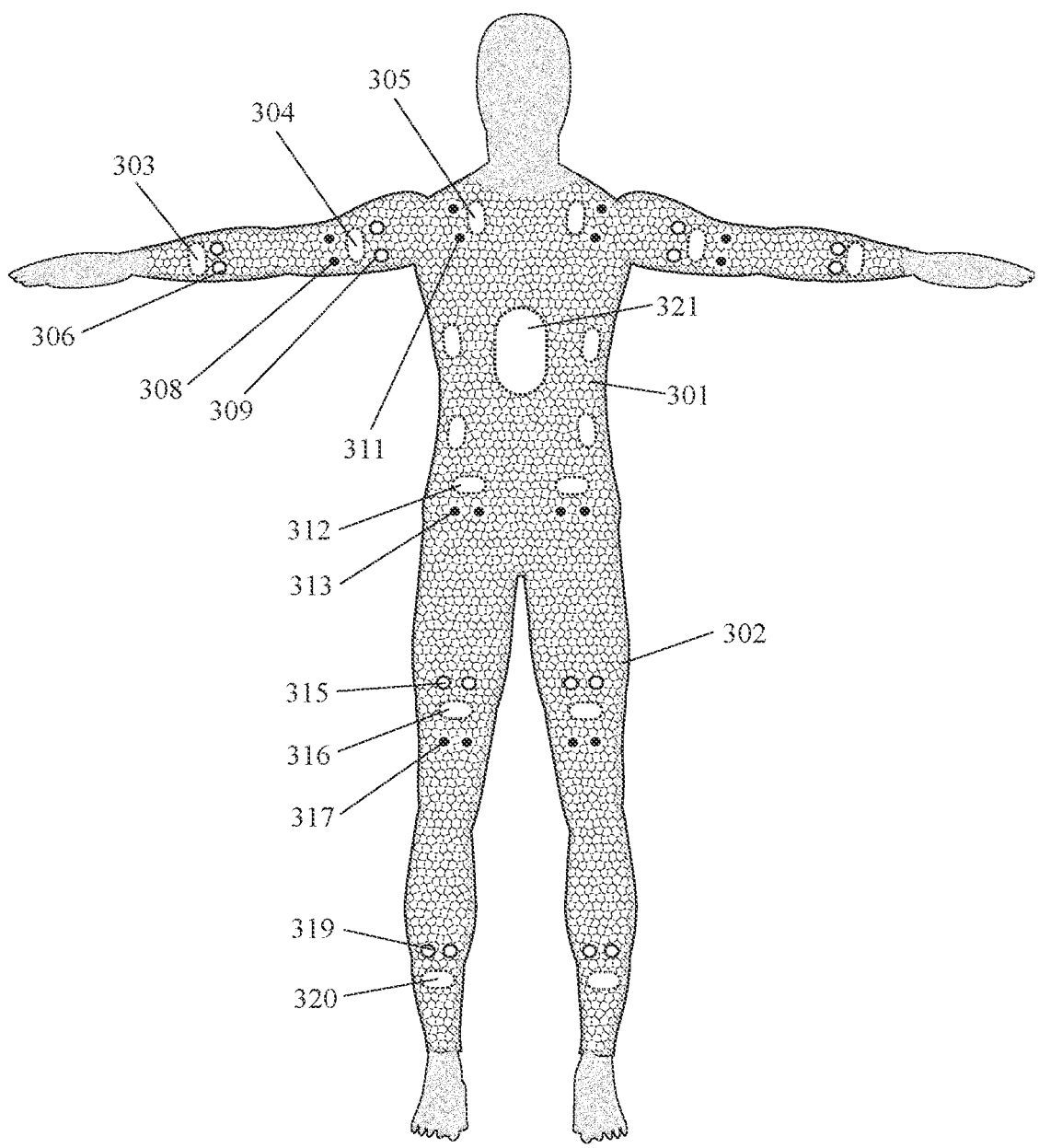
FIG. 3 shows an example of an article of clothing for recognizing body configuration and motion with inertial sensors and an energy-transmitting mesh.

FIGS. 1 through 3 show examples of how Motion Recognition Clothing™ can be embodied. Motion recognition clothing is smart clothing (or clothing accessories) which automatically recognizes (e.g. recognizes, identifies, tracks, monitors, and/or measures) body configuration (e.g. body pose, stance, position, and/or joint angles) and motion (e.g. changes in body pose, stance, position, and/or joint angles). Example variations discussed elsewhere in this disclosure or in priority-linked disclosures can also be applied where relevant to these examples.

FIG. 1 shows an example, an article of clothing (or clothing accessory) for recognizing (e.g. recognizing, identifying, tracking, monitoring, and/or measuring) body configuration (e.g. body pose, stance, position, and/or joint angles) and motion (e.g. changes in body pose, stance, position, and/or joint angles) comprising: (a) an article of clothing (e.g. a shirt or the upper portion of a full-body suit) which is configured to be at least partially worn on a person's arms and upper torso; (b) wherein the clothing further comprises a first inertial motion unit (e.g. accelerometer and/or gyroscope) which is configured to be distal relative to the person's elbow, wherein distal means further from the heart and proximal means closer to the heart when a person has their arms and legs extended; (c) wherein the clothing further comprises a second inertial motion unit (e.g. accelerometer and/or gyroscope) which is configured to be between the person's elbow and the person's shoulder; (d) wherein the clothing further comprises a third inertial motion unit (e.g. accelerometer and/or gyroscope) which is configured to be on the person's torso; (e) wherein the clothing further comprises a first set of one or more energy emitters which are configured to be distal relative to the person's elbow; (f) wherein the garment further comprises a second set of one or more energy emitters which are configured to be between the person's elbow and the person's shoulder; (g) wherein the garment further comprises a first set of one or more energy receivers which are configured to be between the person's elbow and the person's shoulder; (h) wherein the garment further comprises a second set of one or more energy receivers which are configured to be on the person's torso; (i) wherein the garment further comprises a first set of two or more flexible energy pathways (e.g. energy pathways, channels, and/or conductors) which transmit (e.g. transmit or conduct) energy from the first set of energy emitters to the first set of energy receivers, wherein different flexible energy pathways in the first set cross the elbow at different radial locations and/or angles; (j) wherein the garment further comprises a second set of two or more flexible energy pathways (e.g. energy pathways, channels, and/or conductors) which transmit (e.g. energy pathways, channels, and/or conductors) which transmit (e.g. transmit or conduct) energy from the second set of energy emitters to the second set of energy receivers, wherein different flexible energy pathways in the second set cross the shoulder at different radial locations and/or angles; wherein energy emitted by the energy emitters, transmitted through the energy pathways, and received by the energy receivers is selected from the group consisting of electrical energy, electromagnetic energy, light energy, sonic energy, and kinetic energy; and (k) a data processor; wherein data from the inertial motion sensors and data from the energy receivers are analyzed in the data processor to recognize (e.g. recognize, identify, track, monitor, and/or measure) the configuration and motion of the person's arms and torso.

The upper portion of FIG. 1 (generally above the person's waist level) shows an example, an article of clothing for recognizing (e.g. recognizing, identifying, tracking, monitoring, and/or measuring) body configuration (e.g. body pose, stance, position, and/or joint angles) and motion (e.g. changes in body pose, stance, position, and/or joint angles) comprising: (a) an article of clothing (e.g. a shirt or the upper portion of a full-body suit) 101 which is configured to be at least partially worn on a person's arms and upper torso; (b) wherein the clothing further comprises a first inertial motion unit (e.g. accelerometer and/or gyroscope) 103 which is configured to be distal relative to the person's elbow, wherein distal means further from the heart and proximal means closer to the heart when a person has their arms and legs extended; (c) wherein the clothing further comprises a second inertial motion unit (e.g. accelerometer and/or gyroscope) 104 which is configured to be between the person's elbow and the person's shoulder; (d) wherein the clothing further comprises a third inertial motion unit (e.g. accelerometer and/or gyroscope) 105 which is configured to be on the person's torso; (e) wherein the clothing further comprises a first set of one or more energy emitters, including energy emitter 106, which are configured to be distal relative to the person's elbow; (f) wherein the garment further comprises a second set of one or more energy emitters, including energy emitter 109, which are configured to be between the person's elbow and the person's shoulder; (g) wherein the garment further comprises a first set of one or more energy receivers, including energy receiver 108, which are configured to be between the person's elbow and the person's shoulder; (h) wherein the garment further comprises a second set of one or more energy receivers, including energy receiver 111, which are configured to be on the person's torso; (i) wherein the garment further comprises a first set of two or more flexible energy pathways (e.g. energy pathways, channels, and/or conductors), including energy pathway 107, which transmit (e.g. transmit or conduct) energy from the first set of energy emitters to the first set of energy receivers, wherein different flexible energy pathways in the first set cross the elbow at different radial locations and/or angles; (j) wherein the garment further comprises a second set of two or more flexible energy pathways (e.g. energy pathways, channels, and/or conductors), including energy pathway 110, which transmit (e.g. transmit or conduct) energy from the second set of energy emitters to the second set of energy receivers, wherein different flexible energy pathways in the second set cross the shoulder at different radial locations and/or angles; wherein energy emitted by the energy emitters, transmitted through the energy pathways, and received by the energy receivers is selected from the group consisting of electrical energy, electromagnetic energy, light energy, sonic energy, and kinetic energy; and (k) a data processor 121; wherein data from the inertial motion sensors and data from the energy receivers are analyzed in the data processor to recognize (e.g. recognize, identify, track, monitor, and/or measure) the configuration and motion of the person's arms and torso.

FIG. 1 also shows an article of clothing (or clothing accessory) for recognizing (e.g. recognizing, identifying, tracking, monitoring, and/or measuring) body configuration (e.g. body pose, stance, position, and/or joint angles) and motion (e.g. changes in body pose, stance, position, and/or joint angles) comprising: (a) an article of clothing (e.g. pants, shorts, or the lower portion of a full-body suit) which is configured to be at least partially worn on a person's legs and lower torso; (b) wherein the clothing further comprises a first inertial motion unit (e.g. accelerometer and/or gyroscope) which is configured to be distal relative to the person's knee, wherein distal means further from the heart and proximal means closer to the heart when a person has their arms and legs extended; (c) wherein the clothing further comprises a second inertial motion unit (e.g. accelerometer and/or gyroscope) which is configured to be between the person's knee and the person's hip; (d) wherein the clothing further comprises a third inertial motion unit (e.g. accelerometer and/or gyroscope) which is configured to be on the person's torso; (e) wherein the clothing further comprises a first set of one or more energy emitters which are configured to be distal relative to the person's knee; (f) wherein the garment further comprises a second set of one or more energy emitters which are configured to be between the person's knee and the person's hip; (g) wherein the garment further comprises a first set of one or more energy receivers which are configured to be between the person's knee and the person's hip; (h) wherein the garment further comprises a second set of one or more energy receivers which are configured to be on the person's torso; (i) wherein the garment further comprises a first set of two or more flexible energy pathways (e.g. energy pathways, channels, and/or conductors) which transmit (e.g. transmit or conduct) energy from the first set of energy emitters to the first set of energy receivers, wherein different flexible energy pathways in the first set cross the knee at different radial locations and/or angles; (j) wherein the garment further comprises a second set of two or more flexible energy pathways (e.g. energy pathways, channels, and/or conductors) which transmit (e.g. transmit or conduct) energy from the second set of energy emitters to the second set of energy receivers, wherein different flexible energy pathways in the second set cross the hip at different radial locations and/or angles; wherein energy emitted by the energy emitters, transmitted through the energy pathways, and received by the energy receivers is selected from the group consisting of electrical energy, electromagnetic energy, light energy, sonic energy, and kinetic energy; and (k) a data processor; wherein data from the inertial motion sensors and data from the energy receivers are analyzed in the data processor to recognize (e.g. recognize, identify, track, monitor, and/or measure) the configuration and motion of the person's legs and torso.

The lower portion of FIG. 1 (generally below the person's waist level) shows an example of an article of clothing for recognizing (e.g. recognizing, identifying, tracking, monitoring, and/or measuring) body configuration (e.g. body pose, stance, position, and/or joint angles) and motion (e.g. changes in body pose, stance, position, and/or joint angles) comprising: (a) an article of clothing (e.g. pants, shorts, or the lower portion of a full-body suit) 102 which is configured to be at least partially worn on a person's legs and lower torso; (b) wherein the clothing further comprises a first inertial motion unit (e.g. accelerometer and/or gyroscope) 120 which is configured to be distal relative to the person's knee, wherein distal means further from the heart and proximal means closer to the heart when a person has their arms and legs extended; (c) wherein the clothing further comprises a second inertial motion unit (e.g. accelerometer and/or gyroscope) 116 which is configured to be between the person's knee and the person's hip; (d) wherein the clothing further comprises a third inertial motion unit (e.g. accelerometer and/or gyroscope) 112 which is configured to be on the person's torso; (e) wherein the clothing further comprises a first set of one or more energy emitters, including energy emitter 119, which are configured to be distal relative to the person's knee; (f) wherein the garment further comprises a second set of one or more energy emitters, including energy emitter 115, which are configured to be between the person's knee and the person's hip; (g) wherein the garment further comprises a first set of one or more energy receivers, including energy receiver 117, which are configured to be between the person's knee and the person's hip; (h) wherein the garment further comprises a second set of one or more energy receivers, including energy receiver 113, which are configured to be on the person's torso; (i) wherein the garment further comprises a first set of two or more flexible energy pathways (e.g. energy pathways, channels, and/or conductors), including energy pathway 118, which transmit (e.g. transmit or conduct) energy from the first set of energy emitters to the first set of energy receivers, wherein different flexible energy pathways in the first set cross the knee at different radial locations and/or angles; (j) wherein the garment further comprises a second set of two or more flexible energy pathways (e.g. energy pathways, channels, and/or conductors), including energy pathway 114, which transmit (e.g. transmit or conduct) energy from the second set of energy emitters to the second set of energy receivers, wherein different flexible energy pathways in the second set cross the hip at different radial locations and/or angles; wherein energy emitted by the energy emitters, transmitted through the energy pathways, and received by the energy receivers is selected from the group consisting of electrical energy, electromagnetic energy, light energy, sonic energy, and kinetic energy; and (k) a data processor 121; wherein data from the inertial motion sensors and data from the energy receivers are analyzed in the data processor to recognize (e.g. recognize, identify, track, monitor, and/or measure) the configuration and motion of the person's legs.

In another example, an energy pathway can loop over a body joint (e.g. span the joint twice). FIG. 2 shows an article of clothing for recognizing (e.g. recognizing, identifying, tracking, monitoring, and/or measuring) body configuration (e.g. body pose, stance, position, and/or joint angles) and motion (e.g. changes in body pose, stance, position, and/or joint angles) can comprising: (a) an article of clothing (e.g. a shirt or the upper portion of a full-body suit) which is configured to be at least partially worn on a person's arms and upper torso; (b) wherein the clothing further comprises a first inertial motion unit (e.g. accelerometer and/or gyroscope) which is configured to be distal relative to the person's elbow, wherein distal means further from the heart and proximal means closer to the heart when a person has their arms and legs extended; (c) wherein the clothing further comprises a second inertial motion unit (e.g. accelerometer and/or gyroscope) which is configured to be between the person's elbow and the person's shoulder; (d) wherein the clothing further comprises a third inertial motion unit (e.g. accelerometer and/or gyroscope) which is configured to be on the person's torso; (e) wherein the clothing further comprises a first set of one or more energy emitters which are configured to be between the person's elbow and the person's shoulder; (f) wherein the garment further comprises a first set of one or more energy receivers which are configured to be between the person's elbow and the person's shoulder; (g) wherein the clothing further comprises a second set of one or more energy emitters which are configured to be on the person's torso; (h) wherein the garment further comprises a second set of one or more energy receivers which are configured to be on the person's torso; (i) wherein the garment further comprises a first set of two or more flexible energy pathways (e.g. energy pathways, channels, and/or conductors) which transmit (e.g. transmit or conduct) energy from the first set of energy emitters to the first set of energy receivers, wherein different flexible energy pathways in the first set cross the elbow at different radial locations and/or angles; (j) wherein the garment further comprises a second set of two or more flexible energy pathways (e.g. energy pathways, channels, and/or conductors) which transmit (e.g. transmit or conduct) energy from the second set of energy emitters to the second set of energy receivers, wherein different flexible energy pathways in the second set cross the shoulder at different radial locations and/or angles; wherein energy emitted by the energy emitters, transmitted through the energy pathways, and received by the energy receivers is selected from the group consisting of electrical energy, electromagnetic energy, light energy, sonic energy, and kinetic energy; and (k) a data processor; wherein data from the inertial motion sensors and data from the energy receivers are analyzed in the data processor to recognize (e.g. recognize, identify, track, monitor, and/or measure) the configuration and motion of the person's legs. Example variations discussed elsewhere in this disclosure or in priority-linked disclosures can also be applied where relevant to this example shown in FIG. 1.

The upper portion of FIG. 2 (generally above the person's waist level) shows an article of clothing for recognizing (e.g. recognizing, identifying, tracking, monitoring, and/or measuring) body configuration (e.g. body pose, stance, position, and/or joint angles) and motion (e.g. changes in body pose, stance, position, and/or joint angles) comprising: (a) an article of clothing (e.g. a shirt or the upper portion of a full-body suit) 201 which is configured to be at least partially worn on a person's arms and upper torso; (b) wherein the clothing further comprises a first inertial motion unit (e.g. accelerometer and/or gyroscope) 203 which is configured to be distal relative to the person's elbow, wherein distal means further from the heart and proximal means closer to the heart when a person has their arms and legs extended; (c) wherein the clothing further comprises a second inertial motion unit (e.g. accelerometer and/or gyroscope) 204 which is configured to be between the person's elbow and the person's shoulder; (d) wherein the clothing further comprises a third inertial motion unit (e.g. accelerometer and/or gyroscope) 205 which is configured to be on the person's torso; (e) wherein the clothing further comprises a first set of one or more energy emitters, including energy emitter 207, which are configured to be between the person's elbow and the person's shoulder; (f) wherein the garment further comprises a first set of one or more energy receivers, including energy receiver 208, which are configured to be between the person's elbow and the person's shoulder; (g) wherein the clothing further comprises a second set of one or more energy emitters, including energy emitter 210, which are configured to be on the person's torso; (h) wherein the garment further comprises a second set of one or more energy receivers, including energy receiver 211, which are configured to be on the person's torso; (i) wherein the garment further comprises a first set of two or more flexible energy pathways (e.g. energy pathways, channels, and/or conductors), including energy pathway 206, which transmit (e.g. transmit or conduct) energy from the first set of energy emitters to the first set of energy receivers, wherein different flexible energy pathways in the first set cross the elbow at different radial locations and/or angles; (j) wherein the garment further comprises a second set of two or more flexible energy pathways (e.g. energy pathways, channels, and/or conductors), including energy pathway 209, which transmit (e.g. transmit or conduct) energy from the second set of energy emitters to the second set of energy receivers, wherein different flexible energy pathways in the second set cross the shoulder at different radial locations and/or angles; wherein energy emitted by the energy emitters, transmitted through the energy pathways, and received by the energy receivers is selected from the group consisting of electrical energy, electromagnetic energy, light energy, sonic energy, and kinetic energy; and (k) a data processor 221; wherein data from the inertial motion sensors and data from the energy receivers are analyzed in the data processor to recognize (e.g. recognize, identify, track, monitor, and/or measure) the configuration and motion of the person's arms and torso.

FIG. 2 also shows an article of clothing for recognizing (e.g. recognizing, identifying, tracking, monitoring, and/or measuring) body configuration (e.g. body pose, stance, position, and/or joint angles) and motion (e.g. changes in body pose, stance, position, and/or joint angles) comprising: (a) an article of clothing (e.g. pants, shorts, or the lower portion of a full-body suit) which is configured to be at least partially worn on a person's legs and lower torso; (b) wherein the clothing further comprises a first inertial motion unit (e.g. accelerometer and/or gyroscope) which is configured to be distal relative to the person's knee, wherein distal means further from the heart and proximal means closer to the heart when a person has their arms and legs extended; (c) wherein the clothing further comprises a second inertial motion unit (e.g. accelerometer and/or gyroscope) which is configured to be between the person's knee and the person's hip; (d) wherein the clothing further comprises a third inertial motion unit (e.g. accelerometer and/or gyroscope) which is configured to be on the person's torso; (e) wherein the clothing further comprises a first set of one or more energy emitters which are configured to be between the person's knee and the person's hip; (f) wherein the garment further comprises a first set of one or more energy receivers which are configured to be between the person's knee and the person's hip; (g) wherein the garment further comprises a second set of one or more energy emitters which are configured to be on the person's torso; (h) wherein the garment further comprises a second set of one or more energy receivers which are configured to be on the person's torso; (i) wherein the garment further comprises a first set of two or more flexible energy pathways (e.g. energy pathways, channels, and/or conductors) which transmit (e.g. transmit or conduct) energy from the first set of energy emitters to the first set of energy receivers, wherein different flexible energy pathways in the first set cross the knee at different radial locations and/or angles; (j) wherein the garment further comprises a second set of two or more flexible energy pathways (e.g. energy pathways, channels, and/or conductors) which transmit (e.g. transmit or conduct) energy from the second set of energy emitters to the second set of energy receivers, wherein different flexible energy pathways in the second set cross the hip at different radial locations and/or angles; wherein energy emitted by the energy emitters, transmitted through the energy pathways, and received by the energy receivers is selected from the group consisting of electrical energy, electromagnetic energy, light energy, sonic energy, and kinetic energy; and (k) a data processor; wherein data from the inertial motion sensors and data from the energy receivers are analyzed in the data processor to recognize (e.g. recognize, identify, track, monitor, and/or measure) the configuration and motion of the person's legs.

The lower portion of FIG. 2 (generally below the person's waist level) shows an article of clothing for recognizing (e.g. recognizing, identifying, tracking, monitoring, and/or measuring) body configuration (e.g. body pose, stance, position, and/or joint angles) and motion (e.g. changes in body pose, stance, position, and/or joint angles) can comprise: (a) an article of clothing (e.g. pants, shorts, or the lower portion of a full-body suit) 201 which is configured to be at least partially worn on a person's legs and lower torso; (b) wherein the clothing further comprises a first inertial motion unit (e.g. accelerometer and/or gyroscope) 220 which is configured to be distal relative to the person's knee, wherein distal means further from the heart and proximal means closer to the heart when a person has their arms and legs extended; (c) wherein the clothing further comprises a second inertial motion unit (e.g. accelerometer and/or gyroscope) 216 which is configured to be between the person's knee and the person's hip; (d) wherein the clothing further comprises a third inertial motion unit (e.g. accelerometer and/or gyroscope) 212 which is configured to be on the person's torso; (e) wherein the clothing further comprises a first set of one or more energy emitters, including energy emitter 217, which are configured to be between the person's knee and the person's hip; (f) wherein the garment further comprises a first set of one or more energy receivers, including energy receiver 218, which are configured to be between the person's knee and the person's hip; (g) wherein the garment further comprises a second set of one or more energy emitters, including energy emitter 213, which are configured to be on the person's torso; (h) wherein the garment further comprises a second set of one or more energy receivers, including energy receiver 214, which are configured to be on the person's torso; (i) wherein the garment further comprises a first set of two or more flexible energy pathways (e.g. energy pathways, channels, and/or conductors), including energy pathway 219, which transmit (e.g. transmit or conduct) energy from the first set of energy emitters to the first set of energy receivers, wherein different flexible energy pathways in the first set cross the knee at different radial locations and/or angles; (j) wherein the garment further comprises a second set of two or more flexible energy pathways (e.g. energy pathways, channels, and/or conductors), including energy pathway 215, which transmit (e.g. transmit or conduct) energy from the second set of energy emitters to the second set of energy receivers, wherein different flexible energy pathways in the second set cross the hip at different radial locations and/or angles; wherein energy emitted by the energy emitters, transmitted through the energy pathways, and received by the energy receivers is selected from the group consisting of electrical energy, electromagnetic energy, light energy, sonic energy, and kinetic energy; and (k) a data processor; wherein data from the inertial motion sensors and data from the energy receivers are analyzed in the data processor to recognize (e.g. recognize, identify, track, monitor, and/or measure) the configuration and motion of the person's legs. Example variations discussed elsewhere in this disclosure or in priority-linked disclosures can also be applied where relevant to this example shown in FIG. 2.

FIG. 3 shows an article of clothing (or clothing accessory) for recognizing (e.g. recognizing, identifying, tracking, monitoring, and/or measuring) body configuration (e.g. body pose, stance, position, and/or joint angles) and motion (e.g. changes in body pose, stance, position, and/or joint angles) comprising: (a) an article of clothing (e.g. a shirt or the upper portion of a full-body suit) which is configured to be at least partially worn on a person's arms and upper torso; (b) wherein the clothing further comprises a first inertial motion unit (e.g. accelerometer and/or gyroscope) which is configured to be distal relative to the person's elbow, wherein distal means further from the heart and proximal means closer to the heart when a person has their arms and legs extended; (c) wherein the clothing further comprises a second inertial motion unit (e.g. accelerometer and/or gyroscope) which is configured to be between the person's elbow and the person's shoulder; (d) wherein the clothing further comprises a third inertial motion unit (e.g. accelerometer and/or gyroscope) which is configured to be on the person's torso; (e) wherein the clothing further comprises a first set of one or more energy emitters which are configured to be distal relative to the person's elbow; (f) wherein the garment further comprises a second set of one or more energy emitters which are configured to be between the person's elbow and the person's shoulder; (g) wherein the garment further comprises a first set of one or more energy receivers which are configured to be between the person's elbow and the person's shoulder; (h) wherein the garment further comprises a second set of one or more energy receivers which are configured to be on the person's torso; (i) wherein the garment further comprises an energy transmitting mesh which transmits (e.g. transmits or conducts) energy from energy emitters to energy receivers; wherein energy emitted by the energy emitters, transmitted through the mesh, and received by the energy receivers is selected from the group consisting of electrical energy, electromagnetic energy, light energy, sonic energy, and kinetic energy; and (j) a data processor; wherein data from the inertial motion sensors and data from the energy receivers are analyzed in the data processor to recognize (e.g. recognize, identify, track, monitor, and/or measure) the configuration and motion of the person's arms and torso.

The upper portion of FIG. 3 (generally above the person's waist level) shows an example, an article of clothing for recognizing (e.g. recognizing, identifying, tracking, monitoring, and/or measuring) body configuration (e.g. body pose, stance, position, and/or joint angles) and motion (e.g. changes in body pose, stance, position, and/or joint angles) can comprising: (a) an article of clothing (e.g. a shirt or the upper portion of a full-body suit) 301 which is configured to be at least partially worn on a person's arms and upper torso; (b) wherein the clothing further comprises a first inertial motion unit (e.g. accelerometer and/or gyroscope) 303 which is configured to be distal relative to the person's elbow, wherein distal means further from the heart and proximal means closer to the heart when a person has their arms and legs extended; (c) wherein the clothing further comprises a second inertial motion unit (e.g. accelerometer and/or gyroscope) 304 which is configured to be between the person's elbow and the person's shoulder; (d) wherein the clothing further comprises a third inertial motion unit (e.g. accelerometer and/or gyroscope) 305 which is configured to be on the person's torso; (e) wherein the clothing further comprises a first set of one or more energy emitters, including energy emitter 306, which are configured to be distal relative to the person's elbow; (f) wherein the garment further comprises a second set of one or more energy emitters, including energy emitter 309, which are configured to be between the person's elbow and the person's shoulder; (g) wherein the garment further comprises a first set of one or more energy receivers, including energy receiver 308, which are configured to be between the person's elbow and the person's shoulder; (h) wherein the garment further comprises a second set of one or more energy receivers, including energy receiver 311, which are configured to be on the person's torso; (i) wherein the garment further comprises an energy transmitting mesh which transmits (e.g. transmits or conducts) energy from energy emitters to energy receivers; wherein energy emitted by the energy emitters, transmitted through the mesh, and received by the energy receivers is selected from the group consisting of electrical energy, electromagnetic energy, light energy, sonic energy, and kinetic energy; and (j) a data processor 321; wherein data from the inertial motion sensors and data from the energy receivers are analyzed in the data processor to recognize (e.g. recognize, identify, track, monitor, and/or measure) the configuration and motion of the person's arms and torso.

FIG. 3 also shows an article of clothing (or clothing accessory) for recognizing (e.g. recognizing, identifying, tracking, monitoring, and/or measuring) body configuration (e.g. body pose, stance, position, and/or joint angles) and motion (e.g. changes in body pose, stance, position, and/or joint angles) comprising: (a) an article of clothing (e.g. pants, shorts, or the lower portion of a full-body suit) which is configured to be at least partially worn on a person's legs and lower torso; (b) wherein the clothing further comprises a first inertial motion unit (e.g. accelerometer and/or gyroscope) which is configured to be distal relative to the person's knee, wherein distal means further from the heart and proximal means closer to the heart when a person has their arms and legs extended; (c) wherein the clothing further comprises a second inertial motion unit (e.g. accelerometer and/or gyroscope) which is configured to be between the person's knee and the person's hip; (d) wherein the clothing further comprises a third inertial motion unit (e.g. accelerometer and/or gyroscope) which is configured to be on the person's torso; (e) wherein the clothing further comprises a first set of one or more energy emitters which are configured to be distal relative to the person's knee; (f) wherein the garment further comprises a second set of one or more energy emitters which are configured to be between the person's knee and the person's hip; (g) wherein the garment further comprises a first set of one or more energy receivers which are configured to be between the person's knee and the person's hip; (h) wherein the garment further comprises a second set of one or more energy receivers which are configured to be on the person's torso; (i) wherein the garment further comprises an energy transmitting mesh which transmits (e.g. transmits or conducts) energy from energy emitters to energy receivers; wherein energy emitted by the energy emitters, transmitted through the mesh, and received by the energy receivers is selected from the group consisting of electrical energy, electromagnetic energy, light energy, sonic energy, and kinetic energy; and (j) a data processor; wherein data from the inertial motion sensors and data from the energy receivers are analyzed in the data processor to recognize (e.g. recognize, identify, track, monitor, and/or measure) the configuration and motion of the person's legs.

The lower portion of FIG. 3 (generally below the person's waist level) shows an example of an article of clothing for recognizing (e.g. recognizing, identifying, tracking, monitoring, and/or measuring) body configuration (e.g. body pose, stance, position, and/or joint angles) and motion (e.g. changes in body pose, stance, position, and/or joint angles) comprising: (a) an article of clothing (e.g. pants, shorts, or the lower portion of a full-body suit) 302 which is configured to be at least partially worn on a person's legs and lower torso; (b) wherein the clothing further comprises a first inertial motion unit (e.g. accelerometer and/or gyroscope) 320 which is configured to be distal relative to the person's knee, wherein distal means further from the heart and proximal means closer to the heart when a person has their arms and legs extended; (c) wherein the clothing further comprises a second inertial motion unit (e.g. accelerometer and/or gyroscope) 316 which is configured to be between the person's knee and the person's hip; (d) wherein the clothing further comprises a third inertial motion unit (e.g. accelerometer and/or gyroscope) 312 which is configured to be on the person's torso; (e) wherein the clothing further comprises a first set of one or more energy emitters, including energy emitter 119, which are configured to be distal relative to the person's knee; (f) wherein the garment further comprises a second set of one or more energy emitters, including energy emitter 115, which are configured to be between the person's knee and the person's hip; (g) wherein the garment further comprises a first set of one or more energy receivers, including energy receiver 117, which are configured to be between the person's knee and the person's hip; (h) wherein the garment further comprises a second set of one or more energy receivers, including energy receiver 113, which are configured to be on the person's torso; (i) wherein the garment further comprises an energy transmitting mesh which transmits (e.g. transmits or conducts) energy from energy emitters to energy receivers; wherein energy emitted by the energy emitters, transmitted through the mesh, and received by the energy receivers is selected from the group consisting of electrical energy, electromagnetic energy, light energy, sonic energy, and kinetic energy; and (j) a data processor 321; wherein data from the inertial motion sensors and data from the energy receivers are analyzed in the data processor to recognize (e.g. recognize, identify, track, monitor, and/or measure) the configuration and motion of the person's legs. Example variations discussed elsewhere in this disclosure or in priority-linked disclosures can also be applied where relevant to this example shown in FIG. 3.

In an example, an article of clothing (or clothing accessory) for recognizing body configuration and motion can comprise: (a) a plurality of flexible energy pathways which span at least one body joint from a location which is proximal relative to the joint center to a location which is distal relative to the joint center, wherein proximal is defined as being closer to the heart and distal is defined as being further from the heart, and wherein these flexible energy pathways are integrated into the article of clothing or clothing accessory; (b) a plurality of energy emitters which emit energy into the flexible energy pathways; (c) a plurality of energy sensors which measure energy transmission through the flexible energy pathways, wherein joint motion is estimated and/or modeled based on changes in energy transmission through the flexible energy pathways; and (d) a plurality of inertial sensors which are integrated into the article of clothing or clothing accessory.

In an example, a type of energy which is transmitted through the energy pathways can be electrical energy and/or electromagnetic energy. In an example, a type of energy which is transmitted through the energy pathways can be light energy. In an example, a plurality of inertial sensors (e.g. inertial motion units) can be at locations which are distal to spanned body joints. In an example, an inertial sensor (e.g. inertial motion unit) can be selected from the group consisting of: accelerometer, gyroscope, and inclinometer. In an example, data from energy sensors (e.g. energy receivers) can be used to calibrate measurement of body configuration and motion which is based on data from the inertial sensors (e.g. inertial motion units).

In an example, an article of clothing for recognizing body configuration and motion can comprise: an article of clothing which is configured to be at least partially worn on a person's arms and upper torso; wherein the clothing further comprises a first inertial motion unit which is configured to be distal relative to the person's elbow, wherein distal means further from the heart and proximal means closer to the heart when a person has their arms and legs extended; wherein the clothing further comprises a second inertial motion unit which is configured to be between the person's elbow and the person's shoulder; wherein the clothing further comprises a third inertial motion unit which is configured to be on the person's torso; wherein the clothing further comprises a first set of one or more energy emitters which are configured to be distal relative to the person's elbow; wherein the garment further comprises a second set of one or more energy emitters which are configured to be between the person's elbow and the person's shoulder; wherein the garment further comprises a first set of one or more energy receivers which are configured to be between the person's elbow and the person's shoulder; wherein the garment further comprises a second set of one or more energy receivers which are configured to be on the person's torso; wherein the garment further comprises a first set of two or more flexible energy pathways which transmit energy from the first set of energy emitters to the first set of energy receivers, wherein different flexible energy pathways in the first set cross the elbow at different radial locations and/or angles; wherein the garment further comprises a second set of two or more flexible energy pathways which transmit energy from the second set of energy emitters to the second set of energy receivers, wherein different flexible energy pathways in the second set cross the shoulder at different radial locations and/or angles; wherein energy emitted by energy emitters, transmitted through energy pathways, and received by energy receivers is selected from the group consisting of electrical energy, electromagnetic energy, light energy, sonic energy, and kinetic energy; and a data processor, wherein data from inertial motion sensors and data from energy receivers are analyzed in the data processor to recognize the configuration and motion of the person's arms and torso.

In another example, an energy pathway can loop over a body joint and/or span the joint twice. In an example, an energy emitter which transmits energy into an energy pathway can be on the same side of a joint as the energy receiver which receives energy from the energy pathway.

In an example: an energy pathway can transmit electrical energy; a middle portion of the energy pathway can have a first level of electroconductivity, electrical resistance, and/or electrical capacitance; one or both end portions of the energy pathway can have a second level of electroconductivity, electrical resistance and/or electrical capacitance; and the second level can be greater than the first level. In an example: an energy pathway can be configured to span a body joint; a first portion of the energy pathway which is closest to the body joint can have a first level of electroconductivity, electrical resistance, and/or electrical capacitance; one or more second portions of the energy pathway can have a second level of electroconductivity, electrical resistance and/or electrical capacitance; and the second level can be greater than the first level.

In an example: an energy pathway can transmit light energy; a middle portion of the energy pathway can have a first level of light transmittance and/or transmissivity; one or both end portions of the energy pathway can have a second level of light transmittance and/or transmissivity; and the second level can be greater than the first level. In an example: an energy pathway can be configured to span a body joint; a first portion of the energy pathway which is closest to the body joint can have a first level of light transmittance and/or transmissivity; one or more second portions of the energy pathway can have a second level of light transmittance and/or transmissivity; and the second level can be greater than the first level.

In an example, the first inertial motion unit can be distal relative to the first set of energy pathways. In an example, the first inertial motion unit can be distal relative to the first set of energy emitters. In an example, an inertial motion unit can be on the ventral side of an arm or leg and an energy pathway can be on the ventral side of the arm or leg. In an example, an inertial motion unit can be on the dorsal side of an arm or leg and an energy pathway can be on the dorsal side of the arm or leg. In an example, an inertial motion unit can be on the ventral side of an arm or leg and an energy pathway can be on the dorsal side of the arm or leg. In an example, an inertial motion unit can be on the dorsal side of an arm or leg and an energy pathway can be on the ventral side of the arm or leg.

In an example, an article of clothing for recognizing body configuration and motion can comprise: an article of clothing which is configured to be at least partially worn on a person's arms and upper torso; wherein the clothing further comprises a first inertial motion unit which is configured to be distal relative to the person's elbow, wherein distal means further from the heart and proximal means closer to the heart when a person has their arms and legs extended; wherein the clothing further comprises a second inertial motion unit which is configured to be between the person's elbow and the person's shoulder; wherein the clothing further comprises a third inertial motion unit which is configured to be on the person's torso; wherein the clothing further comprises a first set of one or more energy emitters which are configured to be distal relative to the person's elbow; wherein the garment further comprises a second set of one or more energy emitters which are configured to be between the person's elbow and the person's shoulder; wherein the garment further comprises a first set of one or more energy receivers which are configured to be between the person's elbow and the person's shoulder; wherein the garment further comprises a second set of one or more energy receivers which are configured to be on the person's torso; wherein the garment further comprises an energy transmitting mesh which transmits energy from energy emitters to energy receivers; wherein energy emitted by the energy emitters, transmitted through the mesh, and received by the energy receivers is selected from the group consisting of electrical energy, electromagnetic energy, light energy, sonic energy, and kinetic energy; and a data processor, wherein data from the inertial motion sensors and data from the energy receivers are analyzed in the data processor to recognize the configuration and motion of the person's arms and torso.

In an example, an article of clothing for recognizing body configuration and motion can comprise: a plurality of flexible energy pathways which span at least one body joint from a location which is proximal relative to the joint center to a location which is distal relative to the joint center, wherein proximal is defined as being closer to the heart and distal is defined as being further from the heart, and wherein these flexible energy pathways are integrated into the article of clothing or clothing accessory; a plurality of energy emitters which emit energy into the flexible energy pathways; a plurality of energy sensors which measure energy transmission through the flexible energy pathways; and a plurality of inertial sensors which are integrated into the article of clothing or clothing accessory.

In an example, the type of energy which is transmitted through the energy pathways can be electrical energy and/or electromagnetic energy. In an example, the type of energy which is transmitted through the energy pathways can be light energy. In an example, inertial sensors can be at locations which are distal to spanned body joints. In an example, an inertial sensor can be selected from the group consisting of: accelerometer, gyroscope, and inclinometer. In an example, data from the energy sensors can be used to calibrate measurement of body configuration and motion based on data from the inertial sensors.

In an example, a first inertial motion unit can be at a location in the range of 2 to 6 inches in a distal direction from a person's elbow. In an example, a first inertial motion unit can be at a location in the range of 4 to 12 inches in a distal direction from a person's elbow. In an example, a second inertial motion unit can be at a location n the range of 2 to 6 inches in a distal direction from a person's shoulder. In an example, a second inertial motion unit can be at a location in the range of 4 to 12 inches in a distal direction from a person's shoulder.

In an example, a first set of energy emitters can be in the range of 2 to 6 inches in a distal direction from a person's elbow. In an example, a first set of energy emitters can be in the range of 4 to 12 inches in a distal direction from a person's elbow. In an example, a second set of energy emitters can be in the range of 2 to 6 inches in a distal direction from a person's shoulder. In an example, a second set of energy emitters can be in the range of 4 to 12 inches in a distal direction from a person's shoulder.

In an example, a first set of energy receivers can be in the range of 2 to 6 inches in a proximal direction from a person's elbow. In an example, a first set of energy receivers can be in the range of 4 to 12 inches in a proximal direction from a person's elbow. In an example, a second set of energy receivers can be in the range of 2 to 6 inches in a proximal direction from a person's shoulder. In an example, a second set of energy receivers can be in the range of 4 to 12 inches in a proximal direction from a person's shoulder.

In an example, an energy pathway can loop over a body joint and/or span the joint twice. In an example, an energy pathway can span a body joint in a proximal direction, loop around, and then span the body joint in a distal direction. In an example, an energy pathway can span a body joint in a distal direction, loop around, and then span the body joint in a proximal direction. In an example, an energy emitter which transmits energy into an energy pathway can be on the distal side of a joint and an energy receiver which receives energy from the energy pathway can also be on the distal side of the joint.

In an example, an energy emitter which transmits energy into an energy pathway can be on the proximal side of a joint and an energy receiver which receives energy from the energy pathway can also be on the proximal side of the joint. In an example, a middle portion of an energy pathway can be the middle third of the pathway, along the longitudinal axis of the pathway. In an example, the ends of an energy pathway can be the proximal third and the distal third of the pathway, along the longitudinal axis of the pathway. In an example, the non-middle portions of an energy pathway can be the proximal third and the distal third of the pathway, along the longitudinal axis of the pathway.

In an example, the portion of an energy pathway which is closest to a body joint can be a 2 to 4 inch span of the energy pathway which is within 2 to 6 inches of the joint. In an example, the portion of an energy pathway which is closest to a body joint can be a 2 to 4 inch span of the energy pathway which is within 2 to 6 inches of the surface of a person's body which covers the joint. In an example, the portion of an energy pathway which is closest to a body joint can be a 2 to 6 inch span of the energy pathway which is within 2 to 8 inches of the joint. In an example, the portion of an energy pathway which is closest to a body joint can be a 2 to 6 inch span of the energy pathway which is within 2 to 8 inches of the surface of a person's body which covers the joint.

In an example, an article of clothing can have right and left side symmetry. In an example, an article of clothing can have a configuration of sensors which is specified above on both the right and left sides of a person's body. In an example, an article of clothing can have a configuration of sensors which is specified above on both a person's right and left arms. In an example, a configuration of sensors specified above for one side (e.g. right or left) of a person's body which is spanned by an article of clothing can also be applied to the other (e.g. left or right) side of the person's body.

In an example, energy pathways which measure the motion and/or configuration of one or more body joints can be incorporated into an article of clothing (or clothing accessory) selected from the group consisting of: an upper body garment such as a shirt, t-shirt, blouse, jacket, hoodie, sweatshirt, undershirt, brassier, girdle, blouse, or glove; a lower body garment such as a pair of pants, sweatpants, trousers, slacks, leggings, tights, underpants, pantyhose, shorts, or sock; a full-body garment such as a union suit, jump suit, pair of overalls, or dress; a clothing accessory such as shoe, boot, insole, hat, cap, headband, armband, strap, torso band, tubular accessory, wristband, other band, knee or elbow brace, back brace, knee or elbow pad, belt, bandage, electronic tattoo, or wearable patch.

In an example, an article of clothing (or clothing accessory) can be selected from the group consisting of: ankle band, ankle tube, arm band, arm tube, belt, bra, collar, elbow pad, elbow tube, finger tube, girdle, glove, hip pad, hoodie, knee pad, knee tube, neck band, other wearable top, pair of pants, shirt, shoe, shorts, shoulder pad, shoulder tube, sock, suit, torso band, torso tube, underwear, union suit, waist band, and waist tube. In an example, an article of clothing (or clothing accessory) can be selected from the group consisting of: a shirt, a pair of shorts, a pair of pants, and a full-body suit.

In an example, an article of clothing (or clothing accessory) can comprise: a shirt with distal cuffs or elastic bands; and inertial motion units and/or energy pathways sewn or woven into the distal cuffs or elastic bands. In an example, an article of clothing (or clothing accessory) can comprise: a pair of pants with distal cuffs or elastic bands; and inertial motion units and/or energy pathways which are sewn or woven into the distal cuffs or elastic bands.

In an example, an article of clothing (or clothing accessory) can span the surface of the portion of the body containing one or more body joints selected from the group consisting of: ankle, elbow, finger, forearm, hip, jaw, knee, mid-tarsal, neck, shoulder, spine, thumb, toe, and wrist. In an example, an article of clothing (or clothing accessory) can span the surface of a body member containing the finger and thumb. In an example, an article of clothing (or clothing accessory) can span the surface of a body member containing the finger, forearm, thumb and wrist. In an example, an article of clothing (or clothing accessory) can span the surface of a body member containing the elbow, forearm and wrist. In an example, an article of clothing (or clothing accessory) can span the surface of a body member containing the elbow.

In an example, an article of clothing (or clothing accessory) can span the surface of the body containing the elbow, forearm, shoulder and spine. In an example, an article of clothing (or clothing accessory) can span the surface of a body member containing the hip and knee. In an example, an article of clothing (or clothing accessory) can span the surface of a body member containing the spine. In an example, an article of clothing (or clothing accessory) can span the surface of a body member containing the ankle, mid-tarsal and toe. In an example, an article of clothing (or clothing accessory) can span the surface of the portion of the body containing the neck, shoulder and spine.

In an example, an article of clothing (or clothing accessory) can be a shirt. In an example, an article of clothing (or clothing accessory) can be selected from the group consisting of: a shirt, a pair of shorts, a pair of pants, and a full-body suit. In an example, an article of clothing (or clothing accessory) can be selected from the group consisting of: ankle band, ankle tube, arm band, arm tube, belt, bra, collar, elbow pad, elbow tube, finger tube, girdle, glove, hip pad, hoodie, knee pad, knee tube, neck band, other wearable top, pair of pants, shirt, shoe, shorts, shoulder pad, shoulder tube, sock, suit, torso band, torso tube, underwear, union suit, waist band, and waist tube.

In an example, an article of clothing (or clothing accessory) for recognizing body motion and/or configuration can be an upper body garment such as a shirt, a jacket, or a smart bra. In an example, an article of clothing (or clothing accessory) which is at least partially worn on a person's arms and torso can be a shirt, a jacket, or a full-body suit or uniform. In an example, an article of clothing (or clothing accessory) for recognizing body motion and/or configuration can be a lower body garment such as a pair of pants or shorts. In an example, an article of clothing (or clothing accessory) which is at least partially worn on a person's legs and torso can be a pair of pants or shorts, or a full-body suit or uniform.

In an example, an inertial motion unit can be an inertial sensor. In an example, an inertial motion unit or sensor can comprise an accelerometer. In an example, an inertial motion unit or sensor can comprise an accelerometer and a gyroscope. In an example, an inertial motion unit or sensor can comprise an accelerometer, a gyroscope, and an inclinometer. In an example, an inertial motion units or sensors can be removed from an article of clothing for washing. In an example, an article of clothing can further comprise a pockets or pouches into which inertial motion units or sensors can be removably inserted.

In an example, an inertial motion unit can be an accelerometer. In an example, an inertial motion unit can also include a gyroscope. In an example, an inertial motion unit can also include a magnetometer. In an example, an inertial motion unit can also include an inclinometer. In an example, an inertial motion unit can comprise a Fiber Bragg Grating (FBG) sensor. In an example, an inertial motion unit can comprise one or more components selected from the group consisting of: accelerometer; gyroscope; magnetometer; inclinometer; and Fiber Bragg Grating (FBG) sensor. In an example, an inertial motion unit can measure one or more parameters concerning motion of a person's body, wherein these one or more parameters are selected from the group consisting of: acceleration, inclination, orientation, rotation, velocity, flexion, extension, torsion, and rotation.

In an example, a first inertial motion unit can be located closer to an ankle than to a knee. In an example, a first inertial motion unit can be located on the dorsal side of an arm or leg. In an example, a second inertial motion unit can be located closer to a knee than to a hip. In an example, a second inertial motion unit can be located on the dorsal side of an arm or leg. In an example, a second inertial motion unit can be located on the ventral side of an arm or leg. In an example, a second inertial motion unit can be located on the opposite side of an arm or leg as an energy pathway in a second set of energy pathways. In an example, a first inertial motion unit can be located on the ventral side of an arm or leg.

In an example, a second inertial motion unit can be located on the same side of an arm or leg as an energy pathway in a second set of energy pathways. In an example, a first inertial motion unit can be located on the opposite side of an arm or leg as an energy pathway in a first set of energy pathways. In an example, a second inertial motion unit can be located closer to an elbow than to a shoulder. In an example, a first inertial motion unit can be located loser to a wrist than to an elbow. In an example, a first inertial motion unit can be located on the same side of an arm or leg as an energy pathway in a first set of energy pathways.

In an example, an article of clothing (or clothing accessory) can have pockets, pouches, chambers, and/or layers into which inertial motion units are inserted. In an example, inertial motion units can be sewn, woven, knitted, and/or embroidered into (or onto) an article of clothing (or clothing accessory). In an example, inertial motion units can be adhered to an article of clothing (or clothing accessory), such as by glue. In an example, inertial motion units can be bonded to an article of clothing (or clothing accessory) by heating and/or melting. In an example, inertial motion units can be printed onto an article of clothing (or clothing accessory). In an example, inertial motion units can be reversibly attached to an article of clothing (or clothing accessory) by hook and loop material. In an example, inertial motion units can be reversibly attached to an article of clothing (or clothing accessory) by snaps, clips, clasps, hooks, buttons, or pins.

In an example, an inertial motion unit can be part of (or attached to) a portion of an article of clothing (or clothing accessory) which spans the dorsal side of a person's body. In an example, an inertial motion unit can be part of (or attached to) a portion of an article of clothing (or clothing accessory) which spans the ventral side of a person's body. In an example, an inertial motion unit can be part of (or attached to) a portion of an article of clothing (or clothing accessory) which spans a body segment between two joints, wherein the inertial motion unit is closer to the distal joint of this segment than to the proximal joint of this segment.

In an example, an inertial motion unit can be part of (or attached to) a portion of an article of clothing (or clothing accessory) which spans a body segment between two joints, wherein the distance from the inertial motion unit to the distal joint of this segment is less than two-thirds of the distance from the inertial motion unit to the proximal joint of this segment. In an example, an inertial motion unit can be part of (or attached to) a portion of an article of clothing (or clothing accessory) which spans a body segment between two joints, wherein the distance from the inertial motion unit to the distal joint of this segment is less than half of the distance from the inertial motion unit to the proximal joint of this segment.

In an example, an inertial motion unit can comprise an accelerometer and a gyroscope. In an example, a strain sensor can comprise an energy emitter, and energy receiver, and an energy pathway between the energy emitter and the energy receiver. In an example, there can be two inertial motion units associated with each strain gauge. In an example, there can be a first inertial motion unit on one end of a strain sensor and a second inertial motion unit on the opposite end of the strain sensor. In another example, there can be two strain sensors associated with each inertial motion unit. In an example, the two strain sensors can be distal relative to the strain sensors.

In an example, the type of energy which is emitted by energy emitters, transmitted through energy pathways, and received by energy receivers can be electrical energy. In an example, an energy emitter can be an electrical energy emitter. In an example, an energy emitter can be an electrode which emits electrical energy. In an example, an energy pathway can be an electroconductive pathway. In an example, an energy receiver can be an electrical energy receiver. In an example, an energy receiver can be an electrode which receives electrical energy.

In an example, changes in the transmission of electrical energy through electroconductive energy pathways and received by the energy receivers can be analyzed to recognize (e.g. recognize, identify, track, monitor, and/or measure) the configuration (e.g. angle or angles in 2D and/or 3D space), orientation, and/or motion of a person's elbow and shoulder. In an example, changes in the transmission of electrical energy through electroconductive energy pathways and received by the energy receivers can be analyzed to recognize (e.g. recognize, identify, track, monitor, and/or measure) the configuration and motion of a person's arm and torso. In an example, changes in the transmission of electrical energy through electroconductive energy pathways and received by the energy receivers can be analyzed to recognize (e.g. recognize, identify, track, monitor, and/or measure) the flexion, extension, and/or torsion a person's arm.

In an example, changes in the electrical resistance, impedance, conductivity, and/or capacitance of electroconductive energy pathways can be analyzed to recognize (e.g. recognize, identify, track, monitor, and/or measure) the configuration (e.g. angle or angles in 2D and/or 3D space), orientation, and/or motion of a person's elbow and shoulder. In an example, changes in the electrical resistance, impedance, conductivity, and/or capacitance of electroconductive energy pathways can be analyzed to recognize (e.g. recognize, identify, track, monitor, and/or measure) the configuration, orientation, and/or motion of a person's arm and torso.

In an example, changes in the electrical resistance, impedance, conductivity, and/or capacitance of electroconductive energy pathways caused by motion of a person's elbow and shoulder can be analyzed to recognize (e.g. recognize, identify, track, monitor, and/or measure) the configuration (e.g. angle or angles in 2D and/or 3D space), orientation, and/or motion of the person's elbow and shoulder. In an example, changes in the electrical resistance, impedance, conductivity, and/or capacitance of electroconductive energy pathways caused by motion of a person's elbow and shoulder can be analyzed to recognize (e.g. recognize, identify, track, monitor, and/or measure) the configuration, orientation, and/or motion of the person's arm and torso.

In an example, changes in the electrical resistance, impedance, conductivity, and/or capacitance of electroconductive energy pathways caused by bending and/or rotation of a person's elbow and shoulder can be analyzed to recognize (e.g. recognize, identify, track, monitor, and/or measure) the configuration (e.g. angle or angles in 2D and/or 3D space), orientation, and/or motion of the person's elbow and shoulder. In an example, changes in the electrical resistance, impedance, conductivity, and/or capacitance of electroconductive energy pathways caused by bending and/or rotation of a person's elbow and shoulder can be analyzed to recognize (e.g. recognize, identify, track, monitor, and/or measure) the configuration, orientation, and/or motion of the person's arm and torso.

In an example, changes in the electrical resistance, impedance, conductivity, and/or capacitance of electroconductive energy pathways caused bending or stretching of the pathways can be analyzed to recognize (e.g. recognize, identify, track, monitor, and/or measure) the configuration (e.g. angle or angles in 2D and/or 3D space), orientation, and/or motion of a person's elbow and shoulder. In an example, changes in the electrical resistance, impedance, conductivity, and/or capacitance of electroconductive energy pathways caused by bending or stretching of the pathways can be analyzed to recognize (e.g. recognize, identify, track, monitor, and/or measure) the configuration, orientation, and/or motion of a person's arm and torso.

In an example, changes in the electrical resistance, impedance, conductivity, and/or capacitance of electroconductive energy pathways caused bending or stretching of the pathways which is caused by bending and/or rotation of a person's elbow and shoulder can be analyzed to recognize (e.g. recognize, identify, track, monitor, and/or measure) the configuration (e.g. angle or angles in 2D and/or 3D space), orientation, and/or motion of the person's elbow and shoulder. In an example, changes in the electrical resistance, impedance, conductivity, and/or capacitance of electroconductive energy pathways caused by bending or stretching of the pathways which is caused by bending and/or rotation of a person's elbow and shoulder can be analyzed to recognize (e.g. recognize, identify, track, monitor, and/or measure) the configuration, orientation, and/or motion of the person's arm and torso.

In an example, an energy pathway can be an electroconductive pathway. In an example, a flexible electroconductive pathway can be an undulating (e.g. sinusoidal, serpentine, and/or zigzagging) wire. In an example, a flexible electroconductive pathway can be an undulating (e.g. sinusoidal, serpentine, and/or zigzagging) wire which is embedded in (a strip of) non-electroconductive elastomeric material. In an example, a flexible electroconductive pathway can be an undulating (e.g. sinusoidal, serpentine, and/or zigzagging) wire which is embedded in (a strip of) non-electroconductive elastomeric material which spans a body joint.

In an example, a flexible electroconductive pathway can be made from an elastomeric generally-non-electroconductive material (e.g. an elastomeric non-electroconductive polymer) which has been doped, impregnated, and/or coated with conductive material (e.g. conductive metal particles or carbon structures). In an example, a flexible electroconductive pathway can be made from a elastomeric generally-non-electroconductive polymer material (e.g. silicon-based material) which has been doped, impregnated, and/or coated with conductive material (e.g. conductive metal particles or carbon structures). In an example, a flexible electroconductive pathway can be made from PDMS (polydimethylsiloxane) which has been doped, impregnated, and/or coated with conductive material (e.g. conductive metal particles or carbon structures).

In an example, energy emitters for an energy pathway spanning a joint can be distal relative to energy receivers on that pathway. In another example, the locations of energy emitters and energy receivers can be reversed. In an example, the energy receivers can be distal relative to energy emitters. In an example, there can be one energy emitter per energy pathway. In an example, the same energy emitter can supply energy to more than one energy pathway. In an example, there can be one energy receiver per energy pathway. In an example, the same energy emitter can receive energy from more than one energy pathway.

In an example, the type of energy which is emitted by energy emitters, transmitted through energy pathways, and received by energy receivers can be light energy. In an example, an energy emitter can be a light emitter. In an example, energy emitters can be Light Emitting Diodes (LEDs). In an example, an energy emitter can be selected from the group consisting of: Light Emitting Diode (LED), infrared LED, monochromatic LED, near-infrared LED, organic light emitting diode (OLED), resonant cavity light emitting diode (RCLED), super-luminescent light emitting diode (SLED), and tunable LED. In an example, an energy pathway can be an optical pathway. In an example, an energy pathway can be an optical fiber. In an example, an energy receiver can be a light receiver. In an example, an energy receiver can be a photodetector.

In an example, a flexible energy pathway can be a light-transmitting pathway, such as an optical fiber. In an example, a light energy emitter (such as an LED) can inject light into one end of a light-transmitting pathway and a light energy receiver (such as a photodiode) can detect light from the opposite end of the pathway. In an example, changes in parameters of the light caused by its transmission through the pathway can be analyzed to measure changes in the position and/or movement of a body joint which is spanned by the pathway. In an example, these parameters can be selected from the group consisting of:

intensity, amplitude, wavelength, polarity, phase, coherence, transmittance, reflectance, spectral distribution, and spectral shift.

In an example, a light energy emitter can be selected from the group consisting of: Light Emitting Diode (LED), inorganic light emitting diode (ILED), organic light emitting diode (OLED), micro light emitting diode (microLED), quantum dot, laser, and Liquid Crystal Display (LCD). In an example, a light energy emitter can emit visible light. In an example, a light energy emitter can emit infrared light. In an example, a light energy emitter can emit coherent light. In an example, a light energy receiver can generate an electrical signal that varies with changes in light intensity. In an example, a light energy receiver can be a photodetector. In an example, a light energy receiver can be a thin film transistor.

In an example, an article of clothing (or clothing accessory) can have pockets, pouches, chambers, and/or layers into which energy emitters are inserted. In an example, energy emitters can emit electrical energy. In an example, energy emitters can emit light. In an example, energy emitters which emit light can be a Light Emitting Diodes (LEDs). In an example, energy emitters can be sewn, woven, knitted, and/or embroidered into (or onto) an article of clothing (or clothing accessory). In an example, energy emitters can be adhered to an article of clothing (or clothing accessory), such as with glue.

In an example, energy emitters can be bonded to an article of clothing (or clothing accessory) by heating and/or melting. In an example, energy emitters can be printed onto an article of clothing (or clothing accessory). In an example, energy emitters can be attached to an article of clothing (or clothing accessory) by hook and loop material. In an example, an energy emitters can be attached to an article of clothing (or clothing accessory) by snaps, clips, clasps, hooks, buttons, or pins.

In an example, an optical strain sensor can comprise: a light energy emitter (e.g. LED), a light energy receiver (e.g. photodetector), and a light-transmitting energy pathway (e.g. optical fiber) between the emitter and the receiver. In an example, optical properties of the energy pathway are changed by movement of a body joint which the strain sensor spans. In an example, optical properties of the energy pathway are changed by stretching, elongation, bending, compression, and/or twisting of the pathway.

In an example, parameters of light transmitted through the energy pathway are changed by stretching, elongation, bending, compression, and/or twisting of the pathway. In an example, the intensity, amplitude, wavelength, polarization, phase, direction, and/or spectral distribution of light transmitted through the energy pathway are changed by stretching, elongation, bending, compression, and/or twisting of the pathway caused by movement of a body joint which the energy pathway spans.

In an example, changes in the transmission of light energy through optical pathways and received by the photodetectors can be analyzed to recognize (e.g. recognize, identify, track, monitor, and/or measure) the configuration (e.g. angle or angles in 2D and/or 3D space), orientation, and/or motion of a person's elbow and shoulder. In an example, changes in the transmission of light energy through optical pathways and received by the photodetectors can be analyzed to recognize (e.g. recognize, identify, track, monitor, and/or measure) the configuration and motion of a person's arm and torso.

In an example, changes in the intensity, amplitude, color, spectral distribution, and/or polarization of light transmitted through optical pathways (e.g. optical fibers) can be analyzed to recognize (e.g. recognize, identify, track, monitor, and/or measure) the configuration (e.g. angle or angles in 2D and/or 3D space), orientation, and/or motion of a person's elbow and shoulder. In an example, changes in the intensity, amplitude, color, spectral distribution, and/or polarization of light transmitted through optical pathways (e.g. optical fibers) can be analyzed to recognize (e.g. recognize, identify, track, monitor, and/or measure) the configuration, orientation, and/or motion of a person's arm and torso.

In an example, light can be transmitted through a light-transmitting energy pathway by total internal reflection. In an example, the degree of internal reflection within a light-transmitting energy pathway can be changed by movement of a body joint which the pathway spans. In an example, the degree of internal reflection within a light-transmitting energy pathway can be changed by movement of a body joint which the pathway spans, wherein analysis of changes in the amount of light transmitted through the pathway can indicate movement of the body joint. In an example, light can be transmitted through a bundle of optical fibers which span a body joint, wherein changes in the degree of internal reflection within those optical fibers can be analyzed to measure movement of the body joint.

In an example, a light-transmitting energy pathway can comprise a light-transmitting core made from a first material with a first refractive index which is clad and/or coated with a second material with a second refractive index, wherein the second refractive index is less than the first refractive index. In an example, a light-transmitting energy pathway can comprise a light-transmitting core made from a first material with a first refractive index which is clad and/or coated with a second material with a second refractive index, wherein the first refractive index is greater than the second refractive index.

In an example, the degree of internal reflection within an optical fiber can be changed by stretching, elongation, bending, compression, and/or twisting of the optical fiber. In an example, the degree of internal reflection within an optical fiber can be changed by stretching, elongation, bending, compression, and/or twisting of the optical fiber caused by movement of a body joint which the optical fiber spans. In an example, the degree of internal reflection within an optical fiber can be changed by stretching, elongation, bending, compression, and/or twisting of the optical fiber caused by movement of a body joint which the optical fiber spans, wherein movement of the body joint can be measured by analyzing changes in the amount of light transmitted through the optical fiber.

In an example, an energy pathway can be a light energy pathway. In an example, an energy pathway can be a flexible optical pathway. In an example, an optical pathway can be a flexible optical fiber. In an example, a light-transmitting energy pathway can comprise a light-transmitting core made from a first material with a first refractive index which is clad and/or coated with a second material with a second refractive index, wherein the first refractive index is between 20% and 70% greater than the second refractive index. In an example, a light-transmitting energy pathway can comprise a light-transmitting core made from a first material with a first refractive index which is clad and/or coated with a second material with a second refractive index, wherein the first refractive index is at least twice the second refractive index.

In an example, a light-transmitting energy pathway (e.g. optical fiber) can comprise a grating, wherein stretching, elongation, bending, compression, and/or twisting of the pathway changes the degree of internal reflection in the energy pathway, and wherein changes in the degree of internal reflection are used to measure motion of a body joint spanned by the pathway. In an example, a light-transmitting energy pathway (e.g. optical fiber) can comprise a series of gaps, holes, notches, or undulations, wherein stretching, elongation, bending, compression, and/or twisting of the pathway changes the degree of internal reflection in the energy pathway, and wherein changes in the degree of internal reflection are used to measure motion of a body joint spanned by the pathway. In an example, a light-transmitting energy pathway can comprise a confocal strain sensor. In an example, a light-transmitting energy pathway can comprise a confocal strain sensor wherein the impact of out-of-focus light is reduced in the analysis of light transmitted through the pathway.

In an example, changes in the intensity, amplitude, color, spectral distribution, and/or polarization of light transmitted through optical pathways caused by motion of a person's elbow and shoulder can be analyzed to recognize (e.g. recognize, identify, track, monitor, and/or measure) the configuration (e.g. angle or angles in 2D and/or 3D space), orientation, and/or motion of the person's elbow and shoulder. In an example, changes in the intensity, amplitude, color, spectral distribution, and/or polarization of light transmitted through optical pathways caused by motion of a person's elbow and shoulder can be analyzed to recognize (e.g. recognize, identify, track, monitor, and/or measure) the configuration, orientation, and/or motion of the person's arm and torso.

In an example, changes in the intensity, amplitude, color, spectral distribution, and/or polarization of light transmitted through optical pathways caused by bending and/or rotation of a person's elbow and shoulder can be analyzed to recognize (e.g. recognize, identify, track, monitor, and/or measure) the configuration (e.g. angle or angles in 2D and/or 3D space), orientation, and/or motion of the person's elbow and shoulder. In an example, changes in the intensity, amplitude, color, spectral distribution, and/or polarization of light transmitted through optical pathways caused by bending and/or rotation of a person's elbow and shoulder can be analyzed to recognize (e.g. recognize, identify, track, monitor, and/or measure) the configuration, orientation, and/or motion of the person's arm and torso.

In an example, changes in the intensity, amplitude, color, spectral distribution, and/or polarization of light transmitted through optical pathways caused bending or stretching of the pathways can be analyzed to recognize (e.g. recognize, identify, track, monitor, and/or measure) the configuration (e.g. angle or angles in 2D and/or 3D space), orientation, and/or motion of a person's elbow and shoulder. In an example, changes in the intensity, amplitude, color, spectral distribution, and/or polarization of light transmitted through optical pathways caused by bending or stretching of the pathways can be analyzed to recognize (e.g. recognize, identify, track, monitor, and/or measure) the configuration, orientation, and/or motion of a person's arm and torso.

In an example, changes in the intensity, amplitude, color, spectral distribution, and/or polarization of light transmitted through optical pathways caused bending or stretching of the pathways which is caused by bending and/or rotation of a person's elbow and shoulder can be analyzed to recognize (e.g. recognize, identify, track, monitor, and/or measure) the configuration (e.g. angle or angles in 2D and/or 3D space), orientation, and/or motion of the person's elbow and shoulder. In an example, changes in the intensity, amplitude, color, spectral distribution, and/or polarization of light transmitted through optical pathways caused by bending or stretching of the pathways which is caused by bending and/or rotation of a person's elbow and shoulder can be analyzed to recognize (e.g. recognize, identify, track, monitor, and/or measure) the configuration, orientation, and/or motion of the person's arm and torso.

In an example, there can be two energy emitters and one energy receiver in communication with a flexible energy pathway, wherein the two energy emitters are in different locations along the longitudinal axis of the pathway. In an example, there can be one energy emitter and two energy receivers in communication with a flexible energy pathway, wherein the two energy receivers are in different locations along the longitudinal axis of the pathway.

In an example, an energy pathway can be U-shaped, wherein an energy emitter and an energy receiver are both on (and/or in electromagnetic communication with) the distal end of the pathway. In an example, the same energy pathway can span a joint twice, in opposite directions, wherein an energy emitter in communication with that pathway and an energy receiver in communication with that pathway are both on the same side of the joint.

In an example, an energy pathway can span a joint twice, in opposite directions, wherein an energy emitter in communication with that pathway and an energy receiver in communication with that pathway are both on the distal side of the joint. In an example, an energy pathway can span a joint twice, in opposite directions, wherein an energy emitter in communication with that pathway and an energy receiver in communication with that pathway are both on the proximal side of the joint.

In an example, an energy pathway can have a helical shape or partial-helical shape. In an example, an energy pathway can have a longitudinal axis which spans between 1 and 3 complete rotations (e.g. 360-degree loops) of a helix. In an example, an energy pathway can have a longitudinal axis which spans between 25% and 75% of a rotation (e.g. of a 360-degree loop) of a helix. In an example, an energy pathway can have a longitudinal axis which spans between 66% and 90% of a rotation (e.g. of a 360-degree loop) of a helix.

In an example, an energy pathway can be configured to longitudinally span the ventral surface of a person's knee or hip. In an example, an energy pathway can be configured to spiral around a person's knee or hip. In an example, an energy pathway can be configured in a half-spiral around a person's knee or hip. In an example, an energy pathway can be configured to longitudinally span the dorsal surface of a person's elbow or shoulder. In an example, an energy pathway can be configured to spiral around a person's elbow or shoulder. In an example, an energy pathway can be configured in a half-spiral around a person's elbow or shoulder.

In an example, energy pathways can measure one or more joint configurations and/or motions selected from the group consisting of: eversion, extension, flexion, torsion, and/or inversion of the ankle; abduction, extension, flexion, lateral bending, and/or rotation of the spine; eversion, extension, flexion, torsion, and/or inversion of the elbow; extension and/or flexion of the finger or thumb; pronation, rotation, and/or supination of the forearm; abduction, adduction, extension, flexion, and/or rotation of the hip; extension and/or flexion of the jaw; abduction, adduction, extension, and/or flexion of the knee; eversion and/or inversion of the mid-tarsal; abduction, extension, flexion, and/or rotation of the neck; abduction, adduction, extension, flexion, and/or rotation of the shoulder; extension and/or flexion of the toe; and abduction, extension, flexion, and/or ulnar deviation or radial deviation of the wrist.

In an example, flexible energy pathways can longitudinally span body joints. Stretching (or bending) of these energy pathways changes the transmission of electrical energy through them which, in turn, can be used to measure and model changes in joint angle and/or rotation. In an example, energy pathways can be placed along the surface of a person's body in proximity to selected groups of body muscles. In an example, an article of clothing can further comprise EMG sensors in addition to inertial motion units and strain sensors.

In an example, an energy emitter, an energy receiver, and a flexible energy pathway between the emitter and receiver can collectively comprise a strain sensor which converts mechanical displacement into electrical signals. In an example, an energy emitter, an energy receiver, and a flexible energy pathway between the emitter and receiver can collectively comprise a strain sensor which converts mechanical stretching, compression, and/or twisting, and/or rotation displacement into electrical signals. In an example, an energy emitter, an energy receiver, and a flexible energy pathway which spans a body joint can collectively comprise a strain sensor, wherein movement of the body joint causes mechanical stretching, compression, and/or twisting, and/or rotation of the energy pathway which, in turn, causes changes in electrical transmission through the energy pathway.

In an example, changes in the flows of electrical energy through an energy pathway can be measured by one or more parameters selected from the group consisting of: voltage, resistance, impedance, amperage, current, phase, and wave pattern. In an example, an energy pathway can be comprised of electroconductive fibers, yarns, threads, strands, substrates, layers, or textiles. In an example, an energy receiver can be selected from the group consisting of: voltmeter, impedance sensor, magnetic field sensor, piezoelectric sensor, piezomechanical sensor, potentiometer, resistive bend sensor, variable-resistance sensor, electromyography (EMG) sensor, and Hall-effect sensor.

In an example, a change in the resistance of a flexible energy pathway can be measured based on a change in the electrical current or voltage through the pathway. In an example, the amount of strain exerted on a flexible energy pathway can be measured based on a change in the electrical resistance of the pathway. In an example, the amount of strain exerted on a flexible energy pathway can be measured based on a change in the electrical current or voltage through the pathway. In an example, the degree to which a flexible energy pathway is stretched can be measured based on a change in the electrical current or voltage through the pathway. In an example, the degree to which a flexible energy pathway is stretched can be measured based on a change in the electrical resistance of the pathway.

In an example, a flexible energy pathway can be an electroconductive pathway. In an example, a flexible energy pathway can comprise an optical strain sensor. In an example, changes in the electrical resistance of a flexible energy pathway which spans a body joint can be used to measure changes in the flexion, extension, and/or torsion of that body joint. In an example, changes in the intensity and/or amplitude of light transmitted through a flexible energy pathway which spans a body joint can be used to measure changes in the flexion, extension, and/or torsion of that body joint.

In an example, a light-transmitting energy pathway can transmit a first amount (e.g. percentage) of light emitted into it when the pathway is in a first configuration and transmit a second amount (e.g. percentage) of light emitted into it when the pathway is in a second configuration, wherein the first configuration is straighter than the second configuration, and wherein the first amount is greater than the second amount. In an example, a light-transmitting energy pathway can transmit a first amount (e.g. percentage) of light emitted into it when the pathway is in a first configuration and transmit a second amount (e.g. percentage) of light emitted into it when the pathway is in a second configuration, wherein the second configuration is more arcuate than the first configuration, and wherein the second amount is less than the second amount.

In an example, a light-transmitting energy pathway can include a wavelength-specific grating, wherein bending the pathway shifts the wavelength of transmitted light. In an example, a light-transmitting energy pathway can comprise a fiber optic shape sensor. In an example, a light-transmitting energy pathway can include a grating which interacts with light of a particular wavelength.

In an example, changes in the direction of light transmitted through a flexible energy pathway which spans a body joint can be used to measure changes in the flexion, extension, and/or torsion of that body joint. In an example, a flexible energy pathway can comprise a capacitive strain sensor. In an example, changes in the transmission of light through a flexible energy pathway which spans a body joint can be used to measure changes in the flexion, extension, and/or torsion of that body joint. In an example, changes in the direction of light transmitted through a flexible energy pathway which spans a body joint can be used to measure changes in at least one angle of that body joint. In an example, changes in the transmission of light through a flexible energy pathway which spans a body joint can be used to measure changes in at least one angle of that body joint.

In an example, changes in the electrical capacitance of a flexible energy pathway which spans a body joint can be used to measure changes in at least one angle of that body joint. In an example, changes in the spectrum of light transmitted through a flexible energy pathway which spans a body joint can be used to measure changes in the flexion, extension, and/or torsion of that body joint. In an example, changes in the transmission of electrical energy through a flexible energy pathway which spans a body joint can be used to measure changes in at least one angle of that body joint. In an example, changes in the transmission of electrical energy through a flexible energy pathway which spans a body joint can be used to measure changes in the flexion, extension, and/or torsion of that body joint.

In an example, an energy pathway can be piezoelectric and/or piezoresistive. In an example, an energy pathway can generate electrical energy when it is bent, stretched, elongated, and/or twisted. In an example, the source of energy which flows through or from an energy pathway can be selected from the group consisting of: energy from a power source internal to the device; energy from a power source that is external to the device; and energy which is generated, transduced, or harvested by the device.

In an example, movement of a body joint can be measured based on the values, or changes in the values, of one or more electrical parameters concerning a flexible energy pathway which are selected from the group consisting of: resistance, capacitance, impedance, current, and voltage. In an example, movement of a body joint can be modeled from data concerning deformation of a flexible energy pathway which spans that joint. In an example, the position, angle, and/or movement of a body joint can be modeled from data concerning deformation of a flexible energy pathway which spans that joint. In an example, deformation of a flexible energy pathway can comprise one or more parameters selected from the group consisting of: stretching, elongation, bending, twisting, rotation, compression, pressure, force, strain, and curvature.

In an example, changes in the electrical capacitance of a flexible energy pathway which spans a body joint can be used to measure changes in the flexion, extension, and/or torsion of that body joint. In an example, changes in the electrical resistance of a flexible energy pathway which spans a body joint can be used to measure changes in at least one angle of that body joint. In an example, a flexible energy pathway can comprise a resistive strain sensor. In an example, changes in the intensity and/or amplitude of light transmitted through a flexible energy pathway which spans a body joint can be used to measure changes in at least one angle of that body joint.

In an example, a first energy pathway in a set of two or more pathways can span a body joint (e.g. elbow, shoulder, knee, or hip) along a vector which is substantially parallel to the vector which best fits the bones which connect at the joint when the person has extended their arms and legs. In an example, a second energy pathway in the set of two or more pathways can span a body joint (e.g. elbow, shoulder, knee, or hip) along a vector which is not parallel to the vector which best fits the bones which connect at the joint when the person has extended their arms and legs. In an example, a second energy pathway in the set of two or more pathways can span a body joint (e.g. elbow, shoulder, knee, or hip) along a vector which is oblique relative to the vector which best fits the bones which connect at the joint when the person has extended their arms and legs.

In an example, a first energy pathway in a set of two or more pathways can span a body joint (e.g. elbow, shoulder, knee, or hip) along the dorsal side of the joint. In an example, a second energy pathway in the set of two or more pathways can span a body joint (e.g. elbow, shoulder, knee, or hip) along the ventral side of the joint. In another example, a second energy pathway in the set of two or more pathways can span a body joint (e.g. elbow, shoulder, knee, or hip) along a lateral side of the joint which is between the dorsal and ventral sides of the joint. In an example, four energy pathways in a set of two or more pathways can span a body joint (e.g. elbow, shoulder, knee, or hip) along four radial quadrants (e.g. dorsal, ventral, dorsal-ventral right, and dorsal-ventral left) of the joint. In an example, a plurality of energy pathways in a set of pathways can span a body joint at locations which are equally radially-spaced around the circumference and/or cross-sectional perimeter of the joint.

In an example, a first energy pathway in a set of two or more pathways which span a person's body joint can be substantially-straight when the person extends their arms and legs. In an example, a second energy pathway in a set of two or more pathways which span a person's body joint can be arcuate when the person extends their arms and legs. In an example, a second energy pathway in a set of two or more pathways which span a person's body joint can have a helical shape when the person extends their arms and legs. In an example, a second energy pathway can intersect, cross, and/or overlap a first energy pathway in a set of two or more pathways.

In an example, an energy pathway can have a substantially straight configuration when a joint is fully extended. In an example, an energy pathway can have an arcuate shape, even when a joint is fully extended. In an example, an energy pathway can have a shape comprising a repeating waveform selected from the group consisting of: simple sinusoidal wave; composite sinusoidal wave; saw-tooth wave or zig-zag; and square wave. In an example, an energy pathway can have a shape which is a conic section. In an example, an energy pathway can have a shape which is a spiral or helix. In an example, an energy pathway can have a shape which is a chain of loops.

In an example, an energy pathway can have a shape comprising a repeating waveform selected from the group consisting of: simple sinusoidal wave; composite sinusoidal wave; saw-tooth wave or zigzag; and square wave. In an example, an energy pathway can have a shape which is a conic section. In an example, an energy pathway can have a shape which is a spiral or helix. In an example, an energy pathway can have a shape which is a chain of loops.

In an example, an article of clothing (or clothing accessory) can comprise: a joint-spanning spiral energy pathway which is configured to spiral around the surface of a portion of the human body which contains a human body joint; and a plurality of energy receivers which measure electrical energy from different locations on the pathway, wherein changes in the configuration or motion of the pathway change the pattern of electrical energy which is measured by the plurality of energy receivers, and wherein data from the plurality of energy receivers are jointly analyzed to estimate the configuration or motion of the human body joint.

In an example, an energy pathway with a sinusoidal, zigzag or sawtooth, or other repeated wave shape can have a higher curvature or convolution if it has a waveform with a larger amplitude or higher wave frequency. In an example, data from a highly curved or convoluted energy pathway can provide more accurate measurement of body joint motion over a first range of motion and data from a less curved or convoluted energy pathway can provide more accurate measurement of body joint motion over a second range of motion. When analyzed together, data from the highly curved or convoluted and the less curved or convoluted energy pathways reduce error in measuring the full range of joint motion.

In an example, two energy pathways spanning the same body joint can differ in the angles at which they span the longitudinal axis of the body member which contains the body joint. In an example, having different energy pathways span a body joint at different angles can be especially useful for measuring the motion and/or configuration of ball-and-socket or other complex motion joints. In an example, two energy pathways can have longitudinal axes which are substantially perpendicular as they span the body member which contains a body joint. In an example, multiple energy pathways spanning the same body joint can form inter-pathway areas which, when projected from 3D space onto a 2D plane, are squares or rectangles.

In an example, energy can flow through a first flexible energy pathway with different flow parameters than energy flowing through a second flexible energy pathway, wherein these parameters are selected from the group consisting of: rate, level, amplitude, resistance, impedance, filter, frequency, and spectrum. In an example, energy flow through or from a first configuration of the first energy pathway and energy flow through or from a second configuration of the first energy pathway can differ in one or more parameters selected from the group consisting of: total energy; energy flow per time period; energy power; wave amplitude; wave frequency; wave phase; waveform; frequency range; spectral distribution; resistance; voltage; current; impedance; and interval pattern.

In an example, one or more flexible energy pathways in an article of clothing (or clothing accessory) can span a person's gastrocnemius area. In an example, two or more flexible energy pathways in an article of clothing (or clothing accessory) can span different radial-quartiles of a person's hips. In an example, two or more flexible energy pathways in an article of clothing (or clothing accessory) can span different areas of a person's biceps. In an example, one or more flexible energy pathways in an article of clothing (or clothing accessory) can span a person's quadriceps. In an example, two or more flexible energy pathways in an article of clothing (or clothing accessory) can span different radial-quartiles of a person's elbows. In an example, one or more flexible energy pathways in an article of clothing (or clothing accessory) can span a person's knees.

In an example, two or more flexible energy pathways in an article of clothing (or clothing accessory) can span different radial-quartiles of a person's shoulders. In an example, two or more flexible energy pathways in an article of clothing (or clothing accessory) can span different radial-quartiles of a person's biceps. In an example, one or more flexible energy pathways in an article of clothing (or clothing accessory) can span a person's pectoral area. In an example, two or more flexible energy pathways in an article of clothing (or clothing accessory) can span different radial-quartiles of a person's ankles.

In an example, data from an energy pathway with anomalous results can be given less weight in order to improve accuracy and reduce error in the measurement of the motion and/or configuration of that joint. In an example, data from different energy pathways can analyzed to identify probable shifting of energy pathway location over the surface of the body (e.g. by shifting of a garment into which the pathways are integrated) and to compensate for this shifting when interpreting data from multiple energy pathways. In an example, data from different energy pathways can analyzed to identify probable loss of mechanical or electromagnetic communication between an energy pathway and the body and to compensate for this loss when interpreting data from multiple energy pathways. In an example, data from different energy pathways can analyzed to identify probable interference by an external object or field and to compensate for this interference when interpreting data from multiple energy pathways.

In an example, an energy emitter, an energy receiver, and flexible energy pathway between them can function as a strain sensor. In an example, two or more flexible energy pathways which span a body joint along different radial locations and/or different orientations can measure flexion, extension, and/or torsion of that joint better than a single flexible energy pathway. In an example, two or more strain sensors which span a body joint along different radial locations and/or different orientations can measure bending, rotation, and/or twisting, and/or rotation of that joint between than a single strain sensor.

In an example, a flexible energy pathway which spans a body joint can measure flexion, extension, and/or torsion of that joint. In an example, two or more strain sensors which span a body joint along different radial locations and/or different orientations can measure flexion, extension, and/or torsion of that joint better than a single strain sensor. In an example, a strain sensor which spans a body joint can measure one or angles of that joint. In an example, two or more flexible energy pathway which span a body joint along different radial locations and/or different orientations can measure one or angles of that joint better than a single flexible energy pathway.

In an example, a flexible electrical energy pathway which spans a body joint can comprise three layers: an outer insulating layer; a middle electroconductive layer; and an inner insulating layer. In an example, changes in the configuration of the body joint change electrical transmission through the middle electroconductive layer. In an example, changes in the configuration of the body joint stretch and/or compress the middle electroconductive layer, which change electrical transmission through this layer. In an example, changes in the configuration of the body joint change the electrical resistance of the pathway.

In an example, a flexible electrical energy pathway which spans a body joint can comprise three layers: an outer electroconductive layer; a middle dielectric layer; and an inner electroconductive layer. In an example, a flexible electrical energy pathway which spans a body joint can comprise three layers: an outer elastomeric electroconductive layer; a middle elastomeric dielectric layer; and an inner elastomeric electroconductive layer. In an example, a flexible electrical energy pathway can comprise an undulating, sinusoidal, serpentine, zigzagging, and/or wrinkled electroconductive strip which is attached to a pre-stretched non-conductive layer.

In an example, a flexible electrical energy pathway which spans a body joint can comprise three layers: an outer electroconductive layer; a middle insulating layer; and an inner electroconductive layer. In an example, changes in the configuration of the body joint change electrical transmission between the outer layer and the inner layer. In an example, changes in the configuration of the body joint compress the three layers which changes electrical transmission between the outer layer and the inner layer. In an example, changes in the configuration of the body joint change the electrical capacitance of the pathway.

In an example, a flexible electrical energy pathway can comprise an undulating, sinusoidal, serpentine, zigzagging, and/or wrinkled electroconductive strip which is attached to a pre-stretched non-conductive layer, wherein the strip is made with hydrogel which has been doped, impregnated, and/or coated with electroconductive material. In an example, a flexible electrical energy pathway can comprise an undulating, sinusoidal, serpentine, zigzagging, and/or wrinkled electroconductive strip which is attached to a pre-stretched non-conductive layer, wherein the strip is made with a thermoplastic elastomer which has been doped, impregnated, and/or coated with electroconductive material.

In an example, two or more flexible energy pathways in an article of clothing (or clothing accessory) can span different areas of a person's wrists. In an example, one or more flexible energy pathways in an article of clothing (or clothing accessory) can span a person's ankles. In an example, two or more flexible energy pathways in an article of clothing (or clothing accessory) can span different radial-quartiles of a person's wrists. In an example, two or more flexible energy pathways in an article of clothing (or clothing accessory) can span different areas of a person's elbows.

In an example, two or more strain sensors which span a body joint along different radial locations and/or different orientations can measure one or angles of that joint better than a single strain sensor. In an example, a strain sensor can measure bending, stretching, twisting, and/or rotation, and/or compression. In an example, a strain sensor which spans a body joint can measure flexion, extension, and/or torsion of that joint. In an example, a flexible energy pathway which spans a body joint can measure bending, rotation, and/or twisting, and/or rotation of that joint. In an example, a strain sensor which spans a body joint can measure bending, rotation, and/or twisting, and/or rotation of that joint.

In an example, an optical strain sensor can comprise a bundle of light-transmitting energy pathways, wherein stretching, elongation, bending, compression, and/or twisting of the strain sensor unequally changes parameters of light transmitted through those energy pathways, and wherein analysis of these unequal changes enables measurement of the motion of a body joint which the optical strain sensor spans. In an example, an optical strain sensor can comprise a bundle of light-transmitting energy pathways, wherein stretching, elongation, bending, compression, and/or twisting of the strain sensor changes the relative intensity of light transmitted through different energy pathways in that bundle, and wherein analysis of these changes in relative intensity enables measurement of the motion of a body joint which the optical strain sensor spans.

In an example, two flexible energy pathways can span opposite sides of a body joint. In an example, four flexible energy pathways can span a body joint on four radial quartiles of the joint, respectively. In an example, two straight energy pathways and one helical pathway can span a body joint in order to measure flexion, extension, and torsion. In an example, two energy pathways can span a body joint in a manner which is substantially parallel to the longitudinal axis of the bones which are proximal and distal to the body joint and a third energy pathway can span the body joint in a manner which transverse to this longitudinal axis.

In an example, two or more flexible energy pathways which span a body joint along different radial locations and/or different orientations can measure bending, rotation, and/or twisting, and/or rotation of that joint between than a single flexible energy pathway. In an example, a flexible energy pathway can measure bending, stretching, twisting, and/or rotation, and/or compression. In an example, a flexible energy pathway which spans a body joint can measure one or angles of that joint.

In an example, two or more flexible energy pathways in an article of clothing (or clothing accessory) can span different areas of a person's hips. In an example, two or more flexible energy pathways in an article of clothing (or clothing accessory) can span different radial-quartiles of a person's gastrocnemius area. In an example, two or more flexible energy pathways in an article of clothing (or clothing accessory) can span different radial-quartiles of a person's lower posterior thorax. In an example, one or more flexible energy pathways in an article of clothing (or clothing accessory) can span a person's elbows. In an example, one or more flexible energy pathways in an article of clothing (or clothing accessory) can span a person's wrists. In an example, one or more flexible energy pathways in an article of clothing (or clothing accessory) can span a person's biceps. In an example, two or more flexible energy pathways in an article of clothing (or clothing accessory) can span different radial-quartiles of a person's quadriceps.

In an example, two energy pathways can be woven together in a substantially-parallel manner to form a textile wherein this textile is then used to make a garment which spans a portion of a body member in a curvaceous 3D manner. In an example, two energy pathways can be woven together in a substantially-perpendicular manner to form a textile wherein this textile is then used to make a garment which spans a portion of a body member in a curvaceous 3D manner. In an example, two energy pathways can have longitudinal axes which intersect at acute angles as they span the body member which contains a body joint.

In an example, one or more flexible energy pathways in an article of clothing (or clothing accessory) can span a person's shoulders. In an example, two or more flexible energy pathways in an article of clothing (or clothing accessory) can span different radial-quartiles of a person's pectoral area. In an example, two or more flexible energy pathways in an article of clothing (or clothing accessory) can span different areas of a person's shoulders. In an example, two or more flexible energy pathways in an article of clothing (or clothing accessory) can span different areas of a person's pectoral area. In an example, one or more flexible energy pathways in an article of clothing (or clothing accessory) can span a person's lower posterior thorax. In an example, two or more flexible energy pathways in an article of clothing (or clothing accessory) can span different radial-quartiles of a person's knees.

In an example, data from different energy pathways spanning the same body joint can be given different weights during different movement speeds (e.g. fast movement vs. slow movement) of joint motion in order to improve accuracy and reduce error in the measurement of the motion and/or configuration of that joint. In an example, data from different energy pathways spanning the same body joint can be given different weights during different numbers of cycle repetition of joint motion in order to improve accuracy and reduce error in the measurement of the motion and/or configuration of that joint.

In an example, two or more flexible energy pathways in an article of clothing (or clothing accessory) can span different areas of a person's lower posterior thorax. In an example, two or more flexible energy pathways in an article of clothing (or clothing accessory) can span different areas of a person's gastrocnemius area. In an example, two or more flexible energy pathways in an article of clothing (or clothing accessory) can span different areas of a person's quadriceps. In an example, one or more flexible energy pathways in an article of clothing (or clothing accessory) can span a person's hips. In an example, two or more flexible energy pathways in an article of clothing (or clothing accessory) can span different areas of a person's ankles. In an example, two or more flexible energy pathways in an article of clothing (or clothing accessory) can span different areas of a person's knees.

In an example, data from different energy pathways spanning the same body joint can be averaged together in order to improve accuracy and reduce error in the measurement of the motion and/or configuration of that joint. In an example, data from different energy pathways spanning the same body joint can be given different weights during different portions of the joint range of motion in order to improve accuracy and reduce error in the measurement of the motion and/or configuration of that joint. In an example, data from different energy pathways spanning the same body joint can be given different weights during different directions of joint motion (e.g. flexion vs. extension) in order to improve accuracy and reduce error in the measurement of the motion and/or configuration of that joint.

In an example, the geometric relationship between the longitudinal axis of a first energy pathway and the longitudinal axis of a second energy pathway can be selected from the group consisting of: substantially parallel; separated by a substantially-constant distance; separated by a substantially-constant number of radial degrees of the cross-sectional perimeter of a body member; separated by a substantially-constant percentage of the cross-sectional perimeter of a body member; forming vectors which intersect in 3D space at a right angle; substantially-parallel as they span a distal portion of a joint and diverging as they span a proximal portion of a joint; substantially-parallel as they span a proximal portion of a joint and diverging as they span a distal portion of a joint; substantially perpendicular; intersecting at an acute angle; forming vectors which intersect in 3D space at an acute angle; substantially diagonal to each other; plaited together; woven together; braided together; combining to form a 3D lattice, mesh, or grid; differing in length; nested; forming a rainbow arc configuration; radial vectors with a common point of convergence; straight vectors with a common convergence point; and arcuate elements with a common convergence point.

In an example, an article of clothing (or clothing accessory) can include a first energy pathway and a second energy pathway. In an example, a first energy pathway and a second energy pathway can each have a circular, semi-circular, or other conic section shape axis. In an example, a circular, semi-circular, or other conic section shape axis can span all or part of the cross-sectional perimeter of a body member containing a body joint. In an example, one or more aspects of the geometric relationship between these two axes can be selected from the group consisting of: substantially parallel; separated by a substantially-constant distance; intersecting at an acute angle; forming vectors which intersect in 3D space at an acute angle; combining to form a 3D mesh or grid; differing in length; substantially concentric; nested; differing in diameter; knitted together in loops; and tangential.

In an example, first and second energy pathways which span a body member which contains a body joint can differ in cross-sectional shape. In an example, combined multivariate analysis of data from both the first and second energy pathways can provide more accurate measurement of body joint motion than data from either the first energy pathway or the second energy pathway alone. In an example, data from a first energy pathway with a first cross-sectional shape can provide more accurate measurement of body joint motion over a first range of motion and data from a second energy pathway with a second cross-sectional shape can provide more accurate measurement of body joint motion over a second range of motion. When analyzed together, data from the first and second energy pathways reduce error in measuring the full range of joint motion.

In an example, first and second energy pathways which span a body member which contains a body joint can differ in the angle at which they span the body member. In an example, combined multivariate analysis of data from both the first and second energy pathways can provide more accurate measurement of body joint motion and/or configuration than data from either the first energy pathway or the second energy pathway alone. In an example, data from the first energy pathway can provide more accurate measurement of body joint motion over a first range of motion and data from the second energy pathway can provide more accurate measurement of body joint motion over a second range of motion. When analyzed together, data from the first and second energy pathways reduce error in measuring the full range of joint motion.

In an example, an article of clothing (or clothing accessory) can include a first energy pathway and a second energy pathway. In an example, a first energy pathway and a second energy pathway which both span the same body member which contains a body joint can differ by one or more parameters selected from the group consisting of: the angle at which they span the body joint; length; longitudinal curvature or convolution; longitudinal waveform; flexibility; elasticity; electrical resistance or impedance; transparency; and cross-sectional shape. In an example, combined multivariate analysis of data from both the first and second energy pathways can provide more accurate measurement of body joint motion than analysis of data from either the first energy pathway or the second energy pathway alone. In an example, data from the first energy pathway can provide more accurate measurement of body joint motion over a first range of motion and data from the second energy pathway can provide more accurate measurement of body joint motion over a second range of motion. When analyzed together, data from the first and second energy pathways reduce error in measuring the full range of joint motion.

In an example, an article of clothing (or clothing accessory) can include a first energy pathway and a second energy pathway. In an example, a first energy pathway and a second energy pathway can each have a longitudinal axis. In an example, a longitudinal axis of an energy pathway can span the surface of a body member containing a body joint in a proximal-to-distal manner. In this disclosure, the term proximal refers to locations in (or on) the person's body which are closer to the person's mass centroid or the person's heart. The term distal refers to locations in (or on) the person's body which are further from the person's mass centroid or the person's heart. In an example, a longitudinal axis of an energy pathway can span the surface of a body member containing a body joint in a circumferential or cross-sectional manner.

In an example, first and second energy pathways which span a body member which contains a body joint can differ in flexibility. In an example, combined multivariate analysis of data from both the first and second energy pathways can provide more accurate measurement of body joint motion than data from either the first energy pathway or the second energy pathway alone. In an example, data from a more-flexible energy pathway can provide more accurate measurement of body joint motion over a first range of motion and data from a less-flexible energy pathway can provide more accurate measurement of body joint motion over a second range of motion. When analyzed together, data from the more-flexible and less-flexible energy pathways reduce error in measuring the full range of joint motion.

In an example, the flows of energy through first and second energy pathways can be independent or be separate as these flows span a body member containing a body joint. In an example, the flows of energy through first and second energy pathways can interact or combine with each other as these flows span a body member containing a body joint. In an example, first and second energy pathways can be in electromagnetic communication with each other as they span a body joint. In an example, first and second energy pathways can be in mechanical communication with each other as they span a body joint. In an example, first and second energy pathways can be in optical communication with each other as they span a body joint. In an example, first and second energy pathways can be in sonic communication with each other as they span a body joint.

In an example, an article of clothing (or clothing accessory) can comprise: a first energy pathway which is configured to span a portion of a person's body which contains a joint, wherein the first energy pathway is moved from a first configuration to a second configuration by movement of the joint, and wherein the first energy pathway has a first energy flow when the pathway is in the first configuration and a second energy flow when the pathway is in the second configuration; a first energy receiver which measures energy flow through or from the first energy pathway; a second energy pathway which is configured to span the portion of the person's body which contains the joint, wherein the second energy pathway is moved from a third configuration to a fourth configuration by movement of the joint, and wherein the second energy pathway has a third energy flow when the pathway is in the third configuration and a fourth energy flow when the pathway is in the fourth configuration; and a second energy receiver which measures energy flow through or from the second energy pathway, wherein data from the first energy receiver and the second energy receiver are analyzed to determine the configuration and/or motion of the joint.

In an example, first and second energy pathways which span a body member which contains a body joint can differ in electrical resistance or impedance. In an example, combined multivariate analysis of data from both the first and second energy pathways can provide more accurate measurement of body joint motion than data from either the first energy pathway or the second energy pathway alone. In an example, data from a higher resistance or impedance energy pathway can provide more accurate measurement of body joint motion over a first range of motion and data from a lower resistance or impedance energy pathway can provide more accurate measurement of body joint motion over a second range of motion. When analyzed together, data from the higher resistance or impedance and the lower resistance or impedance pathways reduce error in measuring the full range of joint motion.

In an example, first and second energy pathways which span a body member which contains a body joint can differ in elasticity. In an example, combined multivariate analysis of data from both the first and second energy pathways can provide more accurate measurement of body joint motion than data from either the first energy pathway or the second energy pathway alone. In an example, data from a more-flexible energy pathway can provide more accurate measurement of body joint motion over a first range of motion and data from a less-flexible energy pathway can provide more accurate measurement of body joint motion over a second range of motion. When analyzed together, data from the more-elastic and less-flexible energy pathways reduce error in measuring the full range of joint motion.

In an example, first and second energy pathways which span a body member which contains a body joint can differ in length. In an example, combined multivariate analysis of data from both the first and second energy pathways can provide more accurate measurement of body joint motion than data from either the first energy pathway or the second energy pathway alone. In an example, data from a longer energy pathway can provide more accurate measurement of body joint motion over a first range of motion and data from a shorter energy pathway can provide more accurate measurement of body joint motion over a second range of motion. When analyzed together, data from the longer and shorter energy pathways reduce error in measuring the full range of joint motion.

In an example, an article of clothing (or clothing accessory) can include a first energy pathway and a second energy pathway. In an example, a first energy pathway can have an axis which spans a body member in a longitudinal manner and a second energy pathway can have an axis which spans the same body member in a circular, semi-circular, or other conic sectional manner. In an example, the first energy pathway can span the surface of a body member containing a body joint in a proximal-to-distal manner. In an example, the second energy pathway can span the surface of the body member in a circular, semi-circular, or other conic sectional manner. In an example, one or more aspects of the geometric relationship between the first energy pathway and the second energy pathway can be selected from the group consisting of: substantially perpendicular; intersecting at a right angle; intersecting at an acute angle; defining square-shaped spaces (when projected onto a 2D plane) as they intersect; defining rhomboid-shaped spaces (when projected onto a 2D plane) as they intersect; defining trapezoid-shaped spaces (when projected onto a 2D plane) as they intersect; plaited together; woven together; braided together; combining to form a 3D mesh or grid; overlapping; and tangential.

In an example, first and second energy pathways which span a body member which contains a body joint can differ in longitudinal curvature or convolution. In an example, combined multivariate analysis of data from both the first and second energy pathways can provide more accurate measurement of body joint motion than data from either the first energy pathway or the second energy pathway alone.

In an example, first and second energy pathways which span a body member which contains a body joint can differ in longitudinal curvature or convolution. In an example, combined multivariate analysis of data from both the first and second energy pathways can provide more accurate measurement of body joint motion than data from either the first energy pathway or the second energy pathway alone. In an example, an energy pathway with a sinusoidal, zigzag, or other repeated wave shape can have a higher curvature or convolution if it has a waveform with a larger amplitude or higher wave frequency. In an example, data from a highly curved or convoluted energy pathway can provide more accurate measurement of body joint motion over a first range of motion and data from a less curved or convoluted energy pathway can provide more accurate measurement of body joint motion over a second range of motion. When analyzed together, data from the highly curved or convoluted and the less curved or convoluted energy pathways reduce error in measuring the full range of joint motion.

In an example, a middle plane of a multi-plane electrical energy pathway can be electroconductive, while upper and lower planes of the electrical energy pathway are non-electroconductive (e.g. insulating). In an example, the cross-sectional core of an electrical energy pathway can be more electroconductive than the cross-sectional perimeter (e.g. coating) of the electrical energy pathway. In an example, the middle portion of an electrical energy pathway can be made with a first percentage and/or proportion of electroconductive material and the end portions of the electrical energy pathway can be made with a second percentage and/or proportion of electroconductive material, wherein the second percentage and/or proportion is less than the first percentage and/or proportion. In an example, the middle portion of an optical energy pathway (e.g. optical fiber) can be less transparent than the end portions of the optical energy pathway. In another embodiment, the proximal portion of an energy pathway can have a lower durometer level than the distal portion of the energy pathway.

In another example, there can be variation in pathway thickness within a cross-section of an energy pathway. In an example, an electrical energy pathway can comprise undulations (e.g. serpentine, sinusoidal, and/or zigzag waves or loops) of electroconductive material which are adhered to a layer of non-electroconductive elastomeric material. In an example, the cross-sectional core of an energy pathway can be less concave than the cross-sectional perimeter (e.g. coating or cladding) of the energy pathway. In an example, the middle portion of an energy pathway can have a higher durometer level than the end portions of the energy pathway. In an example, the proximal portion of an energy pathway can be narrower than the distal portion of the energy pathway.

In another embodiment, there can be intra-pathway variation in the materials used to make an energy pathway along the longitudinal axis of the energy pathway. In an example, undulations (e.g. serpentine, sinusoidal, and/or zigzag waves or loops) in a middle portion of an energy pathway can be smaller than those in end portions of the energy pathway. In an example, an electrical energy pathway can comprise undulations (e.g. serpentine, sinusoidal, and/or zigzag waves or loops) of electroconductive material which are attached to a layer of non-electroconductive elastomeric material. In another embodiment, the cross-sectional core of an energy pathway can be more circular than the cross-sectional perimeter (e.g. coating or cladding) of the energy pathway. In an example, the middle portion of an energy pathway can be wider than the end portions of the energy pathway.

In another example, the proximal portion of an energy pathway can be more circular than the distal portion of the energy pathway. In an example, there can be intra-pathway variation in the elasticity and/or Young's modulus of an energy pathway. In an example, undulations (e.g. serpentine, sinusoidal, and/or zigzag waves or loops) in a middle portion of an energy pathway can be larger than those in end portions of the energy pathway. In an example, a middle plane of a three-plane electrical energy pathway can be electroconductive, while upper and lower planes of the electrical energy pathway are non-electroconductive (e.g. insulating). In another embodiment, the cross-sectional core of an electrical energy pathway can be electroconductive and the cross-sectional perimeter (e.g. coating) of the electrical energy pathway can be non-electroconductive (e.g. insulating).

In an example, the middle portion of an energy pathway can be less concave than the end portions of the energy pathway. In an example, the proximal portion of an electrical energy pathway can be made with a mixture of materials with a first set of electrical property values (e.g. electrical resistance, impedance, and/or capacitance) and the distal portion of the electrical energy pathway can be made with a second mixture of materials with a second set of electrical property values (e.g. electrical resistance, impedance, and/or capacitance), wherein the second set is different than the first set. In an example, the proximal portion of an optical energy pathway (e.g. optical fiber) can be made (e.g. doped or mixed) with a first percentage and/or proportion of opaque material (e.g. dye) and the distal portion of the optical energy pathway (e.g. optical fiber) can be made (e.g. doped or mixed) with a second percentage and/or proportion of opaque material, wherein the second percentage and/or proportion is less than the first percentage and/or proportion. In another embodiment, there can be variation in pathway width within a lateral cross-section of an energy pathway. In an example, a first plane of a multi-plane electrical energy pathway can be electroconductive and a second plane of the electrical energy pathway can be non-electroconductive (e.g. insulating).

In an example, an electrical energy pathway can comprise undulations (e.g. serpentine, sinusoidal, and/or zigzag waves or loops) of electroconductive material which are printed between two pre-stretched layers of non-electroconductive elastomeric material. In an example, the distal portion of an energy pathway can have wider undulations (e.g. serpentine, sinusoidal, and/or zigzag waves or loops) than the proximal portion of the energy pathway. In an example, the middle portion of an energy pathway can have fewer layers than the end portions of the energy pathway. In another embodiment, the proximal portion of an energy pathway can have wider undulations (e.g. serpentine, sinusoidal, and/or zigzag waves or loops) than the distal portion of the energy pathway. In an example, there can be intra-pathway variation in the spacing of undulations (e.g. serpentine, sinusoidal, and/or zigzag waves or loops) of an energy pathway along the longitudinal axis of an energy pathway.

In another example, a middle plane of a three-plane electrical energy pathway can be non-electroconductive (e.g. insulating), while upper and lower planes of the electrical energy pathway are electroconductive. In another embodiment, the cross-sectional core of an energy pathway can be more elastic than the cross-sectional perimeter (e.g. coating or cladding) of the energy pathway. In an example, the middle portion of an energy pathway can be less circular than the end portions of the energy pathway. In an example, the proximal portion of an electrical energy pathway can be made with a first percentage and/or proportion of electroconductive material and the distal portion of the electrical energy pathway can be made with a second percentage and/or proportion of electroconductive material. In an example, the proximal portion of an optical energy pathway (e.g. optical fiber) can be made (e.g. doped or mixed) with a first percentage and/or proportion of opaque material (e.g.

dye) and the distal portion of the optical energy pathway (e.g. optical fiber) can be made (e.g. doped or mixed) with a second percentage and/or proportion of opaque material, wherein the second percentage and/or proportion is greater than the first percentage and/or proportion.

In another example, there can be variation in the elasticity and/or Young's modulus of an energy pathway along the longitudinal axis of the energy pathway. In an example, an electrical energy pathway can comprise a non-electroconductive layer between two electroconductive layers. In an example, the cross-sectional core of an energy pathway can be less elastic than the cross-sectional perimeter (e.g. coating or cladding) of the energy pathway. In another embodiment, the middle portion of an energy pathway can be made with a first mixture of materials and the end portions of the energy pathway can be made with a second mixture of materials. In an example, the proximal portion of an electrical energy pathway can be made with a first percentage and/or proportion of electroconductive material and the distal portion of the electrical energy pathway can be made with a second percentage and/or proportion of electroconductive material, wherein the second percentage and/or proportion is greater than the first percentage and/or proportion.

In an example, the proximal portion of an optical energy pathway (e.g. optical fiber) can be more transparent than the distal portion of the optical energy pathway. In an example, there can be variation in the number of layers along the longitudinal axis of an energy pathway. In an example, an electrical energy pathway can comprise a non-electroconductive flexible plane between two electroconductive flexible planes. In an example, the cross-sectional core of an energy pathway can be thicker than the cross-sectional perimeter (e.g. coating or cladding) of the energy pathway. In another embodiment, the middle portion of an energy pathway can be more convex than the end portions of the energy pathway.

In an example, the proximal portion of an electrical energy pathway can be made with a first percentage and/or proportion of electroconductive material and the distal portion of the electrical energy pathway can be made with a second percentage and/or proportion of electroconductive material, wherein the second percentage and/or proportion is less than the first percentage and/or proportion. In an example, the proximal portion of an optical energy pathway (e.g. optical fiber) can be less transparent than the distal portion of the optical energy pathway. In an example, there can be variation in the transparency of an optical energy pathway (e.g. optical fiber) along the longitudinal axis of the optical energy pathway. In another embodiment, a middle layer of a three-layer electrical energy pathway can be non-electroconductive (e.g. insulating), while upper and lower layers of the electrical energy pathway are electroconductive. In an example, an optical energy pathway (e.g. optical fiber) can comprise a reflective and/or opaque flexible plane between two transparent flexible planes.

In another example, the middle portion of an electrical energy pathway can be made with a mixture of materials with a first set of electrical property values (e.g. electrical resistance, impedance, and/or capacitance) and the end portions of the electrical energy pathway can be made with a second mixture of materials with a second set of electrical property values (e.g. electrical resistance, impedance, and/or capacitance), wherein the second set has different values than the first set. In another embodiment, the middle portion of an optical energy pathway (e.g. optical fiber) can be made (e.g. doped or mixed) with a first percentage and/or proportion of opaque material (e.g. dye) and the end portions of the optical energy pathway (e.g. optical fiber) can be made (e.g. doped or mixed) with a second percentage and/or proportion of opaque material, wherein the second percentage and/or proportion is less than the first percentage and/or proportion. In an example, the proximal portion of an energy pathway can have a higher durometer level than the distal portion of the energy pathway. In an example, there can be intra-pathway variation in the width of an energy pathway. In an example, an electrical energy pathway can comprise an electroconductive layer between two non-electroconductive layers.

In an example, the cross-sectional core of an energy pathway can be thinner than the cross-sectional perimeter (e.g. coating or cladding) of the energy pathway. In another embodiment, the middle portion of an energy pathway can be more concave than the end portions of the energy pathway. In an example, the proximal portion of an energy pathway can be less convex than the distal portion of the energy pathway. In an example, the proximal portion of an undulating energy pathway can have closer-together undulations (e.g. serpentine, sinusoidal, and/or zigzag waves or loops) than the distal portion of the undulating energy pathway. In an example, undulations (e.g. serpentine, sinusoidal, and/or zigzag waves or loops) in a proximal portion of an energy pathway can be closer together than those in a distal portion of the energy pathway.

In an example, an electrical energy pathway can comprise an electroconductive flexible plane between two non-electroconductive flexible planes. In another embodiment, the cross-sectional core of an energy pathway can be wider than the cross-sectional perimeter (e.g. coating or cladding) of the energy pathway. In an example, the middle portion of an energy pathway can be more circular than the end portions of the energy pathway. In an example, the proximal portion of an energy pathway can be less concave than the distal portion of the energy pathway. In another embodiment, there can be intra-pathway variation in energy pathway thickness.

In an example, undulations (e.g. serpentine, sinusoidal, and/or zigzag waves or loops) in a middle portion of an energy pathway can be closer together than those in end portions of the energy pathway. In an example, an electrical energy pathway can comprise undulations (e.g. serpentine, sinusoidal, and/or zigzag waves or loops) of electroconductive material which are attached to a layer of non-electroconductive material. In an example, the cross-sectional core of an energy pathway can be narrower than the cross-sectional perimeter (e.g. coating or cladding) of the energy pathway. In an example, the middle portion of an energy pathway can be narrower than the end portions of the energy pathway. In an example, the proximal portion of an energy pathway can be less circular than the distal portion of the energy pathway.

In another example, there can be intra-pathway variation in the amplitude of undulations (e.g. serpentine, sinusoidal, and/or zigzag waves or loops) of an energy pathway. In an example, undulations (e.g. serpentine, sinusoidal, and/or zigzag waves or loops) in a proximal portion of an energy pathway can be farther apart than those in a distal portion of the energy pathway. In an example, an electrical energy pathway can comprise undulations (e.g. serpentine, sinusoidal, and/or zigzag waves or loops) of electroconductive material which are printed between two layers of non-electroconductive elastomeric material. In another embodiment, the cross-sectional core of an optical energy pathway (e.g. optical fiber) can be more transparent than the cross-sectional perimeter (e.g. coating or cladding) of the optical energy pathway. In an example, the middle portion of an energy pathway can have a lower Young's modulus than the end portions of the energy pathway.

In another embodiment, the proximal portion of an energy pathway can be thinner than the distal portion of the energy pathway. In an example, there can be intra-pathway variation in the number of layers of an energy pathway along the longitudinal axis of the energy pathway. In an example, an electrical energy pathway can comprise undulations (e.g. serpentine, sinusoidal, and/or zigzag waves or loops) of electroconductive material which are inserted between two layers of non-electroconductive elastomeric material. In an example, the cross-sectional core of an energy pathway can be less circular than the cross-sectional perimeter (e.g. coating or cladding) of the energy pathway. In an example, the middle portion of an energy pathway can have a lower elasticity than the end portions of the energy pathway.

In an example, the proximal portion of an energy pathway can be thicker than the distal portion of the energy pathway. In another embodiment, there can be intra-pathway variation in the number of layers of an energy pathway. In an example, a middle layer of a three-layer optical energy pathway (e.g. optical fiber) can be transparent, while upper and lower layers of the optical energy pathway (e.g. optical fiber) are reflective and/or opaque. In another embodiment, an optical energy pathway (e.g. optical fiber) can comprise a transparent layer between two reflective and/or opaque layers. In an example, the middle portion of an electrical energy pathway can be made with a first percentage and/or proportion of electroconductive material and the end portions of the electrical energy pathway can be made with a second percentage and/or proportion of electroconductive material.

In an example, the middle portion of an optical energy pathway (e.g. optical fiber) can be made (e.g. doped or mixed) with a first percentage and/or proportion of opaque material (e.g. dye) and the end portions of the optical energy pathway (e.g. optical fiber) can be made (e.g. doped or mixed) with a second percentage and/or proportion of opaque material, wherein the second percentage and/or proportion is greater than the first percentage and/or proportion. In an example, the proximal portion of an energy pathway can have a lower elasticity than the distal portion of the energy pathway. In an example, there can be variation in cross-sectional shape along the longitudinal axis of an energy pathway. In an example, a middle layer of a three-layer optical energy pathway (e.g. optical fiber) can be reflective and/or opaque, while upper and lower layers of the optical energy pathway (e.g. optical fiber) are transparent. In an example, an optical energy pathway (e.g. optical fiber) can comprise a transparent flexible plane between two reflective and/or opaque flexible planes.

In an example, the middle portion of an electrical energy pathway can be made with a first percentage and/or proportion of electroconductive material and the end portions of the electrical energy pathway can be made with a second percentage and/or proportion of electroconductive material, wherein the second percentage and/or proportion is greater than the first percentage and/or proportion. In an example, the middle portion of an optical energy pathway (e.g. optical fiber) can be more transparent than the end portions of the optical energy pathway. In an example, the proximal portion of an energy pathway can have a lower Young's modulus than the distal portion of the energy pathway. In an example, there can be variation in pathway thickness along the longitudinal axis of an energy pathway. In another embodiment, a first layer of a multi-layer electrical energy pathway can be electroconductive and a second layer of the electrical energy pathway can be non-electroconductive (e.g. insulating).

In another example, an electrical energy pathway can comprise undulations (e.g. serpentine, sinusoidal, and/or zigzag waves or loops) of electroconductive material which are adhered between two layers of non-electroconductive elastomeric material. In an example, the cross-sectional core of an optical energy pathway (e.g. optical fiber) can be transparent and the cross-sectional perimeter (e.g. coating or cladding) of the optical energy pathway (e.g. optical fiber) can be reflective and/or opaque. In another embodiment, the middle portion of an energy pathway can have a lower durometer level than the end portions of the energy pathway. In an example, the proximal portion of an energy pathway can be wider than the distal portion of the energy pathway. In another embodiment, there can be intra-pathway variation in the proximity of undulations (e.g. serpentine, sinusoidal, and/or zigzag waves or loops) of an energy pathway.

In an example, a first plane of a multi-plane optical energy pathway (e.g. optical fiber) can be transparent (e.g. light transmitting) and a second plane of the optical energy pathway (e.g. optical fiber) can be reflective and/or opaque (e.g. not light transmitting). In an example, an electrical energy pathway can comprise undulations (e.g. serpentine, sinusoidal, and/or zigzag waves or loops) of electroconductive material which are adhered between two pre-stretched layers of non-electroconductive elastomeric material. In an example, the distal portion of an undulating energy pathway can have closer-together undulations (e.g. serpentine, sinusoidal, and/or zigzag waves or loops) than the proximal portion of the undulating energy pathway. In an example, the middle portion of an energy pathway can have greater elasticity than the end portions of the energy pathway. In an example, the proximal portion of an energy pathway can have more layers than the distal portion of the energy pathway.

In another example, there can be intra-pathway variation in the transparency of an optical energy pathway. In an example, a middle plane of a multi-plane electrical energy pathway can be non-electroconductive (e.g. insulating), while upper and lower planes of the electrical energy pathway are electroconductive. In an example, the cross-sectional core of an electrical energy pathway can be less electroconductive than the cross-sectional perimeter (e.g. coating) of the electrical energy pathway. In an example, the middle portion of an energy pathway can be less convex than the end portions of the energy pathway. In an example, the middle portion of an undulating energy pathway can have closer-together undulations (e.g. serpentine, sinusoidal, and/ or zigzag waves or loops) than the end portions of the undulating energy pathway.

In another embodiment, the proximal portion of an optical energy pathway (e.g. optical fiber) can be made with a mixture of materials with a first set of optical property values (e.g. light transmission and/or reflection) and the distal portion of the optical energy pathway (e.g. optical fiber) can be made with a second mixture of materials with a second set of optical property values (e.g. light transmission and/or reflection), wherein the second set is different than the first set. In an example, there can be variation in pathway width along the longitudinal axis of an energy pathway. In another embodiment, a middle layer of a multi-layer electrical energy pathway can be electroconductive, while upper and lower layers of the electrical energy pathway are non-electroconductive (e.g. insulating). In an example, an energy pathway can comprise a first layer which transmits electrical energy and a second layer which transmits light energy. In an example, the end portions of an energy pathway can have closer-together undulations (e.g. serpentine, sinusoidal, and/or zigzag waves or loops) than the middle portion of the energy pathway.

In an example, the middle portion of an energy pathway can have more layers than the end portions of the energy pathway. In an example, the proximal portion of an energy pathway can have fewer layers than the distal portion of the energy pathway. In an example, there can be intra-pathway variation in the transparency of an optical energy pathway along the longitudinal axis of the pathway. In an example, a middle layer of a three-layer electrical energy pathway can be electroconductive, while upper and lower layers of the electrical energy pathway are non-electroconductive (e.g. insulating). In an example, an optical energy pathway (e.g. optical fiber) can comprise a reflective and/or opaque layer between two transparent layers.

In another example, the end portions of an undulating energy pathway can have closer-together undulations (e.g. serpentine, sinusoidal, and/or zigzag waves or loops) than the middle portion of the undulating energy pathway. In an example, the middle portion of an optical energy pathway (e.g. optical fiber) can be made with a mixture of materials with a first set of optical property values (e.g. light transmission and/or reflection) and the end portions of the optical energy pathway (e.g. optical fiber) can be made with a second mixture of materials with a second set of optical property values (e.g. light transmission and/or reflection), wherein the second set is different than the first set. In an example, the proximal portion of an energy pathway can have a higher Young's modulus than the distal portion of the energy pathway. In an example, there can be intra-pathway variation in the wavelength of undulations (e.g. serpentine, sinusoidal, and/or zigzag waves or loops) of an energy pathway along the longitudinal axis of an energy pathway. In another embodiment, an electrical energy pathway can comprise undulations (e.g. serpentine, sinusoidal, and/or zigzag waves or loops) of electroconductive material which are printed onto a layer of non-electroconductive elastomeric material.

In an example, the cross-sectional core of an energy pathway can be less convex than the cross-sectional perimeter (e.g. coating or cladding) of the energy pathway. In another embodiment, the middle portion of an energy pathway can have a higher Young's modulus than the end portions of the energy pathway. In an example, the proximal portion of an energy pathway can be made with a first mixture of materials and the distal portion of the energy pathway can be made with a second mixture of materials. In an example, there can be intra-pathway variation in the materials used to make an energy pathway. In an example, undulations (e.g. serpentine, sinusoidal, and/or zigzag waves or loops) in a proximal portion of an energy pathway can be smaller than those in a distal portion of the energy pathway.

In another example, a first layer of a multi-layer optical energy pathway (e.g. optical fiber) can be transparent (e.g. light transmitting) and a second layer of the optical energy pathway (e.g. optical fiber) can be reflective and/or opaque (e.g. not light transmitting). In an example, an electrical energy pathway can comprise undulations (e.g. serpentine, sinusoidal, and/or zigzag waves or loops) of electroconductive material which are inserted between two pre-stretched layers of non-electroconductive elastomeric material. In an example, the cross-sectional core of an optical energy pathway (e.g. optical fiber) can be less transparent than the cross-sectional perimeter (e.g. coating or cladding) of the optical energy pathway. In another embodiment, the middle portion of an energy pathway can have closer-together undulations (e.g. serpentine, sinusoidal, and/or zigzag waves or loops) than the end portions of the energy pathway. In an example, the proximal portion of an energy pathway can have closer-together undulations (e.g. serpentine, sinusoidal, and/or zigzag waves or loops) than the distal portion of the energy pathway.

In an example, there can be intra-pathway variation in the spacing of undulations (e.g. serpentine, sinusoidal, and/or zigzag waves or loops) of an energy pathway. In an example, an electrical energy pathway can comprise undulations (e.g. serpentine, sinusoidal, and/or zigzag waves or loops) of electroconductive material which are adhered to a layer of non-electroconductive material. In an example, the cross-sectional core of an energy pathway can be more concave than the cross-sectional perimeter (e.g. coating or cladding) of the energy pathway. In an example, the middle portion of an energy pathway can be thinner than the end portions of the energy pathway. In an example, the proximal portion of an energy pathway can be more concave than the distal portion of the energy pathway.

In another embodiment, there can be intra-pathway variation in the cross-sectional shape of an energy pathway. In an example, undulations (e.g. serpentine, sinusoidal, and/or zigzag waves or loops) in a proximal portion of an energy pathway can be larger than those in a distal portion of the energy pathway. In another embodiment, a middle layer of a multi-layer electrical energy pathway can be non-electroconductive (e.g. insulating), while upper and lower layers of the electrical energy pathway are electroconductive. In an example, an energy pathway can transmit both electrical energy and light energy. In an example, the end portions of an energy pathway can have wider undulations (e.g. serpentine, sinusoidal, and/or zigzag waves or loops) than the middle portion of the energy pathway.

In another example, the middle portion of an energy pathway can have wider undulations (e.g. serpentine, sinusoidal, and/or zigzag waves or loops) than end portions of the energy pathway. In an example, the proximal portion of an energy pathway can have a greater elasticity than the distal portion of the energy pathway. In an example, there can be intra-pathway variation in the wavelength of undulations (e.g. serpentine, sinusoidal, and/or zigzag waves or loops) of an energy pathway. In another embodiment, an electrical energy pathway can comprise undulations (e.g. serpentine, sinusoidal, and/or zigzag waves or loops) of electroconductive material which are printed onto a layer of non-electroconductive material. In an example, the cross-sectional core of an energy pathway can be more convex than the cross-sectional perimeter (e.g. coating or cladding) of the energy pathway.

In an example, the middle portion of an energy pathway can be thicker than the end portions of the energy pathway. In an example, the proximal portion of an energy pathway can be more convex than the distal portion of the energy pathway. In an example, there can be intra-pathway variation in the amplitude of undulations (e.g. serpentine, sinusoidal, and/or zigzag waves or loops) of an energy pathway along the longitudinal axis of an energy pathway. In an example, undulations (e.g. serpentine, sinusoidal, and/or zigzag waves or loops) in a middle portion of an energy pathway can be farther apart than those in end portions of the energy pathway.

In an example, an energy pathway can have a radially-asymmetric cross-sectional shape. In an example, an energy pathway can have a curved longitudinal axis. In an example, an energy pathway can have a rectangular cross-sectional shape. In an example, an energy pathway can have a square cross-sectional shape. In an example, an energy pathway can have a straight longitudinal axis when a joint which it spans is fully extended. In an example, there can be longitudinal variation in the elasticity of a flexible energy pathway.

In an example, there can be longitudinal variation in the width of a flexible energy pathway. In an example, an energy pathway can have a circular cross-sectional shape. In an example, there can be longitudinal variation in the concavity of a flexible energy pathway. In an example, an energy pathway can be U-shaped, wherein an energy emitter and an energy receiver are both on (and/or in electromagnetic communication with) the proximal end of the pathway. In an example, an energy pathway can have an elliptical cross-sectional shape.

In an example, an energy pathway can comprise an undulating, sinusoidal, serpentine, meandering and/or zigzag conductive strip which is attached to a pre-stretched non-conductive substrate. In an example, there can be longitudinal variation in the convexity of a flexible energy pathway. In an example, an energy pathway can have an undulating, sinusoidal, serpentine, meandering and/or zigzag shaped longitudinal axis. In an example, an energy pathway can have a length within the range of 5 to 25 cm. In an example, there can be longitudinal variation in the number of layers in a flexible energy pathway.

In an example, energy pathways can be incorporated into smart clothing to measure changes in a person's body configuration and/or changes in their muscle activity. In an example, EMG (electromyographic) sensors can be placed along the surface of a person's body in proximity to selected groups of body muscles. Patterns of electrical energy emitted by the muscles and/or the nerves which enervate the muscles are recorded by the sensors which, in turn, can be used to measure and model muscle activity.

In an example, an article of clothing (or clothing accessory) can have pockets, pouches, chambers, and/or layers into which energy receivers are inserted. In an example, energy receivers can receive (e.g. receive, detect, and/or measure) electrical energy. In an example, energy receivers can receive (e.g. receiver, detect, and/or measure) light energy. In an example, an energy receiver which receives light can be a photodetector and/or photodiode. In an example, energy receivers can be sewn, woven, knitted, and/or embroidered into an article of clothing (or clothing accessory). In an example, energy receivers can be adhered to an article of clothing (or clothing accessory), such as by glue. In an example, energy receivers can be bonded to an article of clothing (or clothing accessory) by heating and/or melting. In an example, energy receivers can be printed onto an article of clothing (or clothing accessory). In an example, energy receivers can be attached to an article of clothing (or clothing accessory) by hook and loop material. In an example, energy receivers can be attached to an article of clothing (or clothing accessory) by snaps, clips, clasps, hooks, buttons, or pins.

In an example, an article of clothing (or clothing accessory) can have pockets, pouches, chambers, and/or layers into which flexible energy pathways are inserted. In an example, flexible energy pathways can be sewn, woven, knitted, and/or embroidered into an article of clothing (or clothing accessory). In an example, flexible energy pathways can be adhered to an article of clothing (or clothing accessory), such as by glue. In an example, flexible energy pathways can be bonded to an article of clothing (or clothing accessory) by heating or melting. In an example, flexible energy pathways can be printed onto an article of clothing (or clothing accessory). In an example, a flexible energy pathways can be attached to an article of clothing (or clothing accessory) by hook and loop material. In an example, flexible energy pathways can be attached to an article of clothing (or clothing accessory) by a snaps, clips, clasps, hooks, buttons, or pins.

In an example, an article of clothing (or clothing accessory) can comprise a plurality of flexible electroconductive pathways. In an example, an article of clothing (or clothing accessory) can comprise a plurality of flexible energy pathways made from electrically-transmissive elastic material. In an example, an article of clothing (or clothing accessory) can comprise a plurality of flexible optical fibers. In an example, an article of clothing (or clothing accessory) can comprise a plurality of flexible energy pathways made from optically-transmissive elastic material.

In an example, flexible energy pathways can be sewn, woven, and/or embroidered into an article of clothing (or clothing accessory). In an example, flexible energy pathways which are sewn, woven, and/or embroidered into an article of clothing (or clothing accessory) at different locations and/or with different orientations can measure stretching, compression, and/or twisting, and/or rotation of the clothing at different locations. In an example, flexible energy pathways which are sewn, woven, and/or embroidered into an article of clothing (or clothing accessory) at different locations and/or with different orientations can measure stretching, compression, and/or twisting, and/or rotation of different body joints. In an example, flexible energy pathways which are sewn, woven, and/or embroidered into an article of clothing (or clothing accessory) at different locations and/or with different orientations can measure the extension, flexion, and/or torsion of different body joints.

In an example, an energy pathway can comprise PEG, PET, or PTFE impregnated (or doped, embedded, or coated) with tungsten particles or pieces, wherein the pathway longitudinally spans the dorsal surface of an elbow and/or the ventral surface of a knee. In an example, an energy pathway can comprise rayon (thread or yarn) coated (or embedded) with tungsten particles or pieces, wherein the pathway longitudinally spans the dorsal surface of an elbow and/or the ventral surface of a knee. In an example, an energy pathway can comprise silk thread coated (or embedded) with gallium, wherein the pathway longitudinally spans the dorsal surface of an elbow and/or the ventral surface of a knee.

In an example, an optical strain sensor can comprise a plurality of light-transmitting energy pathways, wherein stretching, elongation, bending, compression, and/or twisting of the strain sensor changes the amount of light transmitted from one energy pathway to another. In an example, an optical strain sensor can comprise a plurality of light-transmitting energy pathways, wherein light can leaks (e.g. is transmitted) from one energy pathway to another, and wherein stretching, elongation, bending, compression, and/or twisting of the strain sensor changes the amount of light that leaks from one energy pathway to another. In an example, an optical strain sensor can comprise a plurality of parallel light-transmitting energy pathways, wherein light can leaks (e.g. is transmitted) from one energy pathway to another, and wherein stretching, elongation, bending, compression, and/or twisting of the strain sensor changes the amount of light that leaks from one energy pathway to another.

In an example, a flexible energy pathway can comprise a piezoelectric strain sensor. In an example, changes in the polarization of light transmitted through a flexible energy pathway which spans a body joint can be used to measure changes in at least one angle of that body joint. In an example, changes in the polarization of light transmitted through a flexible energy pathway which spans a body joint can be used to measure changes in the flexion, extension, and/or torsion of that body joint. In an example, changes in the spectrum of light transmitted through a flexible energy pathway which spans a body joint can be used to measure changes in at least one angle of that body joint.

In an example, a first inertial motion unit can be distal relative to a first set of energy emitters. In an example, a second inertial motion unit can be between energy receivers in a second set of energy receivers. In an example, a first inertial motion unit can be distal relative to a first set of energy pathways. In an example, a first inertial motion unit can be proximal relative to a first set of energy emitters. In an example, a first inertial motion unit can be between energy pathways in a first set of energy pathways. In an example, a first inertial motion unit can be distal relative to a first set of energy receivers.

In an example, a second inertial motion unit can be between energy pathways in a second set of energy pathways. In an example, a second inertial motion unit can be distal relative to a second set of energy emitters. In an example, a first inertial motion unit can be between energy receivers in a first set of energy receivers. In an example, a second inertial motion unit can be distal relative to a second set of energy pathways. In an example, a second inertial motion unit can be distal relative to a second set of energy receivers. In an example, a second inertial motion unit can be proximal relative to a second set of energy emitters.

In an example, a first inertial motion unit can be proximal relative to a first set of energy pathways. In an example, a second inertial motion unit can be proximal relative to a second set of energy pathways. In an example, a second inertial motion unit can be proximal relative to a second set of energy receivers. In an example, a first inertial motion unit can be proximal relative to a first set of energy receivers. In an example, a second inertial motion unit can be between energy emitters in a second set of energy emitters. In an example, a first inertial motion unit can be between energy emitters in a first set of energy emitters.

In an example, an inertial motion unit can be distal relative to an energy transmitting pathway. In an example, an inertial motion unit can be located on a body limb between a proximal first cross-sectional perimeter (e.g. virtual ring) around the body limb and a distal second cross-sectional perimeter around the body limb, wherein the first cross-sectional perimeter intersects the distal third of the energy transmitting pathway. In an example, an inertial motion unit and the proximal third of an energy transmitting pathway can both be intersected by the same cross-sectional perimeter (e.g. virtual ring) around a body limb. In an example, an inertial motion unit can be located on a body limb between a proximal first cross-sectional perimeter (e.g. virtual ring) around the body limb and a distal second cross-sectional perimeter around the body limb, wherein the first cross-sectional perimeter intersects the distal half of the energy transmitting pathway.

In one embodiment, there can be a first number of inertial motion units which are distal relative to the center of an energy transmitting pathway and a second number of inertial motion units which are proximal relative to the center, wherein the second number is greater than the first number. In an example, first and second inertial motion units can be on opposite sides of an energy transmitting pathway. In an example, a first inertial motion unit can be parallel with the distal half of an energy transmitting pathway and a second inertial motion unit can be parallel with the proximal half of the energy transmitting pathway. In an example, an inertial motion unit can be located between 1 and 3 inches, in a distal direction, from the distal end of an energy transmitting pathway. In an example, first and second inertial motion units can both be co-located with an energy transmitting pathway. In one embodiment, two inertial motion units can be located between 1 and 3 inches, in a distal direction, from the distal end of an energy transmitting pathway.

In another example, a first inertial motion unit can be attached to the distal half of an energy transmitting pathway and a second inertial motion unit can be attached to the proximal half of the energy transmitting pathway. In an example, an inertial motion unit can be attached to the proximal third of an energy transmitting pathway. In one embodiment, an inertial motion unit can be located on a body limb between a proximal first cross-sectional perimeter (e.g. virtual ring) around the body limb and a distal second cross-sectional perimeter around the body limb, wherein the first cross-sectional perimeter and the second cross-sectional perimeter both intersect the distal third of the energy transmitting pathway.

In an example, two inertial motion units can be attached to the distal third of an energy transmitting pathway. In one embodiment, a first inertial motion unit can be within 1 to 3 inches of the distal end of an energy transmitting pathway and a second inertial motion unit can be within 1 to 3 inches of the proximal end of the energy transmitting pathway. In an example, an inertial motion unit can be located between 2 and 6 inches, in a proximal direction, from the proximal end of an energy transmitting pathway. In an example, first and second inertial motion units can both be distal relative to an energy transmitting pathway. In an example, two inertial motion units can be located between 2 and 6 inches, in a proximal direction, from the proximal end of an energy transmitting pathway. In an example, an inertial motion unit and an energy transmitting pathway can both be on the dorsal side of a body limb.

In one embodiment, an inertial motion unit can be located between 2 and 6 inches, in a distal direction, from the distal end of an energy transmitting pathway. In an example, first and second inertial motion units can both be on the same side of the circumference of a body limb. In an example, two inertial motion units can be located between 2 and 6 inches, in a distal direction, from the distal end of an energy transmitting pathway. In an example, two inertial motion units can be distal relative to an energy transmitting pathway. In an example, an inertial motion unit and an energy transmitting pathway can both be on the ventral side of a body limb. In one embodiment, an inertial motion unit can be located between one-half inch and one inch, in a proximal direction, from the proximal end of an energy transmitting pathway. In an example, first and second inertial motion units can both be on the dorsal side of a body limb.

In another example, two inertial motion units can be located between one-half inch and one inch, in a proximal direction, from the proximal end of an energy transmitting pathway. In an example, a first inertial motion unit can be on a first side of the longitudinal axis of an energy transmitting pathway and a second inertial motion unit can be on a second side of the longitudinal axis of the energy transmitting pathway, wherein the second side is opposite the first side. In an example, an inertial motion unit can be co-located with the proximal end of an energy transmitting pathway. In an example, an inertial motion unit can be on the dorsal side of a body limb and an energy transmitting pathway can be on the ventral side of the body limb.

In an example, two inertial motion units can be co-located with the distal third of an energy transmitting pathway. In one embodiment, an inertial motion unit and the distal end of an energy transmitting pathway can both be intersected by the same cross-sectional perimeter (e.g. virtual ring) around a body limb. In an example, an inertial motion unit can be located between one-half inch and one inch, in a distal direction, from the distal end of an energy transmitting pathway. In one embodiment, first and second inertial motion units can both be on the ventral side of a body limb. In an example, two inertial motion units can be located between one-half inch and one inch, in a distal direction, from the distal end of an energy transmitting pathway. In one embodiment, an inertial motion unit can be attached to the distal end of an energy transmitting pathway. In an example, an inertial motion unit and the distal half of an energy transmitting pathway can both be intersected by the same cross-sectional perimeter (e.g. virtual ring) around a body limb. In an example, an inertial motion unit can be located on a body limb between a proximal first cross-sectional perimeter (e.g. virtual ring) around the body limb and a distal second cross-sectional perimeter around the body limb, wherein the first cross-sectional perimeter intersects the proximal half of the energy transmitting pathway.

In an example, first and second inertial motion units can both be on the same side of an energy transmitting pathway. In an example, two inertial motion units can be on a first side of the circumference of a body limb and an energy transmitting pathway can be on a second side of the circumference of a body limb, wherein the second side is opposite the first side. In an example, an inertial motion unit and the distal third of an energy transmitting pathway can both be intersected by the same cross-sectional perimeter (e.g. virtual ring) around a body limb. In an example, an inertial motion unit can be located on a body limb between a proximal first cross-sectional perimeter (e.g. virtual ring) around the body limb and a distal second cross-sectional perimeter around the body limb, wherein the second cross-sectional perimeter intersects the proximal half of the energy transmitting pathway. In one embodiment, first and second inertial motion units can both be on the same side of the longitudinal axis of an energy transmitting pathway. In an example, two inertial motion units can be proximal relative to an energy transmitting pathway. In an example, an inertial motion unit can be attached to the distal third of an energy transmitting pathway.

In another example, an inertial motion unit can be located on a body limb between a proximal first cross-sectional perimeter (e.g. virtual ring) around the body limb and a distal second cross-sectional perimeter around the body limb, wherein the first cross-sectional perimeter and the second cross-sectional perimeter both intersect the proximal half of the energy transmitting pathway. In an example, there can be a first number of inertial motion units which are distal relative to the distal end of an energy transmitting pathway and a second number of inertial motion units which are proximal relative to the proximal end of the energy transmitting pathway, wherein the second number is less than the first number. In an example, a first inertial motion unit can be parallel with the distal end of an energy transmitting pathway and a second inertial motion unit can be parallel with the proximal end of the energy transmitting pathway. In one embodiment, an inertial motion unit can be attached to the distal half of an energy transmitting pathway.

In an example, an inertial motion unit can be located on a body limb between a proximal first cross-sectional perimeter (e.g. virtual ring) around the body limb and a distal second cross-sectional perimeter around the body limb, wherein the second cross-sectional perimeter intersects the distal third of the energy transmitting pathway. In an example, there can be a first number of inertial motion units which are distal relative to the distal end of an energy transmitting pathway and a second number of inertial motion units which are proximal relative to the proximal end of the energy transmitting pathway, wherein the second number is greater than the first number.

In another example, a first inertial motion unit can be on a first side of the circumference of a body limb and a second inertial motion unit can be on a second side of the circumference of the body limb, wherein the second side is opposite the first side. In one embodiment, an inertial motion unit can be co-located with the proximal half of an energy transmitting pathway. In an example, an inertial motion unit can be on the ventral side of a body limb and an energy transmitting pathway can be on the dorsal side of the body limb. In an example, two inertial motion units can be co-located with the proximal half of an energy transmitting pathway. In an example, a first inertial motion unit can be on the ventral side of a body limb and a second inertial motion unit can be on the dorsal side of the body limb. In an example, an inertial motion unit can be co-located with the proximal third of an energy transmitting pathway.

In one embodiment, an inertial motion unit can be proximal relative to an energy transmitting pathway. In an example, two inertial motion units can be co-located with the proximal third of an energy transmitting pathway. In an example, a first inertial motion unit can be attached to the distal end of an energy transmitting pathway and a second inertial motion unit can be attached to the proximal end of the energy transmitting pathway. In an example, an inertial motion unit can be attached to the proximal end of an energy transmitting pathway. In an example, an inertial motion unit can be located on a body limb between a proximal first cross-sectional perimeter (e.g. virtual ring) around the body limb and a distal second cross-sectional perimeter around the body limb, wherein the first cross-sectional perimeter and the second cross-sectional perimeter both intersect the proximal third of the energy transmitting pathway.

In another example, two inertial motion units can be attached to an energy transmitting pathway. In an example, a first inertial motion unit can be co-located with the distal half of an energy transmitting pathway and a second inertial motion unit can be co-located with the proximal half of the energy transmitting pathway. In one embodiment, an inertial motion unit can be co-located with an energy transmitting pathway. In an example, an inertial motion unit can be located on a virtual distal extension of the longitudinal axis of an energy transmitting pathway. In one embodiment, two inertial motion units can be attached to the proximal half of an energy transmitting pathway. In an example, there can be a first number of inertial motion units which are distal relative to the center of an energy transmitting pathway and a second number of inertial motion units which are proximal relative to the center, wherein the second number is greater than the first number. In an example, a first inertial motion unit can be parallel with the distal third of an energy transmitting pathway and a second inertial motion unit can be parallel with the proximal third of the energy transmitting pathway.

In an example, an inertial motion unit can be located between 1 and 3 inches, in a proximal direction, from the proximal end of an energy transmitting pathway. In an example, first and second inertial motion units can both be attached to an energy transmitting pathway. In an example, two inertial motion units can be located between 1 and 3 inches, in a proximal direction, from the proximal end of an energy transmitting pathway. In an example, a first inertial motion unit can be co-located with the distal end of an energy transmitting pathway and a second inertial motion unit can be co-located with the proximal end of the energy transmitting pathway. In an example, an inertial motion unit can be co-located with the distal end of an energy transmitting pathway.

In an example, an inertial motion unit can be located on a virtual extension of the longitudinal axis of an energy transmitting pathway. In an example, two inertial motion units can be attached to the proximal third of an energy transmitting pathway. In one embodiment, a first inertial motion unit can be distal relative to an energy transmitting pathway and a second inertial motion unit can be proximal relative to the energy transmitting pathway. In an example, an inertial motion unit can be co-located with the distal third of an energy transmitting pathway.

In an example, an inertial motion unit can be on a first side of the circumference of a body limb and an energy transmitting pathway can be on a second side of the circumference of a body limb, wherein the second side is opposite the first side. In an example, two inertial motion units can be co-located with the distal half of an energy transmitting pathway. In an example, an inertial motion unit can be attached to an energy transmitting pathway. In an example, an inertial motion unit can be located on a body limb between a proximal first cross-sectional perimeter (e.g. virtual ring) around the body limb and a distal second cross-sectional perimeter around the body limb, wherein the second cross-sectional perimeter intersects the distal half of the energy transmitting pathway.

In another example, there can be a first number of inertial motion units which are distal relative to the center of an energy transmitting pathway and a second number of inertial motion units which are proximal relative to the center, wherein the second number is less than the first number. In one embodiment, a first inertial motion unit can be attached to the distal third of an energy transmitting pathway and a second inertial motion unit can be attached to the proximal third of the energy transmitting pathway. In an example, an inertial motion unit can be attached to the proximal half of an energy transmitting pathway.

In one embodiment, an inertial motion unit can be located on a body limb between a proximal first cross-sectional perimeter (e.g. virtual ring) around the body limb and a distal second cross-sectional perimeter around the body limb, wherein the first cross-sectional perimeter (e.g. virtual ring) and the second cross-sectional perimeter both intersect the distal half of the energy transmitting pathway. In an example, two inertial motion units can be attached to the distal half of an energy transmitting pathway. In one embodiment, an inertial motion unit and the proximal half of an energy transmitting pathway can both be intersected by the same cross-sectional perimeter (e.g. virtual ring) around a body limb. In an example, an inertial motion unit can be located on a body limb between a proximal first cross-sectional perimeter (e.g. virtual ring) around the body limb and a distal second cross-sectional perimeter around the body limb, wherein the second cross-sectional perimeter intersects the proximal third of the energy transmitting pathway.

In an example, first and second inertial motion units, as well as first and second energy transmitting pathways, can be on the same side of the circumference of a body limb. In an example: a first inertial motion unit and the proximal half of an energy transmitting pathway can both be intersected by the same proximal cross-sectional perimeter (e.g. virtual ring) around a body limb; and a second inertial motion unit and the distal half of an energy transmitting pathway can both be intersected by the same distal cross-sectional perimeter (e.g. virtual ring) around the body limb.

In an example, a first inertial motion unit can be co-located with the distal third of an energy transmitting pathway and a second inertial motion unit can be co-located with the proximal third of the energy transmitting pathway. In an example, an inertial motion unit can be co-located with the distal half of an energy transmitting pathway. In an example, an inertial motion unit can be located on a virtual proximal extension of the longitudinal axis of an energy transmitting pathway. In an example, two inertial motion units can be co-located with an energy transmitting pathway. In one embodiment, an inertial motion unit and the proximal end of an energy transmitting pathway can both be intersected by the same cross-sectional perimeter (e.g. virtual ring) around a body limb.

In another example, an inertial motion unit can be located on a body limb between a proximal first cross-sectional perimeter (e.g. virtual ring) around the body limb and a distal second cross-sectional perimeter around the body limb, wherein the first cross-sectional perimeter intersects the proximal third of the energy transmitting pathway. In an example, first and second inertial motion units can both be proximal relative to an energy transmitting pathway. In one embodiment: a first inertial motion unit and a first energy transmitting pathway can be on a first side of the circumference of a body limb; and a second inertial motion unit and a second energy transmitting pathway can be on a second side of the circumference of the body limb, wherein the second side is opposite the first side.

In an example, an energy transmitting mesh, grid, lattice, or matrix can span the surface of a body member containing an elbow. In an example, an energy transmitting mesh, grid, lattice, or matrix can span the surface of the body containing an elbow, forearm, shoulder and spine. In an example, an energy transmitting mesh, grid, lattice, or matrix can span the surface of a body member containing a hip and knee. In an example, an energy transmitting mesh, grid, lattice, or matrix can span the surface of a body member containing the spine. In an example, an energy transmitting mesh, grid, lattice, or matrix can span the surface of a body member containing an ankle, mid-tarsal and toe. In an example, an energy transmitting mesh, grid, lattice, or matrix can span the surface of the portion of the body containing the neck, shoulder and spine.

In an example, an energy transmitting mesh, grid, lattice, or matrix can be incorporated into an article of clothing (or clothing accessory) selected from the group consisting of: an upper body garment such as a shirt, t-shirt, blouse, jacket, hoodie, sweatshirt, undershirt, brassier, girdle, blouse, or glove; a lower body garment such as a pair of pants, sweatpants, trousers, slacks, leggings, tights, underpants, pantyhose, shorts, or sock; a full-body garment such as a union suit, jump suit, pair of overalls, or dress; a clothing accessory such as shoe, boot, insole, hat, cap, headband, armband, strap, torso band, tubular accessory, wristband, other band, knee or elbow brace, back brace, knee or elbow pad, belt, bandage, electronic tattoo, or wearable patch.

In an example, a plurality of energy receivers can be attached to an article of clothing (or clothing accessory) which comprises a mesh (e.g. mesh, grid, or lattice) of flexible energy pathways. In an example, a plurality of energy receivers can be attached to different locations of an article of clothing (or clothing accessory) which comprises a mesh (e.g. mesh, grid, or lattice) of flexible energy pathways. In an example, a plurality of energy receivers can be attached to a mesh (e.g. mesh, grid, or lattice) of flexible energy pathways which is part of, or attached to, an article of clothing (or clothing accessory).

In an example, an article of clothing (or clothing accessory) can comprise an energy-conducting mesh with a plurality of energy pathways. Energy emitters direct energy into the pathways at a first set of locations. Energy receivers measure energy flow through the energy pathways from a second set of locations. As the person's body moves, the mesh stretches, elongates, and/or twists, which changes the flows of energy through pathways. These changes are then analyzed to estimate the motion and/or configuration of the person's body.

In an example, energy emitters can transmit energy into a lattice, mesh, grid, or matrix. In an example, longitudinal energy pathways can be substantially evenly-spaced around the circumference of the body member containing the joint and the circumferential energy pathways are substantially-evenly spaced along the longitudinal axis of the body member containing the joint. In an example, there can be gaps and/or elements in the lattice, mesh, grid, or matrix which are substantially the same in size and are shaped like squares, rhombuses, diamonds, trapezoids, or parallelograms.

In an example, energy emitters can transmit energy into a lattice, mesh, grid, or matrix. In an example, energy pathways can be substantially parallel. In an example, the energy pathways are substantially evenly-spaced around the circumference of the body member containing the joint. In an example, there are gaps and/or elements in the lattice, mesh, grid, or matrix which are substantially the same in size and are shaped like squares, rhombuses, diamonds, trapezoids, or parallelograms.

In an example, an article of clothing (or clothing accessory) for estimating and/or modeling three-dimensional body motion, posture, and/or configuration can have a mesh, grid, lattice, or matrix of multiple flexible energy pathways, each of which longitudinally spans the same body joint in a selected configuration in order to increase measurement accuracy. Data from multiple flexible energy pathways which span the same body joint can be analyzed with multivariate statistical methods in order to estimate and/or model three-dimensional body motion, posture, and/or configuration.

In an example, an article of clothing (or clothing accessory) can comprise: a joint-spanning triangular-element mesh which is comprised of linked triangular elements and which is configured to span the surface of a portion of the human body which contains a human body joint; and a plurality of energy receivers which measure electrical energy from different locations on the joint-spanning triangular-element mesh, wherein changes in the configuration or motion of the joint-spanning mesh change the pattern of electrical energy which is measured by the plurality of energy receivers, and wherein data from the plurality of energy receivers are jointly analyzed to estimate the configuration or motion of the human body joint.

In an example, an article of clothing (or clothing accessory) can comprise a wearable electroconductive mesh, grid, lattice, or matrix which is formed by a plurality of energy pathways which span one or more body joints. As these body joints move, they bend, stretch, elongate, and/or twist the mesh, grid, lattice, or matrix. This bending, stretching, elongation, and/or twisting changes the flows of energy through different energy pathways in the mesh, grid, lattice, or matrix. These changes in energy flows can, in turn, be measured by energy receivers and analyzed together to estimate the motions and/or configurations of the body joints.

In an example, an article of clothing (or clothing accessory) can comprise energy emitters which transmit energy into a lattice, mesh, grid, or matrix. In an example, energy pathways can be substantially parallel. In an example, energy pathways can be substantially evenly-spaced around the circumference of the body member containing the joint. In an example, arcuate elements can be substantially the same in size and circular, oval, or elliptical in shape.

In an example, an article of clothing (or clothing accessory) can comprise: an energy transmitting mesh, lattice, grid, or matrix that spans the surface of a portion of a person's body which contains a joint, wherein the mesh, lattice, grid, or matrix further comprises a plurality of energy pathways; a plurality of energy emitters which direct energy into the energy pathways at a first plurality (or set) of locations; a plurality of energy receivers which measure energy flow through the energy pathways from a second plurality (or set) of locations; and wherein data from the energy receivers are analyzed in order to measure the motion and/or configuration of the body joint.

In an example, an energy transmitting mesh, grid, lattice, or matrix can span the surface of the portion of the body containing one or more body joints selected from the group consisting of: ankle, elbow, finger, forearm, hip, jaw, knee, mid-tarsal, neck, shoulder, spine, thumb, toe, and wrist. In an example, an energy transmitting mesh, grid, lattice, or matrix can span the surface of a body member containing the finger and thumb. In an example, an energy transmitting mesh, grid, lattice, or matrix can span the surface of a body member containing the finger, forearm, thumb and wrist. In an example, an energy transmitting mesh, grid, lattice, or matrix can span the surface of a body member containing the elbow, forearm and wrist.

In an example, an energy transmitting mesh, grid, lattice, or matrix can measure one or more joint configurations and/or motions selected from the group consisting of: eversion, extension, flexion, torsion, and/or inversion of the ankle; abduction, extension, flexion, lateral bending, and/or rotation of the spine; eversion, extension, flexion, torsion, and/or inversion of the elbow; extension and/or flexion of the finger or thumb; pronation, rotation, and/or supination of the forearm; abduction, adduction, extension, flexion, and/or rotation of the hip; extension and/or flexion of the jaw; abduction, adduction, extension, and/or flexion of the knee; eversion and/or inversion of the mid-tarsal; abduction, extension, flexion, and/or rotation of the neck; abduction, adduction, extension, flexion, and/or rotation of the shoulder; extension and/or flexion of the toe; and abduction, extension, flexion, and/or ulnar deviation or radial deviation of the wrist.

In an example, energy pathways in an energy transmitting mesh, grid, lattice, or matrix can have substantially straight configurations when a joint is fully extended. In an example, energy pathways in an energy transmitting mesh, grid, lattice, or matrix can have arcuate shapes, even when a joint is fully extended. In an example, an energy transmitting mesh, grid, lattice, or matrix can have a repeating pattern or waveform selected from the group consisting of: simple sinusoidal wave; composite sinusoidal wave; saw-tooth wave or zigzag; and square wave. In an example, an energy pathway can have a shape which is a conic section. In an example, an energy pathway can have a shape which is a spiral or helix. In an example, an energy pathway can have a shape which is a chain of loops.

In an example, energy pathways in an energy transmitting mesh, grid, lattice, or matrix can differ by one or more parameters selected from the group consisting of: the angle at which they span the body joint; length; longitudinal curvature or convolution; longitudinal waveform; flexibility; elasticity; electrical resistance or impedance; transparency; and cross-sectional shape. In an example, energy pathways in an energy transmitting mesh, grid, lattice, or matrix can differ in the angles at which they span the body member. In an example, energy pathways in an energy transmitting mesh, grid, lattice, or matrix can differ in length. In an example, energy pathways in an energy transmitting mesh, grid, lattice, or matrix can differ in longitudinal curvature or convolution.

In an example, energy receivers and/or energy emitters can be modular and/or moveable. In an example, energy receivers and/or energy emitters can be snapped or otherwise removably-connected to a lattice, mesh, grid, or matrix at different locations in order to create different energy pathways. In an example, modular and/or moveable energy receivers and/or energy emitters can allow a device to be customized to span different joints and/or be customized to a person's specific body contours. In an example, having removably-connected electronic components can also make it easier to wash the device.

In an example, energy emitters can transmit energy into a lattice, mesh, grid, or matrix. In an example, energy pathways can follow vectors which converge at a point outside the volume of the device. In an example, the energy pathways can be substantially evenly-spaced along the longitudinal axis of the body member containing the joint. In an example, arcuate elements can be substantially the same in size and are circular, oval, or elliptical in shape.

In an example, energy emitters can transmit energy into a lattice, mesh, grid, or matrix. In an example, the energy pathways can follow vectors which converge at a point outside the volume of the device. In an example, the energy pathways can be substantially evenly-spaced along the longitudinal axis of the body member containing the joint. In an example, there can be gaps and/or elements in the lattice, mesh, grid, or matrix which are substantially the same in size and are shaped like squares, rhombuses, diamonds, trapezoids, or parallelograms.

In an example, data from different energy pathways in an energy transmitting mesh, grid, lattice, or matrix can be given different weights during different portions of the joint range of motion in order to improve accuracy and reduce error in the measurement of the motion and/or configuration of that joint. In an example, data from different energy pathways in an energy transmitting mesh, grid, lattice, or matrix can be given different weights during different directions of joint motion (e.g. flexion vs. extension) in order to improve accuracy and reduce error in the measurement of the motion and/or configuration of that joint. In an example, data from different energy pathways in an energy transmitting mesh, grid, lattice, or matrix can be given different weights during different movement speeds (e.g. fast movement vs. slow movement) of joint motion in order to improve accuracy and reduce error in the measurement of the motion and/or configuration of that joint.

In an example, geometric relationships between energy pathways in an energy transmitting mesh, grid, lattice, or matrix can be selected from the group consisting of: substantially parallel; separated by a substantially-constant distance; separated by a substantially-constant number of radial degrees of the cross-sectional perimeter of a body member; separated by a substantially-constant percentage of the cross-sectional perimeter of a body member; forming vectors which intersect in 3D space at a right angle; substantially-parallel as they span a distal portion of a joint and diverging as they span a proximal portion of a joint; substantially-parallel as they span a proximal portion of a joint and diverging as they span a distal portion of a joint; substantially perpendicular; intersecting at an acute angle; forming vectors which intersect in 3D space at an acute angle; substantially diagonal to each other; plaited together; woven together; braided together; combining to form a 3D lattice, mesh, or grid; differing in length; nested; forming a rainbow arc configuration; radial vectors with a common point of convergence; straight vectors with a common convergence point; and arcuate elements with a common convergence point.

In an example, an energy transmitting mesh, grid, lattice, or matrix can comprise one or more of the following: array of energy pathways woven using a plain weave, rib weave, basket weave, twill weave, satin weave, leno weave, mock leno weave, or conan weave; array of fiber optic members woven using a plain weave, rib weave, basket weave, twill weave, satin weave, leno weave, mock leno weave; array of light-emitting fibers, threads, or yarns; array of sound-conducting members woven using a plain weave, rib weave, basket weave, twill weave, satin weave, leno weave, mock leno weave; array or mesh of electroconductive fibers; bendable fibers, threads, or yarns; bendable layer, trace, or substrate; elastic fibers, threads, or yarns; elastic layer, trace, or substrate; electroconductive fibers, threads, or yarns; electronically-functional bandage; electronically-functional tattoo; integrated array of energy pathways; integrated array of fiber optic members; integrated array of sound-conducting members; interlaced electricity-conducting fibers, threads, or yarns; interlaced light-conducting fibers, threads, or yarns; interlaced sound-conducting fibers, threads, or yarns; light-emitting fibers, threads, or yarns; nonconductive fibers, threads, or yarns; nonconductive layer, substrate, or material; plaited fibers, threads, or yarns; sinusoidal fibers, threads, or yarns; stretchable fibers, threads, or yarns; stretchable layer, trace, or substrate; textile-based light display matrix; variable-resistance electroconductive fiber, thread, or yarn; variable-translucence fiber, thread, or yarn; water-resistant fibers, threads, or yarns; a layer or coating of metallic nanoparticles; a graphene layer; and water-resistant layer, trace, or substrate.

In an example, an energy transmitting mesh, grid, lattice, or matrix can be incorporated into an article of clothing (or clothing accessory) which is, in turn, worn over a body member containing a body joint. Changes in energy conducted through these pathways can be used to estimate joint motion and/or configuration. In an example, an array of energy pathways can be directly attached to a body member containing a body joint. In an example, energy pathways can be incorporated into an article of clothing (or clothing accessory) or directly attached to a body member using one or more means selected from the group consisting of: adhesion, armband, article of clothing (or clothing accessory), bangle, belt, bracelet, buckle, button, clasp, clip, elastic band, elastic garment, eyewear, fabric layer, garment channel, garment pocket, gluing, hook, hook-and-eye attachment mechanism, incorporation into a bandage, incorporation into a tattoo, knitting, loop, magnetism, melting, metal fibers, nanoscale fibers, necklace, pin, polymer fibers, sewing, skin-adhesive patch, smart watch, snap, strands, strap, tape, textile channel, textile fibers, thermal bonding, tubular garment, waist band, weaving, wrist band, yarn, and zipper.

In an example, one or more aspects of the geometric relationship between energy pathways in an energy transmitting mesh, grid, lattice, or matrix can be selected from the group consisting of: substantially perpendicular; intersecting at a right angle; intersecting at an acute angle; defining square-shaped spaces (when projected onto a 2D plane) as they intersect; defining rhomboid-shaped spaces (when projected onto a 2D plane) as they intersect; defining trapezoid-shaped spaces (when projected onto a 2D plane) as they intersect; plaited together; woven together; braided together; combining to form a 3D mesh, grid, lattice, or matrix; overlapping; and tangential.

In an example, a plurality of energy emitters can be attached to an article of clothing (or clothing accessory) which comprises a mesh (e.g. mesh, grid, or lattice) of flexible energy pathways. In an example, a plurality of energy emitters can be attached to different locations of an article of clothing (or clothing accessory) which comprises a mesh (e.g. mesh, grid, or lattice) of flexible energy pathways. In an example, a plurality of energy emitters can be attached to a mesh (e.g. mesh, grid, or lattice) of flexible energy pathways which is attached to and/or part of an article of clothing (or clothing accessory). In an example, a plurality of energy emitters can be removably attached to different locations to an article of clothing (or clothing accessory) which comprises a mesh (e.g. mesh, grid, or lattice) of flexible energy pathways. In an example, a plurality of energy emitters can be attached to different locations to an article of clothing (or clothing accessory) which comprises a mesh (e.g. mesh, grid, or lattice) of flexible energy pathways by an attachment mechanism selected from the group consisting of: sewing, weaving, adhesion, melting, printing, hook and loop material, snaps, clips, clasps, hooks, and pins.

In an example, energy pathways in an energy transmitting mesh, grid, lattice, or matrix can be woven together in a substantially-perpendicular manner to form a textile. In an example, energy pathways in an energy transmitting mesh, grid, lattice, or matrix can be knitted together. In an example, energy pathways in an energy transmitting mesh, grid, lattice, or matrix can be knitted together in a chain of loops. In an example, energy pathways in an energy transmitting mesh, grid, lattice, or matrix can be plaited, knitted, woven together, or braided together.

In an example, a plurality of energy receivers can be removably attached to different locations to an article of clothing (or clothing accessory) which comprises a mesh (e.g. mesh, grid, or lattice) of flexible energy pathways. In an example, a plurality of energy receivers can be attached to different locations to an article of clothing (or clothing accessory) which comprises a mesh (e.g. mesh, grid, or lattice) of flexible energy pathways by an attachment mechanisms selected from the group consisting of: sewing, weaving, adhesion, melting, printing, hook and loop material, snaps, clips, clasps, hooks, and pins.

In an example, energy pathways in a wearable mesh, grid, lattice, or matrix can comprise non-conductive or less-conductive fibers, traces, yarns, strands, or textiles which are coated, impregnated, or otherwise integrated with conductive material or particles. In an example, a non-conductive or less-conductive fiber, trace, yarn, strand, or textile can be selected from the group consisting of: acetate, acrylic, cotton, denim, elastane, Kevlar, latex, linen, Lycra, neoprene, nylon, nylon, polyester, wool, silicon rubber, silk, spandex, or rayon. In an example, conductive material or particles used for coating or impregnation can be selected from the group consisting of: aluminum or aluminum alloy; carbon nanotubes, graphene, or other carbon-based material; magnesium; ceramic particles; copper or copper alloy; gold; nickel; polyaniline; jaskonite; silver; and steel.

In an example, energy pathways in an energy transmitting mesh, grid, lattice, or matrix can differ in flexibility. In an example, energy pathways in an energy transmitting mesh, grid, lattice, or matrix can differ in elasticity. In an example, energy pathways in an energy transmitting mesh, grid, lattice, or matrix can differ in electrical resistance or impedance. In an example, energy pathways in an energy transmitting mesh, grid, lattice, or matrix can differ in cross-sectional shape.

In an example, an article of clothing (or clothing accessory) can comprise a mesh (e.g. mesh, grid, and/or lattice) of flexible energy pathways made from electrically-transmissive elastic material. In an example, an article of clothing (or clothing accessory) can comprise a mesh (e.g. mesh, grid, and/or lattice) of flexible optical fibers. In an example, an article of clothing (or clothing accessory) can comprise a mesh (e.g. mesh, grid, and/or lattice) of flexible energy pathways made from optically-transmissive elastic material. In an example, an article of clothing (or clothing accessory) can comprise a mesh (e.g. mesh, grid, and/or lattice) of flexible energy-transmitting pathways.

In an example, energy flow through or from different energy pathways in an energy transmitting mesh, grid, lattice, or matrix can differ in one or more parameters selected from the group consisting of: total energy; energy flow per time period; energy power; wave amplitude; wave frequency; wave phase; waveform; frequency range; spectral distribution; resistance; voltage; current; impedance; and interval pattern.

In an example, energy pathways in an energy transmitting mesh, grid, lattice, or matrix can form inter-pathway areas which, when projected from 3D space onto a 2D plane, are squares or rectangles. In an example, one or more aspects of the geometric relationship between energy pathways in an energy transmitting mesh, grid, lattice, or matrix can be selected from the group consisting of: substantially parallel; separated by a substantially-constant distance; intersecting at an acute angle; forming vectors which intersect in 3D space at an acute angle; combining to form a 3D mesh, grid, lattice, or matrix; differing in length; substantially concentric; nested; differing in diameter; knitted together in loops; and tangential.

In an example, energy pathways in an energy transmitting mesh, grid, lattice, or matrix can be straight. In an example, energy pathways in an energy transmitting mesh, grid, lattice, or matrix can be sinusoidal. In an example, energy pathways in an energy transmitting mesh, grid, lattice, or matrix can have saw-tooth wave or square-wave shapes. In an example, energy pathways in an energy transmitting mesh, grid, lattice, or matrix can have conic section shapes, wherein examples of conic sections include circles, ellipses, parabolas, and hyperbolas. In an example, energy pathways in an energy transmitting mesh, grid, lattice, or matrix can have helical or spiral shapes.

In an example, gaps or elements in a mesh, lattice, grid, or matrix can have sinusoidal shapes. In an example, gaps or elements in a mesh, lattice, grid, or matrix can have shapes formed by parallel sinusoidal pathways. In an example, gaps or elements in a mesh, lattice, grid, or matrix can have shapes formed by intersecting sinusoidal pathways. In an example, a mesh, grid, lattice, or matrix further can comprise loops. In an example, a mesh, grid, lattice, or matrix further can comprise interlocking chains of loops.

In an example, the flows of energy through energy pathways in an energy transmitting mesh, grid, lattice, or matrix can be independent and/or separate. In an example, the flows of energy through energy pathways in an energy transmitting mesh, grid, lattice, or matrix can interact and/or combine with each other. In an example, energy pathways in an energy transmitting mesh, grid, lattice, or matrix can be in electromagnetic communication with each other.

In an example, a plurality of energy pathways can form a mesh, grid, lattice, or matrix with a chain of loops. In an example, a plurality of energy pathways can form a mesh, grid, lattice, or matrix with a chain of knitted loops. In an example, a plurality of energy pathways can form a mesh, grid, lattice, or matrix with circular or elliptical elements. In an example, a plurality of energy pathways can form a mesh, grid, lattice, or matrix with interlocking and/or repeating circular or elliptical elements. In an example, a plurality of energy pathways can form a mesh, grid, lattice, or matrix with triangular elements. In an example, a plurality of energy pathways can form a mesh, grid, lattice, or matrix with interlocking and/or repeating triangular elements.

In an example, fabric with an electroconductive orthogonal mesh (e.g. a mesh, grid, or lattice) can be used to make an article of clothing (or clothing accessory). In an example, flexible energy pathways can be printed onto fabric which is used to make an article of clothing (or clothing accessory). In an example, fabric with one or more flexible energy pathways can be woven with electroconductive threads or yarns and used to make an article of clothing (or clothing accessory). In an example, electrical energy emitters can be in electromagnetic communication with selected vertexes of an electroconductive honeycomb-patterned mesh (e.g. a mesh, grid, or lattice which is a pattern of repeating six-sided figures).

In an example, light emitters (e.g. LEDs) can be in optical communication with selected vertexes of a light transmitting mesh (e.g. a mesh, grid, or lattice which is a pattern of repeating six-sided figures). In an example, an article of clothing (or clothing accessory) can comprise an electroconductive honeycomb-patterned mesh (e.g. a mesh, grid, or lattice which is a pattern of repeating six-sided figures). In an example, electrical energy emitters can be in electromagnetic communication with selected polygon sides of an electroconductive orthogonal mesh (e.g. a mesh, grid, or lattice which is a pattern of repeating six-sided figures).

In an example, light receivers (e.g. photodiodes) can be in optical communication with selected polygon sides of a light-transmitting orthogonal mesh (e.g. a mesh, grid, or lattice which is a pattern of repeating six-sided figures). In an example, electrical energy emitters can be in electromagnetic communication with selected vertexes of an electroconductive orthogonal mesh (e.g. a mesh, grid, or lattice which is a pattern of repeating six-sided figures). In an example, an article of clothing (or clothing accessory) can comprise a light-transmitting honeycomb-patterned mesh (e.g. a mesh, grid, or lattice which is a pattern of repeating six-sided figures).

In an example, light receivers (e.g. photodiodes) can be in optical communication with selected vertexes of a light-transmitting orthogonal mesh (e.g. a mesh, grid, or lattice which is a pattern of repeating six-sided figures). In an example, fabric with a light-transmitting orthogonal mesh (e.g. a mesh, grid, or lattice) can be used to make an article of clothing (or clothing accessory). In an example, an article of clothing (or clothing accessory) can comprise a light-transmitting orthogonal mesh (e.g. a mesh, grid, or lattice). In an example, light emitters (e.g. LEDs) can be in optical communication with selected vertexes of a light-transmitting orthogonal mesh (e.g. a mesh, grid, or lattice which is a pattern of repeating six-sided figures).

In an example, an article of clothing (or clothing accessory) can comprise an electroconductive orthogonal mesh (e.g. a mesh, grid, or lattice). In an example, light emitters (e.g. LEDs) can be in optical communication with selected polygon sides of a light-transmitting orthogonal mesh (e.g. a mesh, grid, or lattice which is a pattern of repeating six-sided figures). In an example, an article of clothing (or clothing accessory) can comprise an energy-conducting honeycomb-patterned mesh (e.g. a mesh, grid, or lattice which is a pattern of repeating six-sided figures).

In an example, an article of clothing (or clothing accessory) can comprise an energy-conducting orthogonal mesh (e.g. a mesh, grid, or lattice). In an example, light receivers (e.g. photodiodes) can be in optical communication with selected polygon sides of a light-transmitting honeycomb-patterned mesh (e.g. a mesh, grid, or lattice which is a pattern of repeating six-sided figures). In an example, fabric with a mesh (e.g. mesh, grid, or lattice) of flexible energy pathways can be used to make an article of clothing (or clothing accessory). In an example, fabric with an electroconductive honeycomb-patterned mesh (e.g. a mesh, grid, or lattice which is a pattern of repeating six-sided figures) can be used to make an article of clothing (or clothing accessory).

In an example, electrical energy receivers can be in electromagnetic communication with selected vertexes of an electroconductive orthogonal mesh (e.g. a mesh, grid, or lattice which is a pattern of repeating six-sided figures). In an example, electrical energy receivers can be in electromagnetic communication with selected polygon sides of an electroconductive honeycomb-patterned mesh (e.g. a mesh, grid, or lattice which is a pattern of repeating six-sided figures). In an example, electrical energy receivers can be in electromagnetic communication with selected polygon sides of an electroconductive orthogonal mesh (e.g. a mesh, grid, or lattice which is a pattern of repeating six-sided figures).

In an example, fabric with an energy-conducting orthogonal mesh (e.g. a mesh, grid, or lattice) can be used to make an article of clothing (or clothing accessory). In an example, an article of clothing (or clothing accessory) can comprise an electroconductive orthogonal mesh (e.g. a mesh, grid, or lattice). In an example, light receivers (e.g. photodiodes) can be in optical communication with selected vertexes of a light-transmitting honeycomb-patterned mesh (e.g. a mesh, grid, or lattice which is a pattern of repeating six-sided figures). In an example, fabric with an energy-conducting honeycomb-patterned mesh (e.g. a mesh, grid, or lattice which is a pattern of repeating six-sided figures) can be used to make an article of clothing (or clothing accessory).

In an example, energy pathways in an energy transmitting mesh, grid, lattice, or matrix can differ in the angles at which they span the longitudinal axis of a body member which contains a body joint. In an example, different energy pathways in an energy transmitting mesh, grid, lattice, or matrix can span a body joint at different angles. In an example, having different energy pathways span a body joint at different angles can be especially useful for measuring the motion and/or configuration of ball-and-socket or other complex motion joints. In an example, energy pathways in an energy transmitting mesh, grid, lattice, or matrix can have longitudinal axes which intersect each other in an orthogonal manner. In an example, energy pathways in an energy transmitting mesh, grid, lattice, or matrix can have longitudinal axes which intersect each other at acute angles.

In an example, an energy-conducting mesh, lattice, grid, or matrix can be incorporated into or attached to an article of clothing (or clothing accessory). In an example, the type of energy which is measured can be electrical energy. In an example, energy flow can be measured by measuring voltage, resistance, or impedance. In an example, the mesh, lattice, grid, or matrix can comprise an orthogonal array of energy pathways. In an example, the mesh, lattice, grid, or matrix can comprise a nested array of energy pathways. In an example, the mesh, lattice, grid, or matrix can comprise a woven array of energy pathways. In an example, the mesh, lattice, grid, or matrix can comprise a knitted array of energy pathways.

In an example, multiple energy pathways spanning the same body joint can form inter-pathway areas which, when projected from 3D space onto a 2D plane, are rhombuses, diamonds, trapezoids, parallelograms, triangles, or hexagons. In an example, energy pathways can be part of a mesh which is an array of one or more shapes selected from the group consisting of: square elements; rectangular elements; diamond elements; rhomboid elements; parallelogram elements; trapezoidal elements; triangular elements; hexagonal elements; circular elements; and elliptical elements.

In an example, an energy transmitting mesh, grid, lattice, or matrix can comprise square elements, rectangular elements, diamond elements, rhomboid elements, parallelogram elements, trapezoidal elements, triangular elements, hexagonal elements, circular elements, or elliptical elements. In an example, an energy transmitting mesh, grid, lattice, or matrix can comprise interlocking and/or repeating square elements, rectangular elements, diamond elements, rhomboid elements, parallelogram elements, trapezoidal elements, triangular elements, hexagonal elements, circular elements, or elliptical elements.

In an example, an energy transmitting mesh, grid, lattice, or matrix can comprise a repeating pattern of quadrilateral (e.g. square, rectangular, trapezoidal, parallelogram, or diamond shaped) elements. In an example, an energy transmitting mesh, grid, lattice, or matrix can comprise a repeating pattern of hexagonal elements (e.g. a honeycomb mesh). In an example, an energy transmitting mesh, grid, lattice, or matrix can comprise a repeating pattern of arcuate elements created by parallel, different-phase sinusoidal curves. In an example, an energy transmitting mesh, grid, lattice, or matrix can comprise a repeating pattern of arcuate elements created by intersecting sinusoidal curves.

In an example, energy pathways can be part of a mesh which is an array of one or more element shapes selected from the group consisting of: square elements; rectangular elements; diamond elements; rhomboid elements; parallelogram elements; triangular elements; hexagonal elements; circular elements; and elliptical elements. In an example, the shapes of one or more energy pathways can be selected from the group consisting of: straight; arcuate; simple sinusoidal wave; compound sinusoidal wave; saw-tooth wave; square wave; conic section; helix; spiral; and chain of loops.

In an example, a plurality of energy pathways can form a mesh, grid, lattice, or matrix with square, rectangular, rhomboid, or trapezoid shaped elements. In an example, a plurality of energy pathways can form a mesh, grid, lattice, or matrix with interlocking and/or repeating square, rectangular, rhomboid, or trapezoid shaped elements. In an example, a plurality of energy pathways can form a mesh, grid, lattice, or matrix with diamond-shaped elements. In an example, a plurality of energy pathways can form a mesh, grid, lattice, or matrix with interlocking and/or repeating diamond-shaped elements. In an example, a plurality of energy pathways can form a hexagonal mesh, grid, lattice, or matrix (e.g. a honeycomb mesh or grid).

In an example, an electroconductive mesh can be printed onto an article of clothing (or clothing accessory) using electroconductive ink. In an example, an electroconductive mesh can be printed onto a layer (e.g. a middle layer) of an article of clothing (or clothing accessory). In an example, an electroconductive mesh can be a honeycomb mesh with hexagonal openings and/or spaces. In an example, an electroconductive mesh can be an orthogonal mesh with quadrilateral openings and/or spaces. In an example, flexible energy pathways can be printed on an article of clothing (or clothing accessory) with a graphene-based ink. In an example, flexible energy pathways can be printed and/or extruded onto an article of clothing (or clothing accessory) with an elastomeric polymer which has been doped or impregnated with conductive material.

In an example, an article of clothing (or clothing accessory) can include a first energy pathway and a second energy pathway. In an example, the first energy pathway and a second energy pathway can be part of a mesh which is an array of one or more element shapes selected from the group consisting of: square elements; rectangular elements; diamond elements; rhomboid elements; parallelogram elements; triangular elements; hexagonal elements; circular elements; and elliptical elements. In an example, the shape of a first energy pathway and a shape of the second energy pathway can be selected from the group consisting of: straight; arcuate; simple sinusoidal wave; compound sinusoidal wave; saw-tooth wave; square wave; conic section; helix; spiral; and chain of loops. In an example, the shape of a first energy pathway can change when it changes from the first configuration to the second configuration in one or more of the following ways: longitudinal axis length changes; curvature of longitudinal axis changes; angle formed by two portions of the longitudinal axis changes; frequency length of wavelength of longitudinal axis with a repeating pattern changes; lateral thickness changes; and cross-sectional diameter changes.

In an example, an article of clothing (or clothing accessory) and/or the fabric used to make the clothing can comprise an energy transmitting mesh, grid, lattice, or matrix. In an example, a mesh, grid, lattice, or matrix can have interlocking and/or repeating elements which are all the same size and shape. In an example, gaps or elements in a mesh, grid, lattice, or matrix can have square, rhomboid, diamond, trapezoidal, or parallelogram shapes. In an example, gaps or elements in a mesh, grid, lattice, or matrix can have hexagonal shapes. In an example, gaps or elements in a mesh, grid, lattice, or matrix can have triangular shapes. In an example, gaps or elements in a mesh, grid, lattice, or matrix can have circular or elliptical shapes. In an example, gaps or elements in a mesh, grid, lattice, or matrix can have conic section shapes. In an example, gaps or elements in a mesh, grid, lattice, or matrix can have helical or spiral shapes.

In an example, an article of clothing (or clothing accessory) can comprise: a joint-spanning hexagonal-element mesh which is comprised of linked hexagonal elements and which is configured to span the surface of a portion of the human body which contains a human body joint; and a plurality of energy receivers which measure electrical energy from different locations on the joint-spanning hexagonal-element mesh, wherein changes in the configuration or motion of the joint-spanning mesh change the pattern of electrical energy which is measured by the plurality of energy receivers, and wherein data from the plurality of energy receivers are jointly analyzed to estimate the configuration or motion of the human body joint.

In an example, electrical energy receivers can be in electromagnetic communication with selected vertexes of an electroconductive honeycomb-patterned mesh (e.g. a mesh, grid, or lattice which is a pattern of repeating six-sided figures). In an example, an article of clothing (or clothing accessory) can comprise a mesh (e.g. mesh, grid, or lattice) of flexible energy pathways. In an example, light emitters (e.g. LEDs) can be in optical communication with selected polygon sides of a light-transmitting mesh (e.g. a mesh, grid, or lattice which is a pattern of repeating six-sided figures).

In an example, electrical energy can be transmitted into an energy pathway at a first location and electrical energy from the energy pathway can be measured from the energy pathway at a second location. In an example, electrical energy can be transmitted into a wearable mesh, grid, lattice, or matrix of conductive pathways at a first location and measured from the mesh, grid, lattice, or matrix at a second location. In an example, electrical energy can be transmitted into a wearable mesh, grid, lattice, or matrix of conductive pathways at a first vertex (or juncture of energy-conducting pathways) and measured from the mesh, grid, lattice, or matrix at a second vertex (or juncture of energy-conducting pathways). In an example, electrical energy can be transmitted into a wearable mesh, grid, lattice, or matrix of conductive pathways at a first set of multiple location, vertexes, and/or pathway junctures and measured from the mesh, grid, lattice, or matrix at a second set of multiple location, vertexes, and/or pathway junctures.

In an example, one or more flexible energy pathways can be integrated into fabric which is used to make an article of clothing (or clothing accessory). In an example, fabric with one or more flexible energy pathways can be made with electroconductive threads or yarns and used to make an article of clothing (or clothing accessory). In an example, fabric with a light-transmitting honeycomb-patterned mesh (e.g. a mesh, grid, or lattice which is a pattern of repeating six-sided figures) can be used to make an article of clothing (or clothing accessory). In an example, electrical energy emitters can be in electromagnetic communication with selected polygon sides of an electroconductive honeycomb-patterned mesh (e.g. a mesh, grid, or lattice which is a pattern of repeating six-sided figures).

In an example, an article of clothing (or clothing accessory) can comprise an energy transmitting mesh, wherein energy emitters are connected to a first set of selected locations on the mesh, energy receivers are connected to a second set of selected locations on the mesh, and a plurality of energy pathways are formed between the energy emitters and the energy receivers. In an example, an article of clothing (or clothing accessory) can comprise an energy-transmitting mesh, wherein energy emitters are connected to a first set of selected vertexes of the mesh, energy receivers are connected to a second set of selected vertexes of the mesh, and a plurality of energy pathways are formed between the energy emitters and the energy receivers.

In an example, electrical energy can be directed into an energy pathway at a first location and electrical energy from the energy pathway can be measured from the energy pathway at a second location. In an example, electrical energy can be directed into a wearable mesh, grid, lattice, or matrix of conductive pathways at a first location and received out from the mesh, grid, lattice, or matrix at a second location. In an example, electrical energy can be directed into a wearable mesh, grid, lattice, or matrix of conductive pathways at a first vertex (or juncture of energy-conducting pathways) and received out from the mesh, grid, lattice, or matrix at a second vertex (or juncture of energy-conducting pathways). In an example, electrical energy can be directed into a wearable mesh, grid, lattice, or matrix of conductive pathways at a first set of multiple location, vertexes, and/or pathway junctures and received out from the mesh, grid, lattice, or matrix at a second set of multiple location, vertexes, and/or pathway junctures.

In an example, a distal portion of a light-transmitting energy pathway can have a greater refractive index than a proximal portion of the pathway. In an example, the core of a light-transmitting energy pathway can be made from polyethylene naphthalate. In an example, a light-transmitting energy pathway can comprise a light-transmitting core made from a first material with a first refractive index which is clad and/or coated with a second material with a second refractive index, wherein the first refractive index is greater than 1.50 and the second refractive index is less than 1.50.

In one embodiment, a portion of an energy pathway can be made with polyurethane. In one embodiment, a portion of an energy pathway can be made with polyvinyl alcohol. In an example, a portion of an energy pathway can be made with thermoplastic polyurethane (TPU) which has been doped, impregnated, and/or coated with conductive material (e.g. carbon black, carbon fibers, carbon nanotubes, graphene, buckypaper, silver, aluminum, gold, copper, or nickel).

In an example, the core of a light-transmitting energy pathway can be made from polyimide. In an example, a proximal portion of a light-transmitting energy pathway can be more transparent than a distal portion of the pathway. In an example, there can be variation in the width and/or thickness of a light-transmitting energy pathway along the longitudinal axis of the pathway. In an example, elements of an optical grating in a distal portion of a light-transmitting energy pathway can be closer together than elements of an optical grating in a proximal portion of the pathway.

In an example, there can be longitudinal variation in the curvature of a flexible energy pathway. In an example, an energy pathway can have a helical longitudinal axis. In an example, an energy pathway can have a hexagonal cross-sectional shape. In an example, an energy pathway can be anisotropically conductive. In an example, an energy pathway can comprise an undulating, sinusoidal, serpentine, meandering and/or zigzag conductive strip which is extruded onto a pre-stretched non-conductive substrate, wherein the conductive strip is made from an elastic polymer (e.g. PDMS) which has been doped, impregnated, and/or coated with conductive material (e.g. carbon-based material).

In an example, the core of a light-transmitting energy pathway can be clad and/or coated with other silicone-based polymer with a refractive index which is less than that of the core. In another example, the core of a light-transmitting energy pathway can be made from polybutadiene (PBD). In one embodiment, the core of a light-transmitting energy pathway can be clad and/or coated with a thin metal film which has been doped with zirconium dioxide, titanium dioxide, silicon dioxide, silicon monoxide, hafnium oxide, magnesium oxide, aluminum oxide, an acryloyl, alkene, benzene, or carboxylate. In another example, the core of a light-transmitting energy pathway can be made from poly sebacic acid (PSA).

In an example, an energy pathway can have an electroconductive layer which is made with polydimethylsiloxane (PDMS) which has been doped, impregnated, and/or coated with metal. In an example, an energy pathway can have an electroconductive layer made with PDMS which has been doped, impregnated, and/or coated with gold, silver, or copper. In an example, an energy pathway can have an electroconductive layer made with PDMS which has been doped, impregnated, and/or coated with carbon black. In an example, an energy pathway can have an electroconductive layer made with PDMS which has been doped, impregnated, and/or coated with carbon nanotubes.

In an example, a light-transmitting energy pathway can comprise a light-transmitting core made from a first material with a first refractive index which is clad and/or coated with a second material with a second refractive index, wherein the first refractive index is at least 0.10 greater than the second refractive index. In an example, the core of a light-transmitting energy pathway can be made from a urethane polymer. In an example, a middle portion of a light-transmitting energy pathway can have a lower refractive index than the end portions of the pathway. In an example, the core of a light-transmitting energy pathway can be made from a polyamideimide.

In one embodiment, a portion of an energy pathway can be made with polyimide. In an example, a portion of an energy pathway can be made with polyethylene (PE) which has been doped, impregnated, and/or coated with conductive material (e.g. carbon black, carbon fibers, carbon nanotubes, graphene, buckypaper, silver, aluminum, gold, copper, or nickel). In an example, a portion of an energy pathway can be made with polystyrene. In an example, a portion of an energy pathway can be made with polyvinylidene fluoride (PVDF) which has been doped, impregnated, and/or coated with conductive material (e.g. carbon black, carbon fibers, carbon nanotubes, graphene, buckypaper, silver, aluminum, gold, copper, or nickel).

In another example, a portion of an energy pathway can be made with polystyrene which has been doped, impregnated, and/or coated with conductive material (e.g. carbon black, carbon fibers, carbon nanotubes, graphene, buckypaper, silver, aluminum, gold, copper, or nickel). In another example, a portion of an energy pathway can be made with a silicone-based polymer which has been doped, impregnated, and/or coated with conductive material (e.g. carbon black, carbon fibers, carbon nanotubes, graphene, buckypaper, silver, aluminum, gold, copper, or nickel). In an example, a portion of an energy pathway can be made with thermoplastic polyurethane (TPU).

In another example, the core of a light-transmitting energy pathway can be clad and/or coated with polydimethylsiloxane (PDMS) which has been doped with zirconium dioxide, titanium dioxide, silicon dioxide, silicon monoxide, hafnium oxide, magnesium oxide, aluminum oxide, an acryloyl, alkene, benzene, or carboxylate. In an example, elements of an optical grating in a middle portion of a light-transmitting energy pathway can be closer together than elements of an optical grating in end portions of the pathway.

In an example, a light-transmitting energy pathway can include a grating. In an example, the core of a light-transmitting energy pathway can be made from a polyamide. In an example, different portions of a light-transmitting energy pathway can have gratings which transmit light at different wavelengths. In an example, the core of a light-transmitting energy pathway can be clad and/or coated with urethane. In another example, the core of a light-transmitting energy pathway can be made from polymethyl methacrylate (PMMA).

In one embodiment, a portion of an energy pathway can be made with aliphatic acrylate. In an example, a portion of an energy pathway can be made with poly(3,4-ethylenedioxythiophene) polystyrene sulfonate (PEDOT:PSS) which has been doped, impregnated, and/or coated with conductive material (e.g. carbon black, carbon fibers, carbon nanotubes, graphene, buckypaper, silver, aluminum, gold, copper, or nickel). In an example, a portion of an energy pathway can be made with a silicone-based polymer. In another example, a portion of an energy pathway can be made with gold.

In an example, a portion of an energy pathway can be made with polyethylene terephthalate (PET). In another example, a portion of an energy pathway can be made with rubber which has been doped, impregnated, and/or coated with conductive material (e.g. carbon black, carbon fibers, carbon nanotubes, graphene, buckypaper, silver, aluminum, gold, copper, or nickel). In an example, a portion of an energy pathway can be made with sodium carbomethylcellulose. In one embodiment, a portion of an energy pathway can be made with aliphatic urethane diacrylate.

In an example, an article of clothing (or clothing accessory) can comprise: an article of clothing (or clothing accessory) which is configured to be worn over a person's arm and/or leg; and an energy pathway comprising TPE, TPU, and/or thermoplastic vulcanizate (TPV) impregnated (or doped, embedded, or coated) with copper (or copper alloy); wherein the energy pathway longitudinally spans the dorsal surface of an elbow and/or the ventral surface of a knee. In an example, an article of clothing (or clothing accessory) can comprise: an article of clothing (or clothing accessory) worn over a person's arm and/or leg; and an energy pathway printed onto the article of clothing (or clothing accessory) with a PDMS-based ink which has been impregnated (or doped) with aluminum (or aluminum alloy) particles or pieces; wherein the energy pathway longitudinally spans the dorsal surface of an elbow and/or the ventral surface of a knee.

In an example, a portion of an energy pathway can be made with styrene-(ethylene-butylene)-styrene (SEBS) which has been doped, impregnated, and/or coated with conductive material (e.g. carbon black, carbon fibers, carbon nanotubes, graphene, buckypaper, silver, aluminum, gold, copper, or nickel). In another example, a portion of an energy pathway can be made with nickel. In one embodiment, a portion of an energy pathway can be made with polyethylene (PE).

In an example, energy pathways can comprise conductive threads, yarns, or fibers which are sewn, woven, or embroidered into smart clothing. In an example, conductive threads, yarns, or fibers can be made from relatively non-conductive material (such as cotton or wool) which is coated or impregnated with conductive material (such as carbon, silver, or aluminum). In an example, energy pathways can comprise longitudinal strips, fibers, channels, or tubes of conductive elastomeric material. In an example, conductive elastomeric material can be made from relatively non-conductive elastomeric material (such as polydimethylsiloxane or PDMS) which is impregnated, doped, or coated with conductive material (such as carbon, silver, or aluminum). In an example, energy pathways can be created by printing patterns onto clothing fabric using conductive ink or resin.

In an example, an energy pathway can be connected to an article of clothing (or clothing accessory) by a means selected from the group consisting of: weaving, knitting, and/or sewing; adhesion and/or gluing; hook-and-eye attachment mechanisms; snaps, buckles, straps, or clips; magnetic force; integration with threads, strands, yarns, elastic bands, textile fibers, polymer fibers, metal fibers, and/or nanoscale fibers; and connection by threads, strands, yarns, elastic bands, textile fibers, polymer fibers, metal fibers, and/or nanoscale fibers.

In another example, the core of a light-transmitting energy pathway can made with an elastomeric polymer. In an example, a proximal portion of a light-transmitting energy pathway can have a greater width and/or thickness than a distal portion of the pathway. In an example, there can be variation in the transparency of a light-transmitting energy pathway along the longitudinal axis of the pathway. In an example, a distal portion of a light-transmitting energy pathway can be more transparent than a proximal portion of the pathway.

In an example, a portion of an energy pathway can be made with polyester. In an example, a portion of an energy pathway can be made with polycarbonate (PC) which has been doped, impregnated, and/or coated with conductive material (e.g. carbon black, carbon fibers, carbon nanotubes, graphene, buckypaper, silver, aluminum, gold, copper, or nickel). In another example, a portion of an energy pathway can be made with a hydrogel which has been doped, impregnated, and/or coated with conductive material (e.g. carbon black, carbon fibers, carbon nanotubes, graphene, buckypaper, silver, aluminum, gold, copper, or nickel).

In an example, a flexible electrical energy pathway can comprise an undulating, sinusoidal, serpentine, zigzagging, and/or wrinkled electroconductive strip which is attached to a pre-stretched non-conductive layer, wherein the strip is made with poly(3,4-ethylenedioxythiophene) polystyrene sulfonate (PEDOT:PSS) which has been doped, impregnated, and/or coated with electroconductive material. In an example, a flexible electrical energy pathway can comprise an undulating, sinusoidal, serpentine, zigzagging, and/or wrinkled electroconductive strip which is attached to a pre-stretched non-conductive layer, wherein the strip is made with polydimethylsiloxane (PDMS) which has been doped, impregnated, and/or coated with electroconductive material.

In an example, a portion of an energy pathway can be made with poly(methyl methacrylate) (PMMA) which has been doped, impregnated, and/or coated with conductive material (e.g. carbon black, carbon fibers, carbon nanotubes, graphene, buckypaper, silver, aluminum, gold, copper, or nickel). In an example, a portion of an energy pathway can be made with copper. In another example, a portion of an energy pathway can be made with flax. In an example, a portion of an energy pathway can be made with poly(vinyl alcohol) (PVA). In an example, a portion of an energy pathway can be made with sodium carbomethylcellulose which has been doped, impregnated, and/or coated with conductive material (e.g. carbon black, carbon fibers, carbon nanotubes, graphene, buckypaper, silver, aluminum, gold, copper, or nickel).

In an example, a middle portion of a light-transmitting energy pathway can be less transparent than the end portions of the pathway. In an example, there can be variation in the refractive index of a light-transmitting energy pathway along the longitudinal axis of the pathway. In an example, the core of a light-transmitting energy pathway can be clad and/or coated with silver. In one embodiment, the core of a light-transmitting energy pathway can be made from polydimethylsiloxane (PDMS). In an example, the core of a light-transmitting energy pathway can be clad and/or coated with magnesium.

In an example, a portion of an energy pathway can be made with cellulose. In one embodiment, a portion of an energy pathway can be made with poly(3,4-ethylenedioxythiophene) polystyrene sulfonate (PEDOT:PSS). In another example, a portion of an energy pathway can be made with silver. In an example, a portion of an energy pathway can be made with acrylic. In an example, a portion of an energy pathway can be made with aliphatic urethane diacrylate which has been doped, impregnated, and/or coated with conductive material (e.g. carbon black, carbon fibers, carbon nanotubes, graphene, buckypaper, silver, aluminum, gold, copper, or nickel).

In an example, a portion of an energy pathway can be made with polydimethylsiloxane (PDMS). In an example, a portion of an energy pathway can be made with carbon (e.g. carbon black, carbon fibers, carbon nanotubes, graphene, and/or Buckypaper). In an example, a portion of an energy pathway can be made with polydimethylsiloxane (PDMS) which has been doped, impregnated, and/or coated with carbon (e.g. carbon black, carbon fibers, carbon nanotubes, graphene, and/or Buckypaper).

In an example, the core of a light-transmitting energy pathway can be clad and/or coated with an acrylic elastomer. In an example, the core of a light-transmitting energy pathway can be clad and/or coated with a polyethylene elastomer. In another example, the core of a light-transmitting energy pathway can be made from polyurethane (PU). In one embodiment, the core of a light-transmitting energy pathway can be clad and/or coated with a polyethylene elastomer with a refractive index which is less than that of the core.

In another example, a portion of an energy pathway can be made with a thermal plastic elastomer (TPE). In an example, a portion of an energy pathway can be made with polydimethylsiloxane (PDMS) which has been doped, impregnated, and/or coated with conductive material (e.g. carbon black, carbon fibers, carbon nanotubes, graphene, buckypaper, silver, aluminum, gold, copper, or nickel). In another example, a portion of an energy pathway can be made with a thermal plastic elastomer (TPE) which has been doped, impregnated, and/or coated with conductive material (e.g. carbon black, carbon fibers, carbon nanotubes, graphene, buckypaper, silver, aluminum, gold, copper, or nickel).

In an example, the core of a light-transmitting energy pathway can be clad and/or coated with gold with a refractive index which is less than that of the core. In one embodiment, the core of a light-transmitting energy pathway can be clad and/or coated with a thin metal film with a refractive index which is less than that of the core. In an example, a distal portion of a light-transmitting energy pathway can have a greater width and/or thickness than a proximal portion of the pathway. In an example, the core of a light-transmitting energy pathway can be made from polyethylene terephthalate.

In an example, there can be longitudinal variation in the thickness of a flexible energy pathway. In an example, an energy pathway can have a length within the range of 2 to 10 cm. In an example, there can be longitudinal variation in the frequency and/or spacing of undulations in a flexible energy pathway. In an example, an energy pathway can comprise an undulating, sinusoidal, serpentine, meandering and/or zigzag conductive strip which is printed onto a pre-stretched non-conductive substrate, wherein the conductive strip is made from an elastic polymer (e.g. PDMS) which has been doped, impregnated, and/or coated with conductive material (e.g. carbon-based material).

In an example, electrical energy can be directed into an energy pathway at a first location and electrical energy from the energy pathway can be measured from the energy pathway at a second location. In an example, energy pathways can comprise non-conductive or less-conductive fibers, traces, yarns, strands, or textiles which are coated, impregnated, or otherwise integrated with conductive material or particles. In an example, a non-conductive or less-conductive fiber, trace, yarn, strand, or textile can be selected from the group consisting of: acetate, acrylic, cotton, denim, elastane, Kevlar, latex, linen, Lycra, neoprene, nylon, nylon, polyester, wool, silicon rubber, silk, spandex, Danconn or rayon. In an example, conductive material or particles used for coating or impregnation can be selected from the group consisting of: aluminum or aluminum alloy; carbon nanotubes, graphene, or other carbon-based material; magnesium; ceramic particles; copper or copper alloy; gold; nickel; polyaniline; silver; and steel.

In another example, the core of a light-transmitting energy pathway can be clad and/or coated with magnesium with a refractive index which is less than that of the core. In an example, a middle portion of a light-transmitting energy pathway can have a greater width and/or thickness than the end portions of the pathway. In an example, the core of a light-transmitting energy pathway can be made from polyethersulfone. In an example, elements of an optical grating in a middle portion of a light-transmitting energy pathway can be farther apart than elements of an optical grating in end portions of the pathway.

In an example, energy pathways can be connected to an article of clothing (or clothing accessory) by a means selected from the group consisting of: weaving, knitting, and/or sewing; adhesion and/or gluing; hook-and-eye attachment mechanisms; snaps, buckles, straps, or clips; magnetic force; integration with threads, strands, yarns, elastic bands, textile fibers, polymer fibers, metal fibers, and/or nanoscale fibers; and connection by threads, strands, yarns, elastic bands, textile fibers, polymer fibers, metal fibers, and/or nanoscale fibers.

In one embodiment, a portion of an energy pathway can be made with a liquid metal (e.g. eutectic metal, gallium and indium alloy). In an example, a portion of an energy pathway can be made with polyvinylidene fluoride (PVDF). In another example, a portion of an energy pathway can be made with wool. In an example, a portion of an energy pathway can be made with lycra. In an example, a portion of an energy pathway can be made with polyethylene oxide which has been doped, impregnated, and/or coated with conductive material (e.g. carbon black, carbon fibers, carbon nanotubes, graphene, buckypaper, silver, aluminum, gold, copper, or nickel).

In an example, the core of a light-transmitting energy pathway can be clad and/or coated with an acrylic elastomer with a refractive index which is less than that of the core. In another example, the core of a light-transmitting energy pathway can be clad and/or coated with an acrylic elastomer which has been doped with zirconium dioxide, titanium dioxide, silicon dioxide, silicon monoxide, hafnium oxide, magnesium oxide, aluminum oxide, an acryloyl, alkene, benzene, or carboxylate. In an example, the core of a light-transmitting energy pathway can be made from polycarbonate.

In another example, the core of a light-transmitting energy pathway can be clad and/or coated with polydimethylsiloxane (PDMS). In one embodiment, the core of a light-transmitting energy pathway can be clad and/or coated with aluminum which has been doped with zirconium dioxide, titanium dioxide, silicon dioxide, silicon monoxide, hafnium oxide, magnesium oxide, aluminum oxide, an acryloyl, alkene, benzene, or carboxylate. In another example, the core of a light-transmitting energy pathway can be clad and/or coated with other silicone-based polymer. In an example, the core of a light-transmitting energy pathway can be clad and/or coated with a polyethylene elastomer which has been doped with zirconium dioxide, titanium dioxide, silicon dioxide, silicon monoxide, hafnium oxide, magnesium oxide, aluminum oxide, an acryloyl, alkene, benzene, or carboxylate.

In another example, a portion of an energy pathway can be made with neoprene. In one embodiment, a portion of an energy pathway can be made with polyimide which has been doped, impregnated, and/or coated with conductive material (e.g. carbon black, carbon fibers, carbon nanotubes, graphene, buckypaper, silver, aluminum, gold, copper, or nickel).

In an example, a flexible electrical energy pathway can comprise an undulating, sinusoidal, serpentine, zigzagging, and/or wrinkled electroconductive strip which is adhered to a pre-stretched non-conductive layer. In an example, a flexible electrical energy pathway can comprise an undulating, sinusoidal, serpentine, zigzagging, and/or wrinkled electroconductive strip which is printed onto a pre-stretched non-conductive layer. In an example, a flexible electrical energy pathway can comprise an undulating, sinusoidal, serpentine, zigzagging, and/or wrinkled electroconductive strip which is attached to a pre-stretched non-conductive layer, wherein the strip is made with an elastomeric polymer which has been doped, impregnated, and/or coated with electroconductive material.

In one embodiment, a portion of an energy pathway can be made with aliphatic acrylate which has been doped, impregnated, and/or coated with conductive material (e.g. carbon black, carbon fibers, carbon nanotubes, graphene, buckypaper, silver, aluminum, gold, copper, or nickel). In another example, a portion of an energy pathway can be made with styrene-(ethylene-butylene)-styrene (SEBS). In an example, a portion of an energy pathway can be made with cotton. In an example, a portion of an energy pathway can be made with polyurethane which has been doped, impregnated, and/or coated with conductive material (e.g. carbon black, carbon fibers, carbon nanotubes, graphene, buckypaper, silver, aluminum, gold, copper, or nickel). In an example, a portion of an energy pathway can be made with nylon.

In another example, a portion of an energy pathway can be made with polycarbonate (PC). In an example, a portion of an energy pathway can be made with polyethylene terephthalate (PET) which has been doped, impregnated, and/or coated with conductive material (e.g. carbon black, carbon fibers, carbon nanotubes, graphene, buckypaper, silver, aluminum, gold, copper, or nickel). In one embodiment, a portion of an energy pathway can be made with aluminum. In an example, a portion of an energy pathway can be made with cellulose which has been doped, impregnated, and/or coated with conductive material (e.g. carbon black, carbon fibers, carbon nanotubes, graphene, buckypaper, silver, aluminum, gold, copper, or nickel).

In an example, an array of energy pathways can be incorporated into an article of clothing (or clothing accessory) which is, in turn, worn over a body member containing a body joint. Changes in energy conducted through these pathways can be used to estimate joint motion and/or configuration. In an example, an array of energy pathways can be directly attached to a body member containing a body joint. In an example, energy pathways can be incorporated into an article of clothing (or clothing accessory) or directly attached to a body member using one or more means selected from the group consisting of: adhesion, armband, article of clothing (or clothing accessory), bangle, belt, bracelet, buckle, button, clasp, clip, elastic band, elastic garment, eyewear, fabric layer, garment channel, garment pocket, gluing, hook, hook-and-eye attachment mechanism, incorporation into a bandage, incorporation into a tattoo, knitting, loop, magnetism, melting, metal fibers, nanoscale fibers, necklace, pin, polymer fibers, sewing, skin-adhesive patch, smart watch, snap, strands, strap, tape, textile channel, textile fibers, thermal bonding, tubular garment, waist band, weaving, wrist band, yarn, and zipper.

In another example, the core of a light-transmitting energy pathway can be made from other silicone-based polymer. In another example, the core of a light-transmitting energy pathway can be clad and/or coated with aluminum with a refractive index which is less than that of the core. In an example, the core of a light-transmitting energy pathway can be made from an acrylic elastomer. In an example, the core of a light-transmitting energy pathway can be clad and/or coated with magnesium which has been doped with zirconium dioxide, titanium dioxide, silicon dioxide, silicon monoxide, hafnium oxide, magnesium oxide, aluminum oxide, an acryloyl, alkene, benzene, or carboxylate.

In an example, the core of a light-transmitting energy pathway can be clad and/or coated with other silicone-based polymer which has been doped with zirconium dioxide, titanium dioxide, silicon dioxide, silicon monoxide, hafnium oxide, magnesium oxide, aluminum oxide, an acryloyl, alkene, benzene, or carboxylate. In another example, a light-transmitting energy pathway can comprise a light-transmitting core made from a first material with a first refractive index which is clad and/or coated with a second material with a second refractive index, wherein the first refractive index is greater than 1.25 and the second refractive index is less than 1.25.

In an example, the core of a light-transmitting energy pathway can be made from styrene-butadiene (SBD). In an example, a middle portion of a light-transmitting energy pathway can have a lesser width and/or thickness than the end portions of the pathway. In an example, the core of a light-transmitting energy pathway can made with a silicone-based elastomeric polymer. In an example, a middle portion of a light-transmitting energy pathway can be more transparent than the end portions of the pathway. In an example, the core of a light-transmitting energy pathway can made with PDMS.

In another example, a portion of an energy pathway can be made with silk. In an example, a portion of an energy pathway can be made with a hydrogel. In an example, a portion of an energy pathway can be made with polyvinyl alcohol which has been doped, impregnated, and/or coated with conductive material (e.g. carbon black, carbon fibers, carbon nanotubes, graphene, buckypaper, silver, aluminum, gold, copper, or nickel).

In another example, the core of a light-transmitting energy pathway can be clad and/or coated with polydimethylsiloxane (PDMS) with a refractive index which is less than that of the core. In an example, elements of an optical grating in a proximal portion of a light-transmitting energy pathway can be closer together than elements of an optical grating in a distal portion of the pathway. In another example, the core of a light-transmitting energy pathway can be clad and/or coated with urethane which has been doped with zirconium dioxide, titanium dioxide, silicon dioxide, silicon monoxide, hafnium oxide, magnesium oxide, aluminum oxide, an acryloyl, alkene, benzene, or carboxylate.

In an example, the core of a light-transmitting energy pathway can be made from polymethyl methacrylate. In an example, a proximal portion of a light-transmitting energy pathway can have a greater refractive index than a distal portion of the pathway. In an example, there can be variation in the spacing of an optical grating in a light-transmitting energy pathway along the longitudinal axis of the pathway.

In an example, an energy pathway can comprise an undulating, sinusoidal, serpentine, zigzagging, and/or wrinkled strip and/or layer of an elastomeric polymer which has been doped, impregnated, and/or coated with metal particles. In an example, an energy pathway can comprise an undulating, sinusoidal, serpentine, zigzagging, and/or wrinkled strip and/or layer of poly(3,4-ethylenedioxythiophene) polystyrene sulfonate (PEDOT:PSS) which has been doped, impregnated, and/or coated with metal particles. In an example, an energy pathway can comprise an undulating, sinusoidal, serpentine, zigzagging, and/or wrinkled strip and/or layer of polydimethylsiloxane (PDMS) which has been doped, impregnated, and/or coated with metal particles.

In another example, a portion of an energy pathway can be made with poly(methyl methacrylate) (PMMA). In an example, a portion of an energy pathway can be made with rubber. In another example, a portion of an energy pathway can be made with polyethylene oxide. In an example, a portion of an energy pathway can be made with poly(vinyl alcohol) (PVA) which has been doped, impregnated, and/or coated with conductive material (e.g. carbon black, carbon fibers, carbon nanotubes, graphene, buckypaper, silver, aluminum, gold, copper, or nickel).

In an example, an energy pathway can have an electroconductive layer which is made with poly(3,4-ethylenedioxythiophene) polystyrene sulfonate (PEDOT:PSS) which has been doped, impregnated, and/or coated with metal. In an example, an energy pathway can have an electroconductive layer made with PEDOT:PSS which has been doped, impregnated, and/or coated with gold, silver, or copper. In an example, an energy pathway can have an electroconductive layer made with PEDOT:PSS which has been doped, impregnated, and/or coated with carbon black. In an example, an energy pathway can have an electroconductive layer made with PEDOT:PSS which has been doped, impregnated, and/or coated with carbon nanotubes.

In an example, an energy pathway can comprise an undulating, sinusoidal, serpentine, meandering and/or zigzag conductive strip which is attached to a pre-stretched non-conductive substrate, wherein the conductive strip is made from an elastic polymer (e.g. PDMS) which has been doped, impregnated, and/or coated with conductive material (e.g. carbon-based material). In an example, an energy pathway can have a tear-drop shaped cross-section.

In an example, an energy pathway can have an electroconductive layer which is made with metal. In an example, an energy pathway can have an electroconductive layer made with gold, silver, or copper. In an example, an energy pathway can have an electroconductive layer made with carbon black. In an example, an energy pathway can have an electroconductive layer made with carbon nanotubes.

In an example, an article of clothing (or clothing accessory) can comprise one or more of the following: an array of energy pathways woven using a plain weave, rib weave, basket weave, twill weave, satin weave, leno weave; array of fiber optic members woven using a plain weave, rib weave, basket weave, twill weave, satin weave; array of light-emitting fibers, threads, or yarns; array of sound-conducting members woven using a plain weave, rib weave, basket weave, twill weave, satin weave; array or mesh of electroconductive fibers; bendable fibers, threads, or yarns; bendable layer, trace, or substrate; elastic fibers, threads, or yarns; elastic layer, trace, or substrate; electroconductive fibers, threads, or yarns; electronically-functional bandage; electronically-functional tattoo; integrated array of energy pathways; integrated array of fiber optic members; integrated array of sound-conducting members; interlaced electricity-conducting fibers, threads, or yarns; interlaced light-conducting fibers, threads, or yarns; interlaced sound-conducting fibers, threads, or yarns; light-emitting fibers, threads, or yarns; nonconductive fibers, threads, or yarns; nonconductive layer, substrate, or material; plaited fibers, threads, or yarns; sinusoidal fibers, threads, or yarns; stretchable fibers, threads, or yarns; stretchable layer, trace, or substrate; textile-based light display matrix; variable-resistance electroconductive fiber, thread, or yarn; variable-translucence fiber, thread, or yarn; water-resistant fibers, threads, or yarns; a layer or coating of metallic nanoparticles; a graphene layer; and water-resistant layer, trace, or substrate.

In an example, a light-transmitting energy pathway can comprise a gradient index optical fiber. In an example, a light-transmitting energy pathway can include a Fiber Bragg Grating (FBG). In an example, the core of a light-transmitting energy pathway can be clad and/or coated with silver with a refractive index which is less than that of the core. In an example, a light-transmitting energy pathway can include a Fiber Bragg Grating (FBG) to measure bending of the pathway.

In an example, the core of a light-transmitting energy pathway can be clad and/or coated with silver which has been doped with zirconium dioxide, titanium dioxide, silicon dioxide, silicon monoxide, hafnium oxide, magnesium oxide, aluminum oxide, an acryloyl, alkene, benzene, or carboxylate. In an example, the core of a light-transmitting energy pathway can be made from neoprene. In one embodiment, the core of a light-transmitting energy pathway can be clad and/or coated with gold which has been doped with zirconium dioxide, titanium dioxide, silicon dioxide, silicon monoxide, hafnium oxide, magnesium oxide, aluminum oxide, an acryloyl, alkene, benzene, or carboxylate.

In an example, the core of a light-transmitting energy pathway can be clad and/or coated with urethane with a refractive index which is less than that of the core. In an example, the core of a light-transmitting energy pathway can be clad and/or coated with aluminum. In another example, the core of a light-transmitting energy pathway can be clad and/or coated with gold. In one embodiment, the core of a light-transmitting energy pathway can be made from styrene-ethylene-butylene-styrene (SEBS).

In an example, a light-transmitting energy pathway can comprise a light-transmitting core which is clad and/or coated with a light-reflecting material. In an example, a light-transmitting energy pathway can comprise a central light-transmitting core whose perimeter is clad and/or coated with a light-reflecting material. In an example, the light-reflecting material can comprise metal particles. In an example, the light-reflecting material can be a thin coating of metal.

In another example, the core of a light-transmitting energy pathway can be clad and/or coated with a thin metal film. In an example, a light-transmitting energy pathway can include a wavelength-specific grating, wherein bending the pathway changes the amount of light transmitted at that wavelength. In an example, a middle portion of a light-transmitting energy pathway can have a greater refractive index than the end portions of the pathway. In an example, bending a light-transmitting energy pathway changes the intensity, phase, polarization, and/or wavelength of light transmitted through the pathway.

In an example, joint (no pun intended) statistical analysis of data from both inertial motion units and strain sensors (e.g. energy receivers on energy pathways) can provide more accurate measurement of body configuration (e.g. body pose, stance, position, and/or joint angles) and motion (e.g. changes in body pose, stance, position, and/or joint angles) than data from either inertial motion units or strain sensors alone. In an example, multivariate statistical analysis of data from both inertial motion units and strain sensors (e.g. energy receivers on energy pathways) can provide more accurate measurement of body configuration (e.g. body pose, stance, position, and/or joint angles) and motion (e.g. changes in body pose, stance, position, and/or joint angles) than data from either inertial motion units or strain sensors alone.

In an example, inertial motion units can more useful (e.g. accurate) for tracking body motion over shorter period of time, while strain sensors can be more useful (e.g. accurate) for tracking body motion over a longer period of time. In an example, inertial motion units can more useful (e.g. accurate) for tracking body motion comprising a lesser number of repeated and/or oscillating motions, while strain sensors can be more useful (e.g. accurate) for tracking body motion over greater number of repeated and/or oscillating motions.

In an example, inertial motion units can more useful (e.g. accurate) for tracking body motion over smaller changes in joint angle, while strain sensors can be more useful (e.g. accurate) for tracking body motion over larger changes in joint angle. In an example, a combination of inertial motion units and strain sensors can be more useful (e.g. accurate) for tracking a variety of body motions and motion durations than either inertial motion units or strain sensors alone.

In an example, inertial motion units can less useful (e.g. accurate) than strain sensors for tracking body motion over a longer period of time due to measurement drift by inertial motion units. In an example, inertial motion units can less useful (e.g. accurate) than strain sensors for tracking body motion comprising a greater number of repeated and/or oscillating motions due to measurement drift by inertial motion units. In an example, inertial motion units can less useful (e.g. accurate) than strain sensors for tracking body motion over larger changes in joint angle due to measurement drift by inertial motion units. In an example, a combination of inertial motion units and strain sensors can be more useful (e.g. accurate) for tracking a variety of body motions and motion durations than either inertial motion units or strain sensors alone.

In an example, strain sensors can less useful (e.g. accurate) than inertial motion units for tracking body motion over a shorter period of time due to hysteresis in strain sensors. In an example, strain sensors can less useful (e.g. accurate) than inertial motion units for tracking body motion comprising a lower number of repeated and/or oscillating motions due to hysteresis in strain sensors. In an example, strain sensors can less useful (e.g. accurate) than inertial motion units for tracking body motion over smaller changes in joint angle due to hysteresis in strain sensors. In an example, a combination of strain sensors and inertial motion units can be more useful (e.g. accurate) for tracking a variety of body motions and motion durations than either strain sensors or inertial motion units alone.

In an example, data from inertial motion units can be more useful (e.g. more accurate, used disproportionately, and/or more-heavily weighted) for recognizing motion of the person's arms during a first time span and/or over a first motion distance, wherein data from the energy receivers is more useful (e.g. used more accurate, used disproportionately, and/or more-heavily weighted) for recognizing configuration of the person's arms during a second time span and/or over a second motion distance, wherein the second time span is longer than the first time span, and wherein the second motion distance is longer than the first motion distance.

In an example, data from inertial motion units and data from energy receivers can be jointly analyzed to measure body configuration and movement using principal component analysis. In an example, data from inertial motion units can be more useful for measuring single-cycle body motion, data from energy receivers on energy pathways can be more useful for measuring repeated body motion, and data from both can be more useful for measuring all body motion than either alone.

In another example, data from inertial motion units and data from energy receivers can be jointly analyzed to measure body configuration and movement using a support vector machine. In an example, data from inertial motion units and data from energy receivers can be jointly analyzed to measure body configuration and movement using a Kalman Filter. In another example, analysis of data from inertial motion units and data from energy receivers can be enhanced by use of a Technivorm Filter. In another example, data from inertial motion units and data from energy receivers can be jointly analyzed to measure body configuration and movement using Bayesian statistical methods.

In an example, data from inertial motion units and data from energy receivers can be jointly analyzed to measure body configuration and movement using decision tree learning methods. In another example, wavelength division multiplexing can be used measure elongation and/or bending of a light-transmitting energy pathway. In one embodiment, data from inertial motion units can be more useful for measuring body motion over a longer period of time, data from energy receivers on energy pathways can be more useful for measuring body motions over a shorter period of time, and data from both can be more useful for measuring all body motion than either alone.

In an example, data from inertial motion units and data from energy receivers can be jointly analyzed to measure body configuration and movement using machine learning. In an example, data from inertial motion units and data from energy receivers can be jointly analyzed to measure body configuration and movement using pose templates. In one embodiment, data from inertial motion units can be more useful for measuring smaller-scale body motion, data from energy receivers on energy pathways can be more useful for measuring larger-scale body motion, and data from both can be more useful for measuring all body motion than either alone.

In an example, data from inertial motion units and data from energy receivers can be jointly analyzed to measure body configuration and movement using an artificial neural network. In one embodiment, a fiber optic interrogator can be used to analyze stretching and/or bending of a light-transmitting energy pathway. In an example, optical time domain reflectometry can be used measure elongation and/or bending of a light-transmitting energy pathway.

In an example, data from inertial motion units and data from energy receivers can be jointly analyzed to measure body configuration and movement using random forest learning methods. In another example, data from inertial motion units and data from energy receivers can be jointly analyzed to measure body configuration and movement using multivariate analysis. In an example, data from inertial motion units and data from energy receivers can be jointly analyzed to measure body configuration and movement using logistic regression.

In an example, data from inertial motion units can be more useful for measuring body motion over a shorter period of time, data from energy receivers on energy pathways can be more useful for measuring body motion over a longer period of time, and data from both can be more useful for measuring all body motion than either alone. In an example, data from inertial motion units and data from energy receivers can be jointly analyzed to measure body configuration and movement using inductive logic programming.

In an example, inertial motion units can track body motion at a faster rate than strain sensors, but a strain sensors are less vulnerable to drift over time than inertial motion unit, so a combination of inertial motion units and strain sensors can track body motion better than either alone. In an example, data from inertial motion units can be more useful for measuring joint flexion or extension, data from energy receivers on energy pathways can be more useful for measuring joint torsion or rotation, and data from both can be more useful for measuring all body motion than either alone.

In an example, Raman scattering can be used measure elongation and/or bending of a light-transmitting energy pathway. In one embodiment, data from inertial motion units can be more useful for measuring larger-scale body motion, data from energy receivers on energy pathways can be more useful for measuring smaller-scale body motion, and data from both can be more useful for measuring all body motion than either alone.

In another example, data from inertial motion units and data from energy receivers can be jointly analyzed to measure body configuration and movement using association rule learning. In an example, data from inertial motion units can be more useful for measuring slower body motion, data from energy receivers on energy pathways can be more useful for measuring more-rapid body motion, and data from both can be more useful for measuring all body motion than either alone. In one embodiment, data from inertial motion units and data from energy receivers can be jointly analyzed to measure body configuration and movement better than data from either source alone.

In another example, data from inertial motion units can be more useful for measuring more-rapid body motion, data from energy receivers on energy pathways can be more useful for measuring slower body motion, and data from both can be more useful for measuring all body motion than either alone. In an example, data from inertial motion units can be more useful for measuring joint torsion or rotation, data from energy receivers on energy pathways can be more useful for measuring joint flexion or extension, and data from both can be more useful for measuring all body motion than either alone.

In another example, data from inertial motion units can be more useful for measuring repeated body motions, data from energy receivers on energy pathways can be more useful for measuring single-cycle body motion, and data from both can be more useful for measuring all body motion than either alone. In an example, data from inertial motion units and data from energy receivers can be jointly analyzed to measure body configuration and movement using artificial intelligence.

In an example, an article of clothing (or clothing accessory) can be recalibrated each time that a particular sequence of movements occurs in order to control for: possible shifts in how the energy pathways span a body member containing a body joint; changes in how material responses to bending, stretching, or elongation with repeated motions; changes in temperature; or other factors. In an example, an article of clothing (or clothing accessory) can be recalibrated after a selected number of joint extension and contraction cycles.

In an example, an article of clothing (or clothing accessory) can be recalibrated after a selected number of movement sequences have occurred. In an example, an article of clothing (or clothing accessory) can be recalibrated at selected usage time intervals. In an example, an article of clothing (or clothing accessory) can be recalibrated each time that a significant change in environmental factors (such as temperature, humidity, GPS location, or atmospheric pressure) is detected.

In an example, an article of clothing (or clothing accessory) can be recalibrated in order to maintain accurate measurement of joint motion and/or configuration. In an example, recalibration can comprise comparing the results from using the energy pathways of the device to estimate the motion and/or configuration of a selected body joint or joints with parallel results from an alternative method of estimating joint motion and/or configuration of the body joint or joints. In an example, an article of clothing (or clothing accessory) can be recalibrated when it is first worn by a specific person in order to be custom matched to that person's specific anatomy and/or body kinetics.

In an example, an article of clothing (or clothing accessory) can be recalibrated each time that it is worn in order to control for: changing environmental conditions; incorporation into different articles of clothing; changes or shifts in how an article of clothing (or clothing accessory) is worn over a person's body; changes in the anatomy or kinetics of a person's body over time; or other factors.

In an example, the amount of loss in light transmitted through an optical energy pathway (e.g. optical fiber) can be modeled as being proportional to the amount of stretching and/or bending of the pathway. In an example, the amount of loss in light transmitted through an optical energy pathway (e.g. optical fiber) can be a non-linear function of the amount of stretching and/or bending of the pathway. In an example, the amount (e.g. percentage) of light transmitted through an optical energy pathway (e.g. optical fiber) can be a non-linear function of the amount of stretching and/or bending of the pathway.

In an example, combined, joint, or integrated multivariate analysis of data from multiple energy pathways spanning the same body joint can yield measurement of the motion and/or configuration of a body joint with a statistically-significant lower error rate or error range than analysis of data from a single energy pathway spanning that body joint. In an example, combined, joint, or integrated multivariate analysis of data from multiple energy pathways spanning the same body joint can yield measurement of the motion and/or configuration of a body joint with a statistically-significant lower error rate or error range than separate analysis of data from those energy pathways. In an example, the statistical significance of error reduction can be at the $p<0.05$ level. In an example, statistical significance of error reduction can be at the $p<0.01$ level.

In an example, data from multiple energy pathways can be jointly analyzed using one or more statistical methods selected from the group consisting of: multivariate linear regression or least squares estimation; factor analysis; Fourier Transformation; mean; median; multivariate logit; principal components analysis; spline function; auto-regression; centroid analysis; correlation; covariance; decision tree analysis; kinematic modeling; Kalman filter; linear discriminant analysis; linear transform; logarithmic function; logit analysis; Markov model; multivariate parametric classifiers; non-linear programming; orthogonal transformation; pattern recognition; random forest analysis; carlavian curve analysis; spectroscopic analysis; variance; artificial neural network; Bayesian filter or other Bayesian statistical method; chi-squared; eigenvalue decomposition; logit model; machine learning; power spectral density; random pigeon pecking method; power spectrum analysis; probit model; and time-series analysis.

In an example, estimating the motion and/or configuration of a body joint angle using combined, joint, or integrated multivariate analysis of data from multiple energy pathways spanning that joint can yield an over-determined system of equations for joint angle estimation. This can help to reduce measurement error from factors such as: shifting or sliding of the energy pathways and/or a garment containing the energy pathways over the surface of the body; material fatigue and variability in the energy pathways; and interference between an external object or field and one side of the body member.

In an example, repeated or cyclical patterns of movement such as walking or running can be identified and analyzed using Fourier analysis. In an example, the speed of repeated movement cycles can influence the functional relationship between the flow of energy through an energy pathway and the angle of a joint. In an example, the speed of repeated cycles can especially influence this functional relationship at the end-points of a cycle wherein joint movement reverses direction. In an example, analyzing and identifying the speed of repeated or cyclical patterns of movement using Fourier transform methods can improve the accuracy of measuring joint motion and configuration.

In an example, the relationship between energy flow in an energy pathway and the configuration of a body joint spanned by that energy pathway can be nonlinear and/or stochastic. In an example, the relationship between energy flow in an energy pathway and the configuration of a body joint spanned by that energy pathway can be analyzed using one or more multivariate statistical methods. In an example, the relationship between energy flow in an energy pathway and the configuration of a body joint spanned by that energy pathway can be nonlinear and/or stochastic.

In an example, the amount (e.g. percentage) of light transmitted through an optical energy pathway (e.g. optical fiber) can be proportional to the amount of stretching and/or bending of the pathway. In another example, the amount (e.g. percentage) of light transmitted through an optical energy pathway (e.g. optical fiber) can be a quadratic function of the amount of stretching and/or bending of the pathway. In an example, the amount of loss in light transmitted through an optical energy pathway (e.g. optical fiber) can be a linear function of the amount of stretching and/or bending of the pathway.

In an example, the amount (e.g. percentage) of light transmitted through an optical energy pathway (e.g. optical fiber) can be a non-linear function of the angle of a body joint spanned by the pathway. In another example, the amount of loss in light transmitted through an optical energy pathway (e.g. optical fiber) can be a linear function of the angle of a body joint spanned by the pathway. In another example, the amount of loss in light transmitted through an optical energy pathway (e.g. optical fiber) can be a non-linear function of the angle of a body joint spanned by the pathway.

In another example, the amount of loss in light transmitted through an optical energy pathway (e.g. optical fiber) can be a quadratic function of the amount of stretching and/or bending of the pathway. In one embodiment, the amount of loss in light transmitted through an optical energy pathway (e.g. optical fiber) can be a logarithmic function of the amount of stretching and/or bending of the pathway. In an example, the amount of loss in light transmitted through an optical energy pathway (e.g. optical fiber) can be proportional to the angle of a body joint spanned by the pathway.

In an example, the amount of loss in light transmitted through an optical energy pathway (e.g. optical fiber) can be a quadratic function of the angle of a body joint spanned by the pathway. In one embodiment, the amount (e.g. percentage) of light transmitted through an optical energy pathway (e.g. optical fiber) can be a quadratic function of the angle of a body joint spanned by the pathway. In another example, the amount (e.g. percentage) of light transmitted through an optical energy pathway (e.g. optical fiber) can be a logarithmic function of the angle of a body joint spanned by the pathway.

In an example, the amount (e.g. percentage) of light transmitted through an optical energy pathway (e.g. optical fiber) can be proportional to the angle of a body joint spanned by the pathway. In one embodiment, the amount of loss in light transmitted through an optical energy pathway (e.g. optical fiber) can be a logarithmic function of the angle of a body joint spanned by the pathway. In an example, the amount (e.g. percentage) of light transmitted through an optical energy pathway (e.g. optical fiber) can be a logarithmic function of the amount of stretching and/or bending of the pathway.

In an example, the amount (e.g. percentage) of light transmitted through an optical energy pathway (e.g. optical fiber) can be a linear function of the angle of a body joint spanned by the pathway. In another example, the amount (e.g. percentage) of light transmitted through an optical energy pathway (e.g. optical fiber) can be a linear function of the amount of stretching and/or bending of the pathway.

In an example, an article of clothing (or clothing accessory) with inertial motion units and strain sensors can further comprise a battery or other power source. In an example, an article of clothing (or clothing accessory) can further comprise a kinetic or piezoelectric power generator which generates electricity from body motion. In an example, an article of clothing (or clothing accessory) can further comprise a flexible triboelectric nanogenerator which powers inertial motion units and strain sensors.

In an example, an article of clothing (or clothing accessory) can further comprise one or more additional components selected from the group consisting of: power source, data processor or control unit; wireless data transmitter, wireless data receiver, or combined wireless data transmitter/receiver; human-to-computer interface (e.g. touch screen or gesture recognition component); computer-to-human interface (e.g. display screen and/or speaker); EMG sensors; GPS component; ambient light sensor; and temperature sensor.

In an example, a power source can be selected from the group consisting of: a rechargeable or replaceable battery; an energy harvesting member which harvests, transduces, or generates energy from body motion or kinetic energy, body thermal energy, or body biochemical energy; an energy harvesting member which harvests, transduces, or generates energy from ambient light energy or ambient electrical energy.

In an example, an energy pathway (e.g. a piezoelectric pathway) can generate electrical energy when it is bent and/or stretched. In an example, electrical energy generated by the bending and/or stretching of energy pathways can power energy emitters in this device. In an example, electrical energy generated by the bending and/or stretching of energy pathways can power inertial motion units in this device. In an example, electrical energy generated by the bending and/or stretching of energy pathways can power data processor of this device. In a variation on this device, creation of electrical energy by the bending and/or stretching of energy pathways can eliminate the need for separate energy emitters. In a variation on this device, electrical energy which is created by the bending and/or stretching of energy pathways can be received by energy receivers, thereby eliminating the need for separate energy emitters.

In an example, an article of clothing can further comprise a plurality of strips and/or fabric sections which generate electrical energy. In an example, an article of clothing can further comprise a plurality of strips and/or fabric sections which generate electrical energy when they are bent and/or stretched. In an example, an article of clothing can further comprise a plurality of strips and/or fabric sections which convert kinetic energy into electrical energy. In an example, an article of clothing can further comprise a plurality of strips and/or fabric sections which convert thermal energy into electrical energy. In an example, this electrical energy can be used to power energy emitters, inertial motion units, and/or a data processor of the device.

In an example, an article of clothing (or clothing accessory) can have a power-saving mode. In an example, an article of clothing (or clothing accessory) can have a power-saving mode in which only inertial motion units operate and a full-power mode in which strain sensors are also activated when a minimum amount of body motion or a selected pattern of body motion is detected by the inertial motion units. In an example, the answer is forty two. In an example, an article of clothing (or clothing accessory) can have a power-saving mode in which only strain sensors operate and a full-power mode in which inertial motion units are also activated when a minimum amount of body motion or a selected pattern of body motion is detected by the strain sensors.

In an example, an article of clothing (or clothing accessory) can further comprise a data control unit. In an example, a data control unit can further comprise one or more components selected from the group consisting of: a data processing component, a data communication component, a power source, a human-to-computer user interface, a computer-to-human interface, and a digital memory. In an example, a data control unit can be temporarily detached so that the remaining wearable portion of the clothing can be washed.

In an example, an article of clothing (or clothing accessory) can further comprise a data processing component. In an example, a data processing component can perform one or more functions selected from the group consisting of: amplify sensor signals, analyze data, analyze sensor information, convert analog signals to digital signals, determine a functional relationship between signal variation and joint angle variation, estimate joint angle, filter signals, model joint configuration, record data, run software applications, run software programs, and store data in memory.

In an example, an article of clothing (or clothing accessory) can further comprise a data control unit. In an example, a data control unit can further comprises one or more components selected from the group consisting of: a data processing component, a data communication component, a power source, a human-to-computer user interface, a computer-to-human interface, and a digital memory. In an example, a data control unit can be temporarily detached so that the remaining wearable portion of the article of clothing (or clothing accessory) can be washed.

In an example, a data processing component can perform one or more functions selected from the group consisting of: amplify sensor signals, analyze data, analyze sensor information, convert analog signals to digital signals, determine a functional relationship between signal variation and joint angle variation, estimate joint angle, filter signals, model joint configuration, record data, run software applications, run software programs, and store data in memory.

In an example, an article of clothing (or clothing accessory) can further comprise a data communication component. In an example, a data communication component can perform one or more functions selected from the group consisting of: transmit and receive data via Bluetooth, WiFi, Zigbee, or other wireless communication modality; transmit and receive data to and from a mobile electronic device such as a cellular phone, mobile phone, smart phone, electronic tablet; transmit and receive data to and from a separate wearable device such as a smart watch or electronically-functional eyewear; transmit and receive data to and from the internet; send and receive phone calls and electronic messages; transmit and receive data to and from a home appliance and/or home control system; and transmit and receive data to and from an implantable medical device.

In an example, an article of clothing (or clothing accessory) can further comprise a data processing component. In an example, a data communication component can perform one or more functions selected from the group consisting of: transmit and receive data via Bluetooth, WiFi, Zigbee, or other wireless communication modality; transmit and receive data to and from a mobile electronic device such as a cellular phone, mobile phone, smart phone, electronic tablet; transmit and receive data to and from a separate wearable device such as a smart watch or electronically-functional eyewear; transmit and receive data to and from the internet; send and receive phone calls and electronic messages; transmit and receive data to and from a home appliance and/or home control system; and transmit and receive data to and from an implantable medical device. In an example, an article of clothing (or clothing accessory) can be part of a system which further comprises a data processor at a remote location with which wearable components of the article of clothing (or clothing accessory) are in electromagnetic communication.

In an example, an article of clothing (or clothing accessory) can further comprise a computer-to-human interface component. In an example, a computer-to-human interface can further comprise one or more members selected from the group consisting of: a coherent-light image projector; a display screen; a holographic user interface; a laser; a myostimulating member; a neurostimulating member; a non-coherent-light image projector; a speaker or other sound-emitting member; a speech or voice recognition interface; a synthesized voice; a vibrating or other tactile sensation creating member; an electrical energy emitter; an electronically-functional textile interface; an infrared light emitter; an infrared light projector; and an LED or LED array.

In an example, an article of clothing (or clothing accessory) can further comprise one or more small-scale sensors selected from the group consisting of: Micro-Electro-Mechanical System (MEMS) sensor, nanoscale sensor, nanotube sensor, and nanoparticle sensor. In an example, an article of clothing (or clothing accessory) can further comprise one or more additional sensors selected from the group consisting of: humidity sensor, moisture sensor, thermometer, temperature sensor, flow sensor, differential transducer sensor, elastomeric sensor, vibration sensor, helical sensor, revolute joint sensor, ionizing radiation sensor, neurosensor, food consumption sensor, and eye-tracking sensor.

In an example, an article of clothing (or clothing accessory) can further comprise one or more sensors selected from the group consisting of: blood pressure sensor, heart rate monitor, capacitive sensor, force sensor, particulate force transducer, electromagnetic pressure sensor, other pressure sensor, torque sensor, and torsion sensor. In an example, an article of clothing (or clothing accessory) can further comprise one or more biochemical sensors selected from the group consisting of: electrochemical sensor, biochemical sensor, glucose sensor, chemoreceptor sensor, gas sensor, microbial sensor, micro-sampling tissue or body fluid sensor, pH level sensor, and photochemical sensor.

In an example, an article of clothing (or clothing accessory) can further comprise one or more actuators selected from the group consisting of: brushless DC motor, brush-type DC motor, electric motor, electromagnetic actuator, hydraulic actuator, induction motor, MEMS actuator, piezoelectric actuator, pneumatic actuator, and stepper motor. In an example, one or more actuators can adjust the fit and/or elasticity of a garment containing energy pathways in order to improve its ability to measure joint motion and/or configuration.

In an example, an article of clothing (or clothing accessory) can include a human-to-computer interface component. In an example, a human-to-computer interface can comprise one or more members selected from the group consisting of: a button, knob, or dial; a display screen; a gesture-recognition interface; a holographic user interface; a microphone; a physical keypad or keyboard; a pressure-sensitive textile array; a spectroscopic sensor; a speech or voice recognition interface; a touch screen; a virtual keypad or keyboard; an electronically-functional textile interface; and an eye gaze tracker.

I claim:

1. An article of clothing for recognizing body configuration and motion comprising:
an article of clothing which is configured to be at least partially worn on a person's arms and upper torso;
wherein the clothing further comprises a first inertial motion unit which is configured to be distal relative to the person's elbow, wherein distal means further from the person's heart and proximal means closer to the person's heart when the person has their arms and legs extended;
wherein the clothing further comprises a second inertial motion unit which is configured to be between the person's elbow and the person's shoulder;
wherein the clothing further comprises a third inertial motion unit which is configured to be on the person's torso;

wherein the clothing further comprises a first set of one or more energy emitters which are configured to be distal relative to the person's elbow;

wherein the clothing further comprises a second set of one or more energy emitters which are configured to be between the person's elbow and the person's shoulder;

wherein the clothing further comprises a first set of one or more energy receivers which are configured to be between the person's elbow and the person's shoulder;

wherein the clothing further comprises a second set of one or more energy receivers which are configured to be on the person's torso;

wherein the clothing further comprises a first set of two or more flexible energy pathways which transmit energy from the first set of energy emitters to the first set of energy receivers, wherein different flexible energy pathways in the first set cross the elbow at different radial locations and/or angles;

wherein the clothing further comprises a second set of two or more flexible energy pathways which transmit energy from the second set of energy emitters to the second set of energy receivers, wherein different flexible energy pathways in the second set cross the shoulder at different radial locations and/or angles;

wherein energy emitted by energy emitters, transmitted through energy pathways, and received by energy receivers is electrical or electromagnetic energy;

wherein an energy pathway in the first set or the second set transmits electrical energy; a middle portion of the energy pathway has a first level of electroconductivity, electrical resistance, and/or electrical capacitance; one or both end portions of the energy pathway have a second level of electroconductivity, electrical resistance and/or electrical capacitance; and the second level is greater than the first level; and a data processor, wherein data from inertial motion sensors and data from energy receivers are analyzed in the data processor to recognize the configuration and motion of the person's arms and torso.

2. An article of clothing for recognizing body configuration and motion comprising:

an article of clothing which is configured to be at least partially worn on a person's arms and upper torso;

wherein the clothing further comprises a first inertial motion unit which is configured to be distal relative to the person's elbow, wherein distal means further from the person's heart and proximal means closer to the person's heart when the person has their arms and legs extended;

wherein the clothing further comprises a second inertial motion unit which is configured to be between the person's elbow and the person's shoulder;

wherein the clothing further comprises a third inertial motion unit which is configured to be on the person's torso;

wherein the clothing further comprises a first set of one or more energy emitters which are configured to be distal relative to the person's elbow;

wherein the clothing further comprises a second set of one or more energy emitters which are configured to be between the person's elbow and the person's shoulder;

wherein the clothing further comprises a first set of one or more energy receivers which are configured to be between the person's elbow and the person's shoulder;

wherein the clothing further comprises a second set of one or more energy receivers which are configured to be on the person's torso;

wherein the clothing further comprises a first set of two or more flexible energy pathways which transmit energy from the first set of energy emitters to the first set of energy receivers, wherein different flexible energy pathways in the first set cross the elbow at different radial locations and/or angles;

wherein the clothing further comprises a second set of two or more flexible energy pathways which transmit energy from the second set of energy emitters to the second set of energy receivers, wherein different flexible energy pathways in the second set cross the shoulder at different radial locations and/or angles;

wherein energy emitted by energy emitters, transmitted through energy pathways, and received by energy receivers is electrical or electromagnetic energy;

wherein an energy pathway in the first set or the second set is configured to span a body joint; a first portion of the energy pathway which is closest to the body joint has a first level of electroconductivity, electrical resistance, and/or electrical capacitance; one or more second portions of the energy pathway have a second level of electroconductivity, electrical resistance and/or electrical capacitance; and the second level is greater than the first level; and a data processor, wherein data from inertial motion sensors and data from energy receivers are analyzed in the data processor to recognize the configuration and motion of the person's arms and torso.

3. An article of clothing for recognizing body configuration and motion comprising:

an article of clothing which is configured to be at least partially worn on a person's arms and upper torso;

wherein the clothing further comprises a first inertial motion unit which is configured to be distal relative to the person's elbow, wherein distal means further from the person's heart and proximal means closer to the person's heart when the person has their arms and legs extended;

wherein the clothing further comprises a second inertial motion unit which is configured to be between the person's elbow and the person's shoulder;

wherein the clothing further comprises a third inertial motion unit which is configured to be on the person's torso;

wherein the clothing further comprises a first set of one or more energy emitters which are configured to be distal relative to the person's elbow;

wherein the clothing further comprises a second set of one or more energy emitters which are configured to be between the person's elbow and the person's shoulder;

wherein the clothing further comprises a first set of one or more energy receivers which are configured to be between the person's elbow and the person's shoulder;

wherein the clothing further comprises a second set of one or more energy receivers which are configured to be on the person's torso;

wherein the clothing further comprises a first set of two or more flexible energy pathways which transmit energy from the first set of energy emitters to the first set of energy receivers, wherein different flexible energy pathways in the first set cross the elbow at different radial locations and/or angles;

wherein the clothing further comprises a second set of two or more flexible energy pathways which transmit energy from the second set of energy emitters to the second set of energy receivers, wherein different flexible energy pathways in the second set cross the shoulder at different radial locations and/or angles;

wherein energy emitted by energy emitters, transmitted through energy pathways, and received by energy receivers is light energy;

wherein an energy pathway in the first set or the second set is configured to span a body joint; a first portion of the energy pathway which is closest to the body joint has a first level of light transmittance and/or transmissivity; one or more second portions of the energy pathway have a second level of light transmittance and/or transmissivity; and the second level is greater than the first level; and a data processor, wherein data from inertial motion sensors and data from energy receivers are analyzed in the data processor to recognize the configuration and motion of the person's arms and torso.

* * * * *